(12) United States Patent
Lim

(10) Patent No.: US 11,183,133 B2
(45) Date of Patent: Nov. 23, 2021

(54) ELECTRONIC DEVICE FOR CONTROLLING DISPLAY AND METHOD FOR OPERATING SAME

(71) Applicant: Samsung Electronics Co., Ltd., Gyeonggi-do (KR)

(72) Inventor: Silkyu Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 16/081,994

(22) PCT Filed: Mar. 3, 2017

(86) PCT No.: PCT/KR2017/002307
§ 371 (c)(1),
(2) Date: Sep. 4, 2018

(87) PCT Pub. No.: WO2017/150929
PCT Pub. Date: Sep. 8, 2017

(65) Prior Publication Data
US 2020/0286436 A1 Sep. 10, 2020

(30) Foreign Application Priority Data
Mar. 3, 2016 (KR) .................. 10-2016-0025555

(51) Int. Cl.
*G09G 3/36* (2006.01)
*G02F 1/1335* (2006.01)
*G06F 1/16* (2006.01)

(52) U.S. Cl.
CPC ..... *G09G 3/3648* (2013.01); *G02F 1/133528* (2013.01); *G06F 1/1626* (2013.01);
(Continued)

(58) Field of Classification Search
None
See application file for complete search history.

(56) References Cited

U.S. PATENT DOCUMENTS 9,679,182 B2 * 6/2017 Bae .................. G06K 9/00013
9,846,473 B1 * 12/2017 Kalscheur ............ G06F 1/1686
(Continued)

FOREIGN PATENT DOCUMENTS

KR 10-2012-0046040 A 5/2012
KR 10-2013-0091189 A 8/2013
(Continued)

OTHER PUBLICATIONS

European Search Report dated Mar. 13, 2019.
(Continued)

*Primary Examiner* — Ryan Crockett
(74) *Attorney, Agent, or Firm* — Cha & Reiter, LLC

(57) ABSTRACT

An electronic device according to various examples can comprise: a window; a polarizing plate disposed at a lower part of the window and including a first region, which has a first characteristic with respect to light, and a second region, which has a second characteristic with respect to the light; a display disposed at a lower part of the polarizing plate; and at least one sensor disposed at a lower part of the display and disposed at a location corresponding to the second region. A method for operating the electronic device, according to various examples, can comprise the steps of: determining an activated state of at least one sensor; aligning, in a first direction, at least one portion of a liquid crystal formed on a window when the at least one sensor is activated; and aligning the at least one portion of the liquid crystal in a second direction when the at least one sensor is inactivated.

10 Claims, 65 Drawing Sheets

(52) U.S. Cl.
CPC .............. *G09G 2320/0626* (2013.01); *G09G 2360/144* (2013.01)

(56) References Cited

U.S. PATENT DOCUMENTS

| | | |
|---|---|---|
| 2010/0309369 A1 | 12/2010 | Jarvis et al. |
| 2012/0105400 A1* | 5/2012 | Mathew ................ G06F 1/1686 345/207 |
| 2012/0106063 A1 | 5/2012 | Mathew et al. |
| 2012/0258773 A1* | 10/2012 | Alvarez Rivera ...... G06F 21/83 455/556.1 |
| 2013/0203462 A1 | 8/2013 | Tahk et al. |
| 2014/0016043 A1 | 1/2014 | Chen et al. |
| 2015/0036063 A1* | 2/2015 | Chen ................. G02F 1/133528 349/12 |
| 2016/0337570 A1* | 11/2016 | Tan ...................... H04N 5/2351 |
| 2017/0084231 A1* | 3/2017 | Chew .................... G06F 1/1686 |
| 2017/0124942 A1* | 5/2017 | Evans .................... G06F 1/1684 |

FOREIGN PATENT DOCUMENTS

| | | |
|---|---|---|
| KR | 10-2013-0135983 A | 12/2013 |
| KR | 10-2015-0000293 A | 1/2015 |
| KR | 10-2015-0016874 A | 2/2015 |

OTHER PUBLICATIONS

European Search Report dated Apr. 9, 2020.
European Search Report dated Jul. 8, 2019.
European Search Report dated May 19, 2021.

* cited by examiner

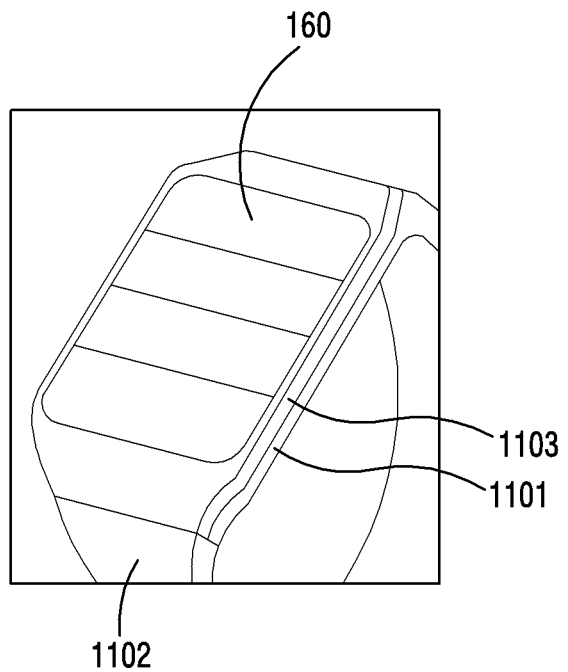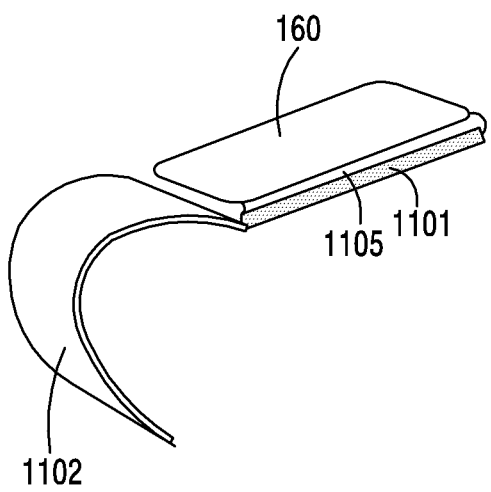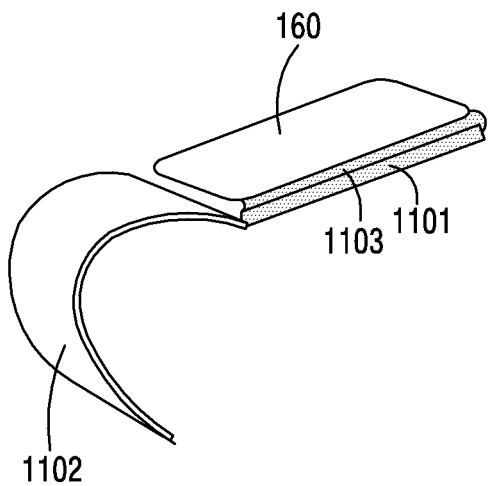
FIG.11A
FIG.11B
FIG.11C

ELECTRONIC DEVICE FOR CONTROLLING DISPLAY AND METHOD FOR OPERATING SAME

CLAIM OF PRIORITY

This application is a National Phase Entry of PCT International Application No. PCT/KR2017/002307, which was filed on Mar. 3, 2017, and claims a priority to Korean Patent Application No. 10-2016-0025555, which was filed on Mar. 3, 2016, the contents of which are incorporated herein by reference.

TECHNICAL FIELD

Various embodiments of the present disclosure relate to an electronic device for controlling a display and a method of operating the same.

BACKGROUND ART

Generally, electronic devices perform composite functions by being provided with various additional functions. For example, an electronic device may perform a mobile communication function, a data communication function, an image capturing function, a voice recording function, and the like. An electronic device may include a display capable of displaying data.

DETAILED DESCRIPTION OF THE INVENTION

Technical Problem

In order to perform various functions, an electronic device may include various sensors for sensing an external environment. For example, a camera device, a proximity sensor, or an illuminance sensor may be provided on the front side of the electronic device so as to capture an external image through the front side of the electronic device, to detect an object approaching the front side of the electronic device, or to control the electronic device based on the ambient brightness of the electronic device. For these various sensors, an opening is provided in a partial region of the electronic device, which may deteriorate the aesthetics of the electronic device.

Technical Solution

According to various embodiments of the present disclosure, an electronic device may include: a window; a polarizing plate disposed under the window and including a first region having a first characteristic with respect to light and a second region having a second characteristic with respect to light; a display disposed under the polarizing plate; and at least one sensor disposed under the display at a position corresponding to the second region.

A method of operating an electronic device according to various embodiments may include: determining an activated state of at least one sensor; causing at least some of liquid crystals provided in a window to be aligned in a first direction when the at least one sensor is activated; and causing the at least some of the liquid crystals to be aligned in a second direction when the at least one sensor is inactivated.

Advantageous Effects

In various embodiments, various sensors are mounted on the rear side of the display. Thus, it is possible to realize a full-front display in which the display is enlarged on the full front side. Since sensors are mounted on the rear side of the display, no sensor may be visually recognizable from the outside. In addition, an existing hole for mounting a sensor may be omitted. Thus, it is possible to realize a holeless electronic device.

BRIEF DESCRIPTION OF THE DRAWINGS

FIGS. 11A to 11C illustrate perspective views of electronic devices according to various embodiments;

MODE FOR CARRYING OUT THE INVENTION

Figure 1:
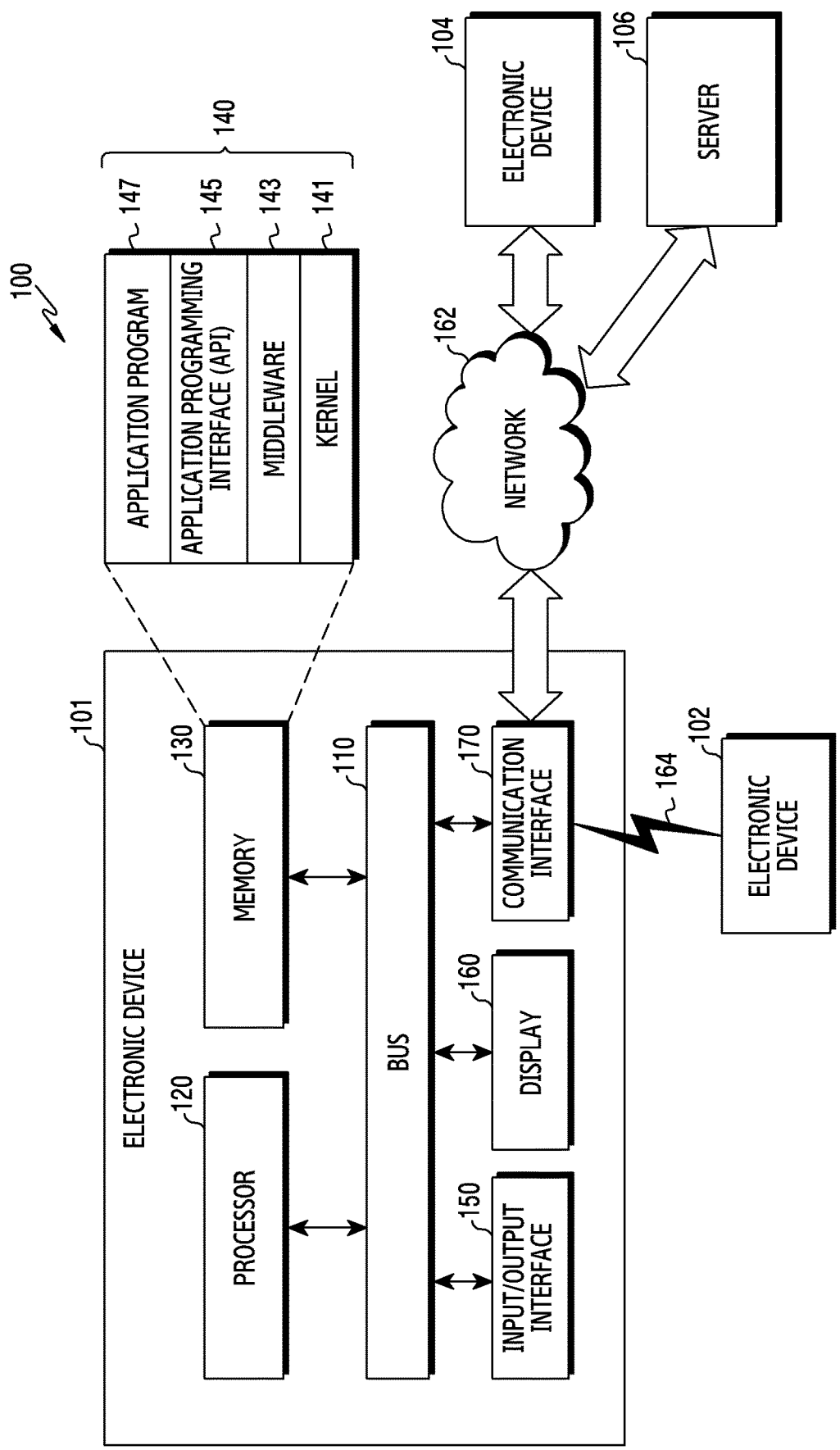
FIG. 1 illustrates a network environment system according to various embodiments.

Hereinafter, various embodiments of the present disclosure are described with reference to the accompanying drawings. It should be appreciated, however, it is not intended to limit the embodiments of the present disclosure to the particular form disclosed, but, on the contrary, it is intended to cover all modifications, equivalents, and alternatives falling within the spirit and scope of the embodiments of the present disclosure. Like reference numerals denote like constitutional elements throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Expressions such as "1st", "2nd", "first", and "second" may be used in various embodiments to express various constitutional elements irrespective of an order and/or an importance, and it is not intended to limit the corresponding constitutional elements. The above expressions may be used to distinguish one constitutional element from another constitutional element. For example, a 1st user device and a 2nd user device are both user devices, and indicate different user devices. For example, a 1st constitutional element may be termed a 2nd constitutional element, and similarly, the 2nd constitutional element may be termed the 1st constitutional element without departing from the scope of the present disclosure.

When a certain constitutional element (e.g., the 1st constitutional element) is mentioned as being "operatively or communicatively coupled with/to" or "connected to" a different constitutional element (e.g., the 2nd constitutional element), it is to be understood that the certain constitutional element is directly coupled with/to another constitutional element or can be coupled with/to the different constitutional element via another constitutional element (e.g., a 3rd constitutional element). On the other hand, when the certain constitutional element (e.g., the 1st constitutional element) is mentioned as being "directly coupled with/to" or "directly connected to" the different constitutional element (e.g., the 2nd constitutional element), it may be understood that another constitutional element (e.g., the 3rd constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

According to various embodiments of the present disclosure, an electronic device may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., a smart watch, smart glasses), electronic clothes, an electronic bracelet, an electronic necklace, an electronic appcessory, an electronic tattoo, a smart mirror, or a smart watch).

According to some embodiments, the electronic device may be a smart home appliance. The smart home appliance may include, for example, at least one of a TeleVision (TV), a Digital Video Disk (DVD) player, an audio player, a refrigerator, an air conditioner, a cleaner, an oven, a micro-wave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to some embodiments, the electronic device may be a flexible device. Further, the electronic device according to an embodiment of the present disclosure is not limited to the aforementioned devices, and may include a new electronic device depending on technical progress.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160 and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
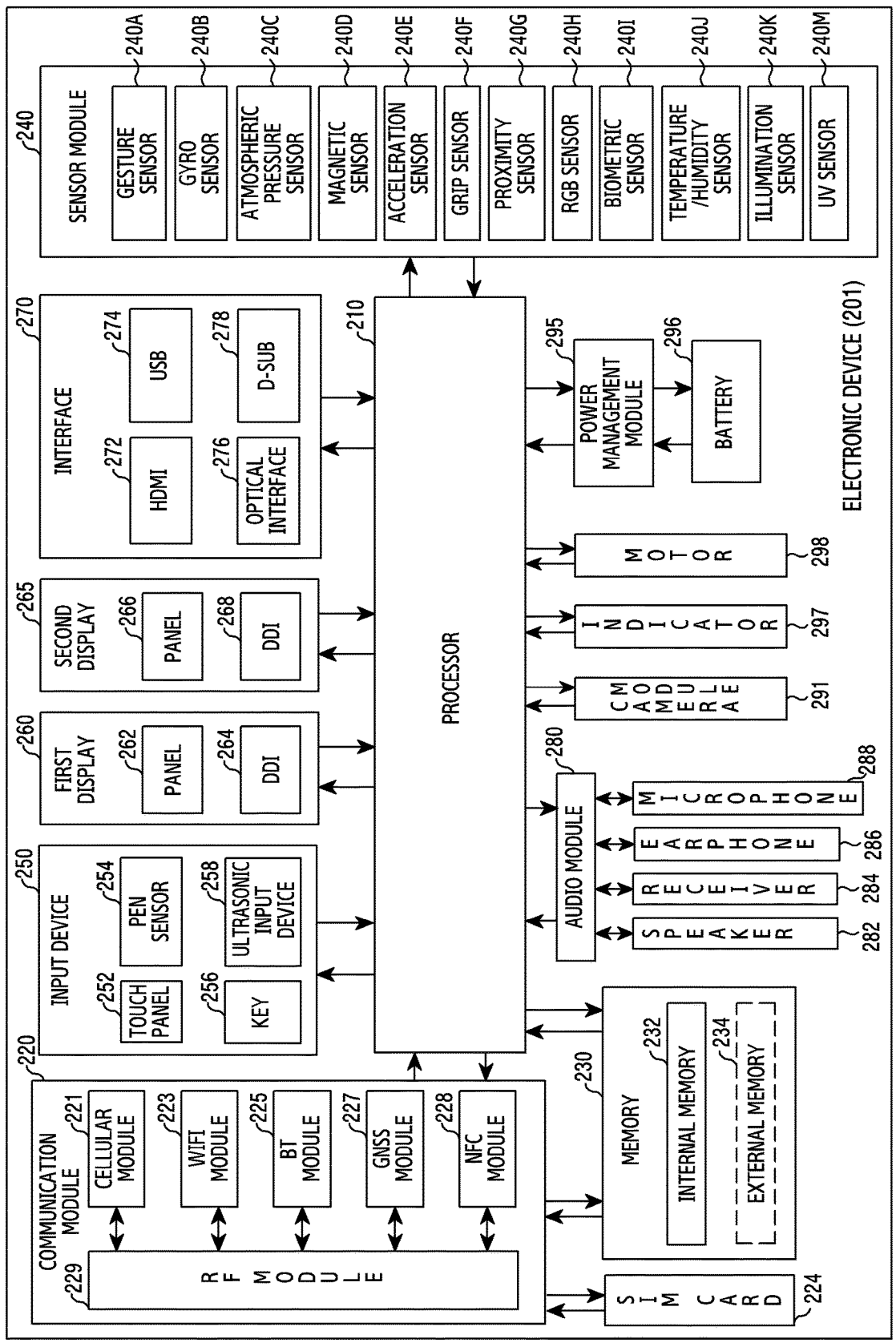
FIG. 2 illustrates a block diagram of an electronic device according to various embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298. The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

In one embodiment, a display (e.g., the display 160) may include a first display 260 or a second display 265. The first display may include a first panel 262 and a first display driving circuit (Display Driver IC (DDI)) 264 configured to control the first panel. The first panel 262 may have a plurality of pixels, and each pixel may include sub-pixels for displaying R, G, and B, which are primary colors of light. Each of the sub-pixels includes at least one transistor, and according to the magnitude of a voltage applied to the transistors (or current flowing in the transistors), the pixels can be adjusted and colors can be expressed. The first driving circuit 264 may include a gate driver circuit section having an on/off function for controlling gates of sub-pixels RGB and a source driving circuit section for adjusting image signals so as to provide a difference in colors, and may control the transistors of the sub-pixels of the first panel 262 so as to provide an entire screen. The first driving circuit may receive first image data from a processor 210 and may operate to cause a video or an image to be displayed on the first panel 262.

The second display 265 may include a second panel 266 and a second display driving circuit (Display Driver IC (DDI)) 268 configured to control the second panel 266. The panel 266 may have a plurality of pixels, and each pixel may include sub-pixels for displaying R, G, and B, which are primary colors of light. Each of the sub-pixels includes at least one transistor, and according to the magnitude of a voltage applied to the transistors (or current flowing in the transistors), the pixels can be adjusted and colors can be expressed. The driving circuit 268 may include a gate driver circuit section having an on/off function for controlling gates of sub-pixels RGB and a source driving circuit section for adjusting image signals so as to provide a difference in colors, and may adjust the transistors of the sub-pixels of the second panel 266 so as to configure an entire screen. The second driving circuit may receive second image data, which is the same as or different from the first image data, from the processor 210 and may operate to cause a video or an image to be displayed on the second panel 262.

At least one of the first and second panels 262 and 266 may be implemented, for example, to be flat, flexible, or bendable in various embodiments. At least one of the first and second panels 262 and 266 may include one or more modules including a touch panel 252 and/or a pen sensor 254.

The first and second displays 260 and 265 (e.g., the display 160) may include another video output scheme (e.g., a hologram device, a projector, or the like (not illustrated)) and/or a control circuit for controlling the scheme.

In embodiments for implementing an apparatus including multiple displays, at least some of contents (e.g., image data, an image data stream, etc.) in various modules and devices of the terminal may be processed using the processor 210. The processor may determine to output the varying contents to at least one of the first display 260 and the second display 265. For example, the processor may cause the first display 260 to output a command received from a communication module 220, and may cause the second display 265 to output a command received from a sensor module 240. In another embodiment, the processor may cause the contents output from the first display 260 to be switched and enlarged so as to be displayed on the second display 265, or may cause the contents output from the second display 265 to be switched and enlarged so as to be displayed on the first display 260).

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
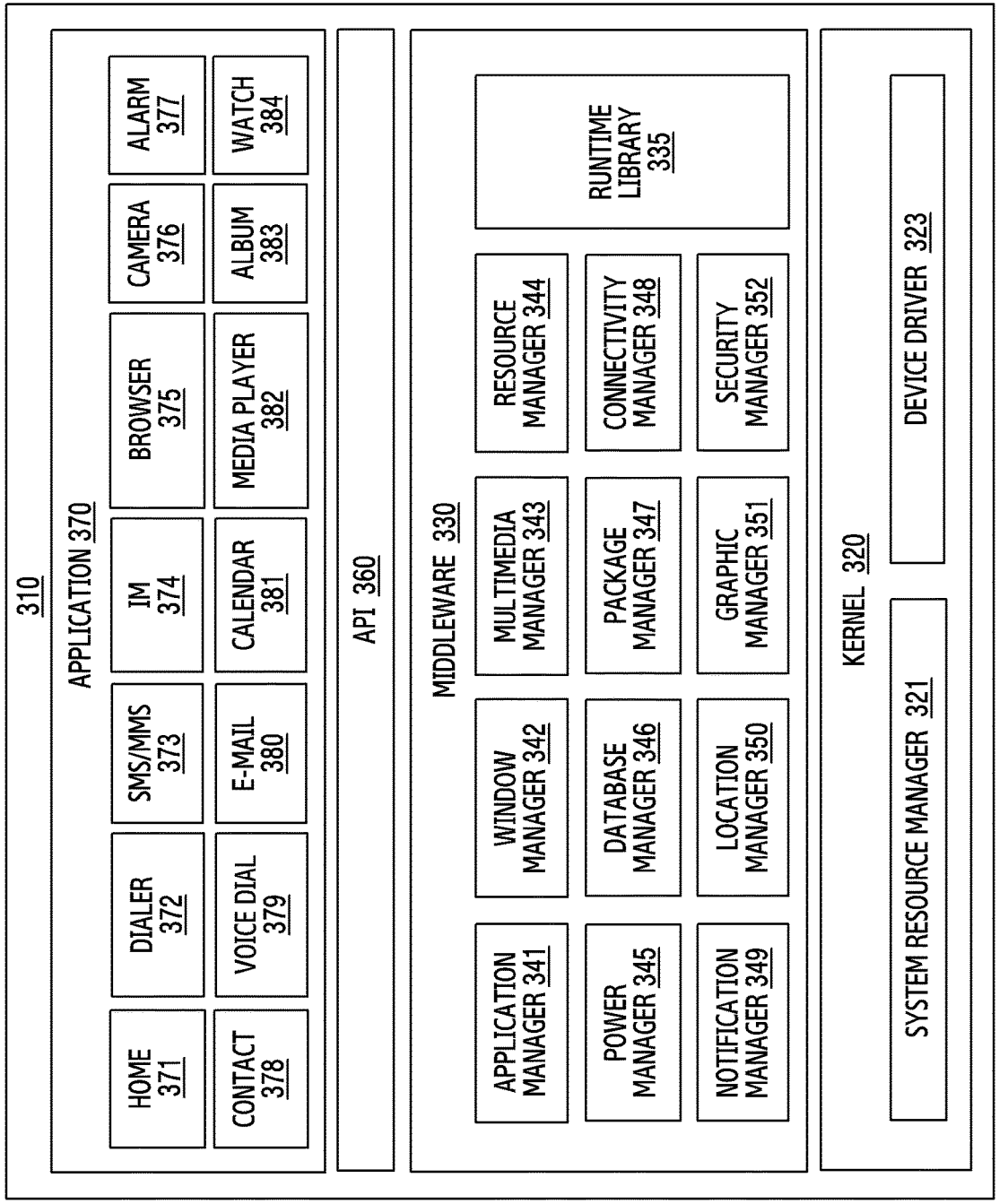
FIG. 3 illustrates a block diagram of a programming module according to various embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like. The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

In one of various embodiments, a display driver may control at least one Display Driver IC (DDI). Functions of controlling a screen at a request of an application 370 may be included.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an example embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various example embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. While the present disclosure has been shown and described with reference to certain embodiments thereof, it will be apparent to those skilled in the art according to the present disclosure is not limited to these embodiments, and various changes in form and details may be made therein without departing from the spirit and scope of the present disclosure as defined by the appended claims.

Figure 4:
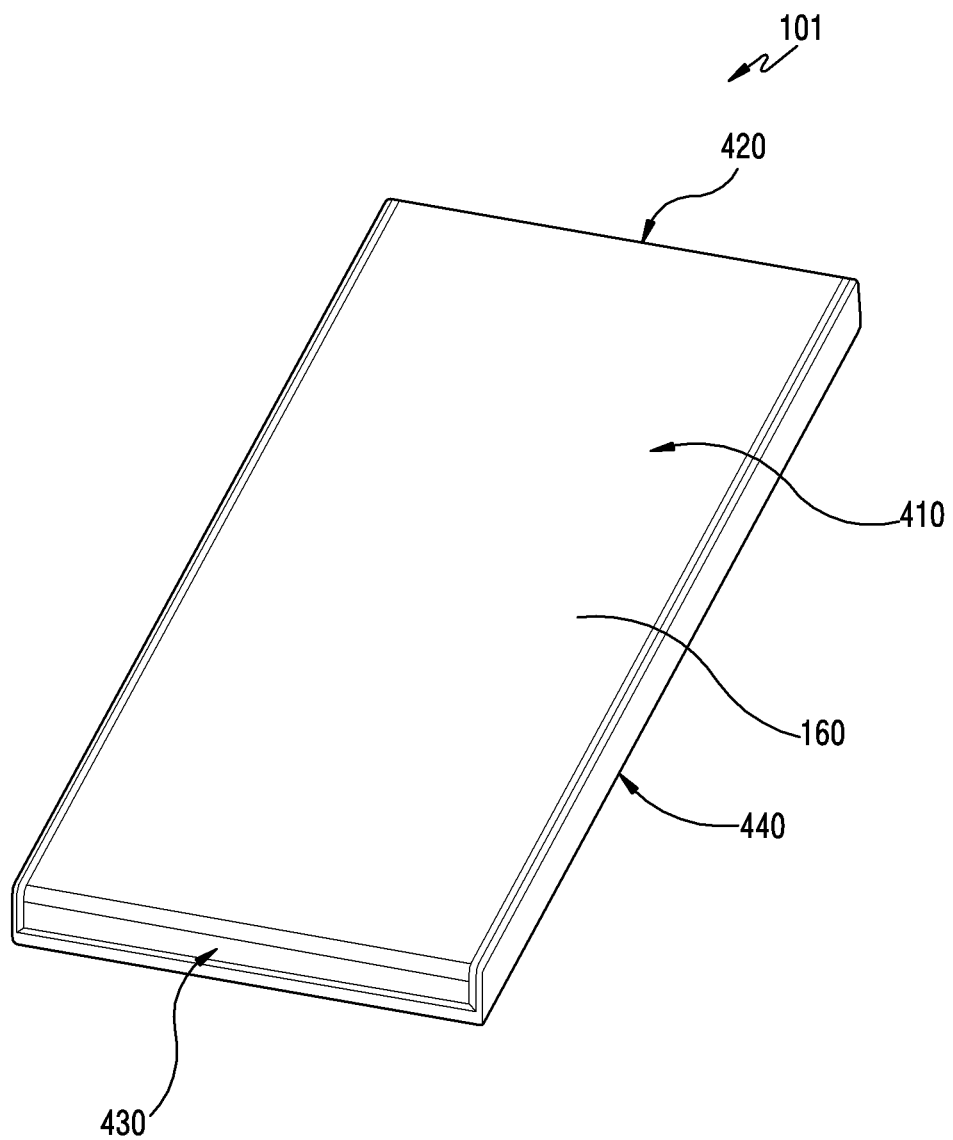
FIG. 4 illustrates a perspective view of an electronic device according to various embodiments.

FIG. 4 illustrates a perspective view of an electronic device according to various embodiments.

As illustrated in FIG. 4, the electronic device 101 may include a first face 410, a second face 420, a third face 430, and a fourth face 440. The first face 410 may be the front side of the electronic device 101. The second face 420 and the third face 430 may be one lateral side of the electronic device 101. The second face 420 and the third face 430 may be any one face formed between the first face 410 and the fourth face 440. FIG. 4 illustrates that the second face 420 and the third face 430 are lateral sides having a shorter length in the electronic device 101. However, embodiments are not limited thereto, and the second face 420 and the third face 430 may be lateral sides having a longer length in the electronic device 101. The fourth face 440 may be the rear side of the electronic device 101. The display 160 may be disposed on at least one of the first face 410, the second face 420, the third face 430, and the fourth face 440 in the electronic device 101. According to one embodiment, the display 160 may be disposed on the first face 410, the second face 420, and the third face 430 of the electronic device 101. One display 160 may be disposed on the entire first face 410. The display 160 may be disposed on the front side by omitting a hole for a mechanical component or a physical button from the first face 410. The display 160 may be disposed to extend from the first face 410 to the second face 420 and the third face 430. According to one embodiment, one flexible display 160 may be curved on the second face 420 and the third face 420.

Figure 5:
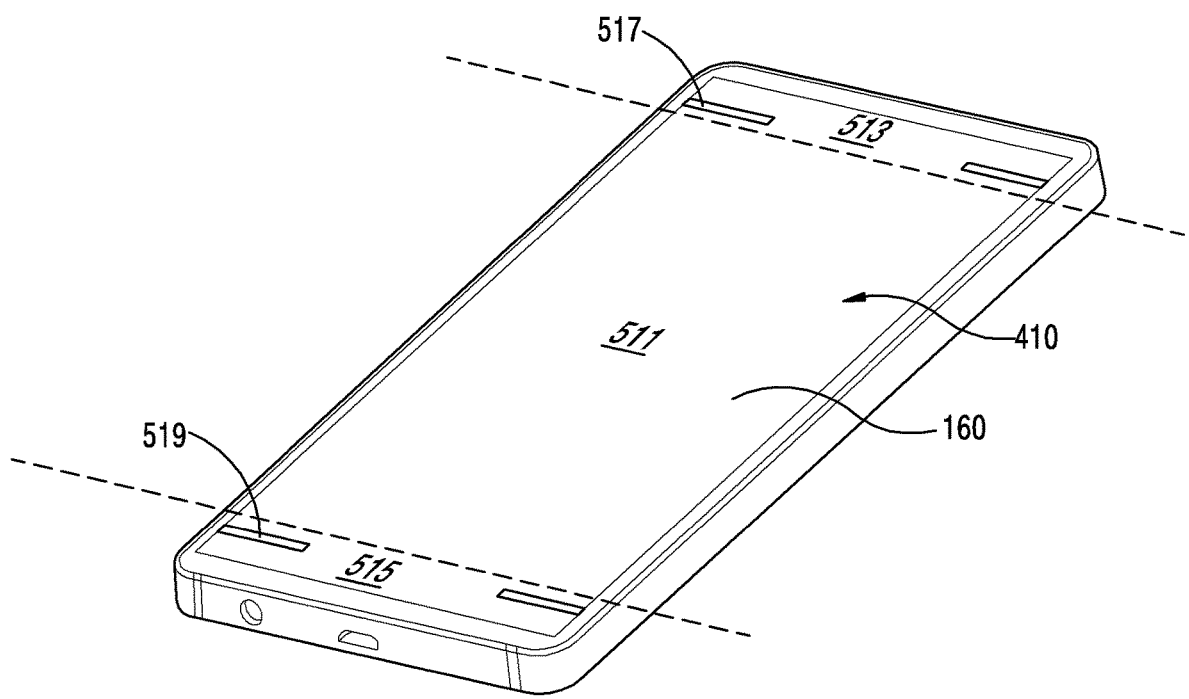
FIG. 5 illustrates a perspective view of an electronic device according to various embodiments.

FIG. 5 illustrates a perspective view of an electronic device according to various embodiments.

As illustrated in FIG. 5, the first face 410 of the electronic device 101 may include a main region 511, a first sub-region 513, and a second sub-region 515. The main region 511 may be the main region in the first face 410. The first sub-region 513 or the second sub-region 515 may be the regions arranged on one side of the main region 511. The first sub-region 513 and the second sub-region 515 may be regions, which are disposed above and below the main region 511, respectively. The display 160 may be disposed in the main region 511, the first sub-region 513, and the second sub-region 515. The display 160 may include a first disconnection region 517, at least a portion of which is disconnected between the main region 511 and the first sub-region 513. The display 160 may include a second disconnection region 519, at least a portion of which is disconnected between the main region 511 and the second sub-region 515. The first disconnection region 517 and the second disconnection region 519 may be regions formed by adding non-conductive members to the display 160. Alternatively, the first disconnection region 517 and the second disconnection region 519 may be regions formed by removing a portion of the display 160. It is possible to secure the performance of the antenna or various sensors in the electronic device 101 through the first disconnection region 517 and the second disconnection region 519. For example, a power feeding portion may be provided in each of the first disconnection region 517 and the second disconnection region 519 and may be utilized as an individual antenna radiator.

Figure 6:
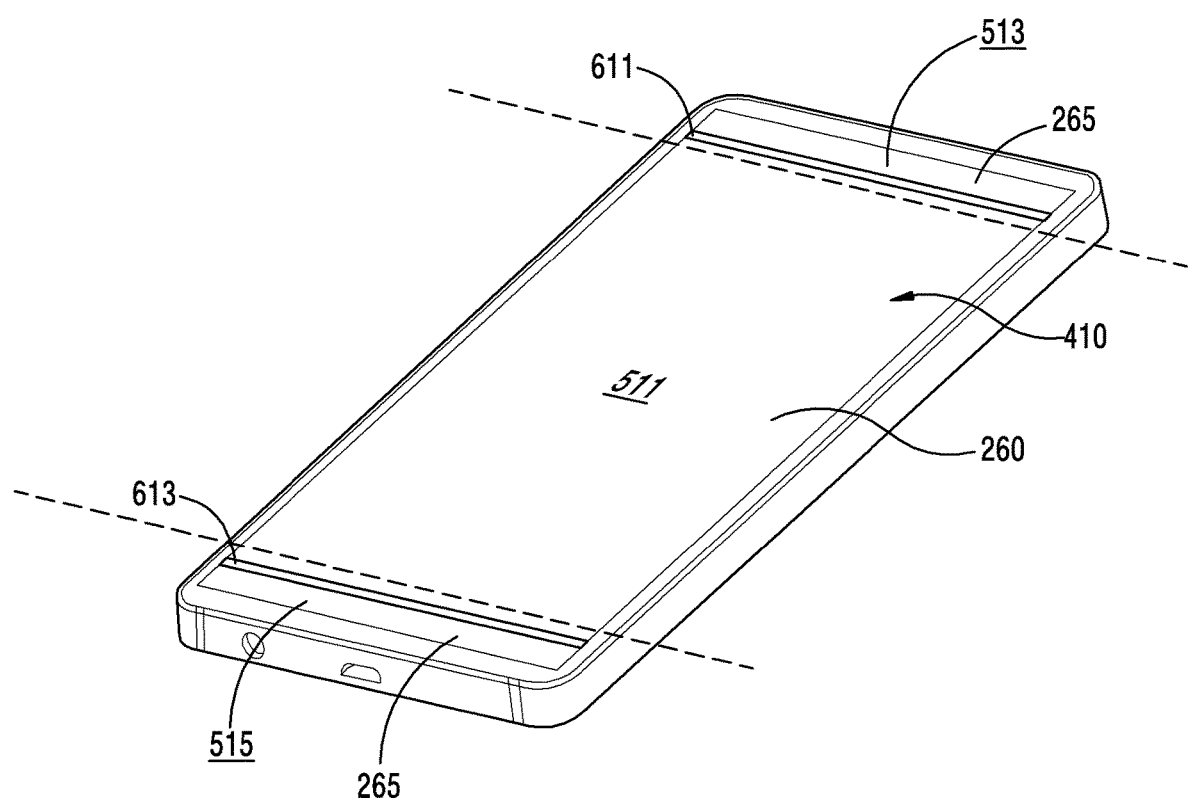
FIG. 6 illustrates a perspective view of an electronic device according to various embodiments.

FIG. 6 illustrates a perspective view of an electronic device according to various embodiments.

As illustrated in FIG. 6, the electronic device 101 may include a first display 260 and a second display 265. The first face 410 of the electronic device 101 may include a main region 511, a first sub-region 513, a second sub-region 515, a third sub-region 611, and a fourth sub-region 613. The first sub-region 513 or the second sub-region 515 may be the regions arranged on one side of the main region 511. The first sub-region 513 and the second sub-region 515 may be regions, which are disposed above and below the main region 511, respectively. The first display 260 may be disposed in the main region 511. The second displays 265 may be disposed in the first sub-region 513 and the second sub-region 515, respectively. A third sub-region 611 and a fourth sub-region 613 may be included between the first display 260 and the second displays 265, respectively. The first display 260 and the second displays 265 may be distinguished through the third sub-region 611 and the fourth sub-region 613. According to one embodiment, the conductive members of the second displays 265 may be utilized as antenna radiators. For example, by adding non-conductive members to the third sub-region 611 and the fourth sub-region 613 and adding a power feeding portions to the second displays 265, the conductive members of the second displays 265 may be used as antenna radiators.

Figure 7A:
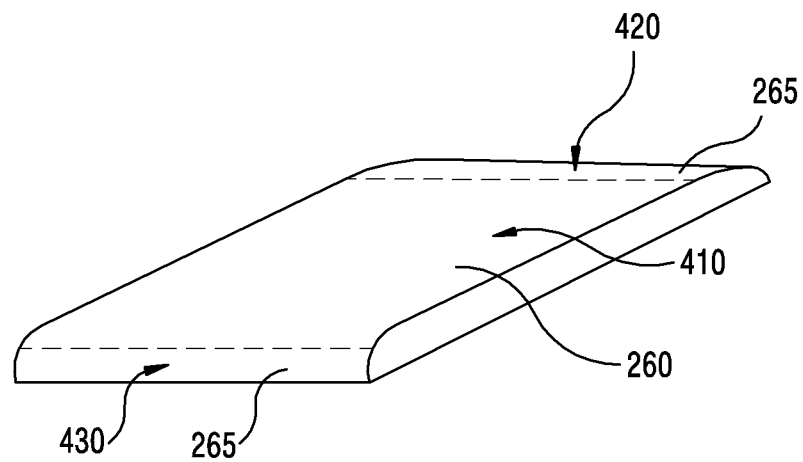
FIGS. 7A and 7B illustrate perspectives of an electronic device according to various embodiments.
Figure 7B:
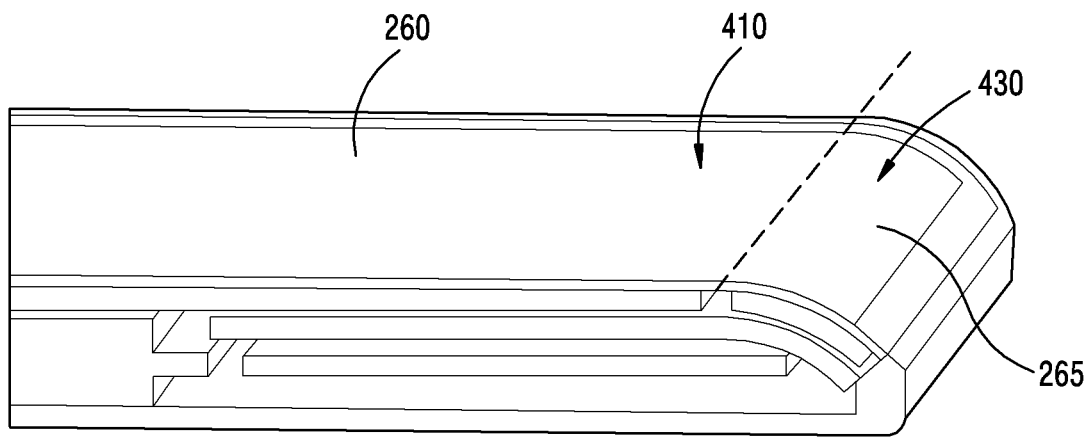

FIGS. 7A and 7B illustrate perspectives of an electronic device according to various embodiments.

As illustrated in FIGS. 7A and 7B, an electronic device 101 may include a first display 260 and second displays 265. The first display 260 may be disposed on the first face 410. The second displays 265 may be disposed on at least one of the second face 420 and the third face 430. According to various embodiments, at least one of the second face 420 and the third face 430 may be a curved face. Thus, the first display 260 and the second displays 265 may be arranged naturally along the curved faces. According to various embodiments, the conductive members of the second displays 265 may be utilized as antennas. Alternatively, by disposing additional conductive members on the second displays 265, the conductive members can be utilized as antennas. For example, various conductive films such as an Indium Tin Oxide (ITO) film may be disposed on the second displays 265 so as to be utilized as antennas.

Figure 8:
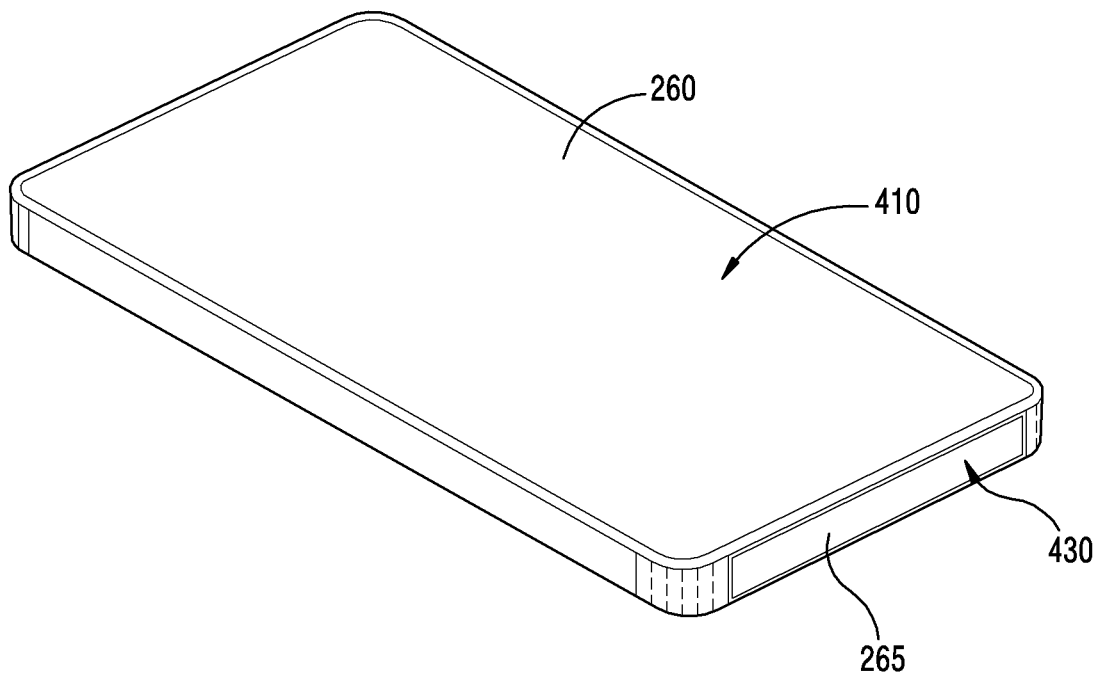
FIG. 8 illustrates a perspective view of an electronic device according to various embodiments.

FIG. 8 illustrates a perspective view of an electronic device according to various embodiments.

As illustrated in FIG. 8, the electronic device 101 may include a first display 260 and a second display 265. The first display 260 may be disposed on the first face 410. The second displays 265 may be disposed on at least one of the second face 420 and the third face 430. According to various embodiments, when the second display 265 is separately provided on at least one of the second face 420 and the third face 430, the first display 260 and the second display 265 may be clearly distinguished.

Figure 9:
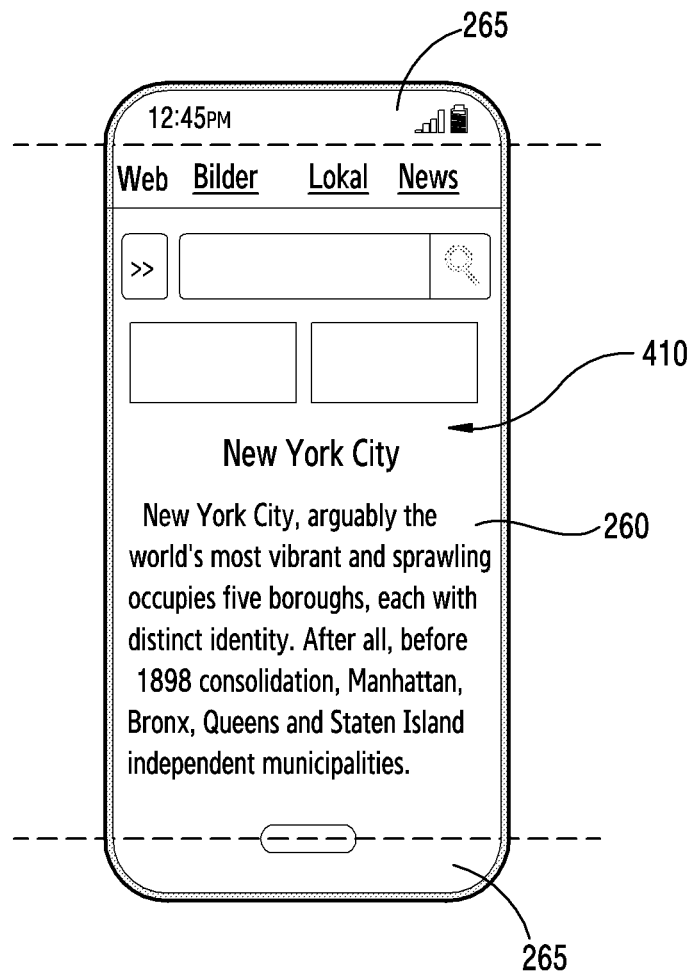
FIG. 9 illustrates an exemplary view of a screen of an electronic device according to various embodiments.

FIG. 9 illustrates an exemplary view of a screen of an electronic device according to various embodiments.

As illustrated in FIG. 9, according to various embodiments, a first display 260 and at least one second display 265 may be disposed on the first face 410. A screen may be displayed on the first display 260 and the second display 265. For example, a single screen may be divisionally displayed on the first display 260 and the second display 265. That is, the screen displayed on the first display 260 and the screen displayed on the second display 265 may constitute a single screen. Alternatively, screens displayed on the first display 260 and the second display 265 may be separate screens. The first display 260 and the second display 265 may display a home key. That is, in replacement of physical buttons, home key screens that are visible as the physical buttons may be displayed on the first display 260 and the second display 265. FIG. 9 illustrates that the first display 260 and the second display 265 are disposed on the first face 410, but the embodiment is not limited thereto. Accordingly, as described above with reference to FIG. 4, one display 160 may be disposed on the entire first face 410.

Figures 10A, 10B:
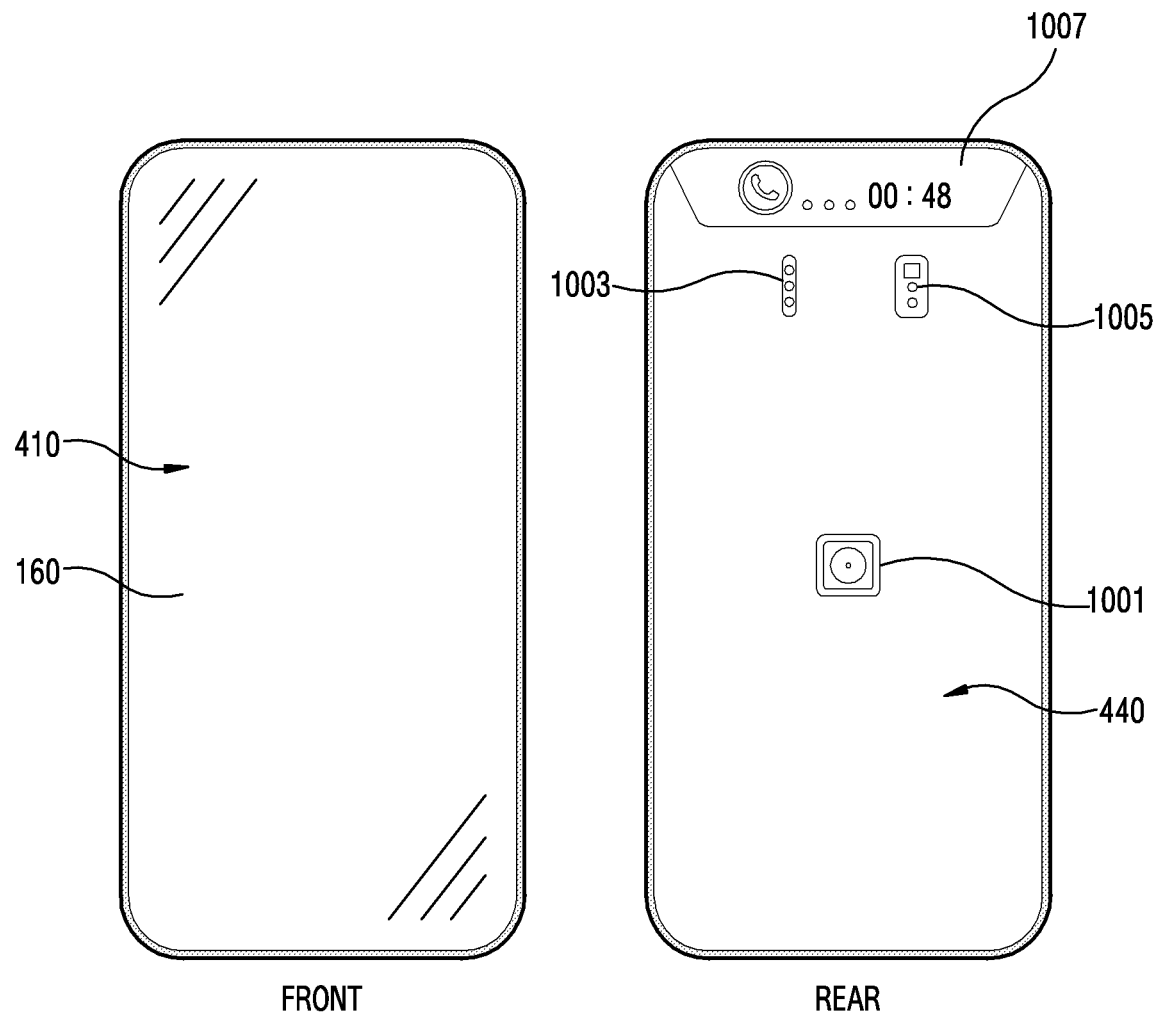
FIG. 10A illustrates a front view of an electronic device according to various embodiments.
FIG. 10B illustrates a rear view of the electronic device according to various embodiments.

FIG. 10A illustrates a front view of an electronic device according to various embodiments. FIG. 10B illustrates a rear view of the electronic device according to various embodiments.

As illustrated in FIG. 10A, a hole for a mechanical component or a physical button may be omitted from the first face 410 of the electronic device 101. Thus, the display 160 may be disposed on the entire first face 410. As illustrated in FIG. 10B, various mechanical components, sensors, and the like may be disposed on the fourth face 440 of the electronic device 101. For example, a camera device 1001, a receiver 1003, a heart rate sensor (an HRM sensor), a flash 1005, and the like may be disposed on the fourth face 440 of the electronic device 101. Meanwhile, when the receiver 1003 is disposed on the fourth face 440 of the electronic device 101, it is possible to provide a new user experience of performing a call using the rear side of the electronic device 101. In addition, a sub-display 1007 may be additionally disposed on a portion of the fourth face 440, so that a call status can be confirmed.

FIGS. 11A to 11C illustrate perspective views of electronic devices according to various embodiments.

As illustrated in FIG. 11A, the electronic device according to various embodiments may be a wearable device. An electronic device according to various embodiments may include a display 160, an antenna 1101, an injection-molded unit 1103, and a wearing unit 1102. The display 160 is disposed on the front side of the wearable device, and physical button keys may be omitted. The display 160 may replace the physical button keys. The injection-molded unit 1103 may separate the display 160 and the antenna 1101 from each other. The injection-molded unit 1103 may prevent electrical contact between the display 160 and the antenna 1101. For this purpose, the injection-molded unit 1103 may include a non-conductive material.

As illustrated in FIG. 11B, according to various embodiments, glass 1105 may be disposed between the display 160 and the antenna 1101. The glass 1105 may separate the display 160 and the antenna 1101 from each other. The glass 1105 may prevent electrical contact between the display 160 and the antenna 1101.

As illustrated in FIG. 11C, according to various embodiments, the injection-molded unit 1103 may be disposed between the display 160 and the antenna 1101. The injection-molded unit 1103 may separate the display 160 and the antenna 1101 from each other. The injection-molded unit 1103 may prevent electrical contact between the display 160 and the antenna 1101. For this purpose, the injection-molded unit 1103 may include a non-conductive material.

Figures 12A, 12B:
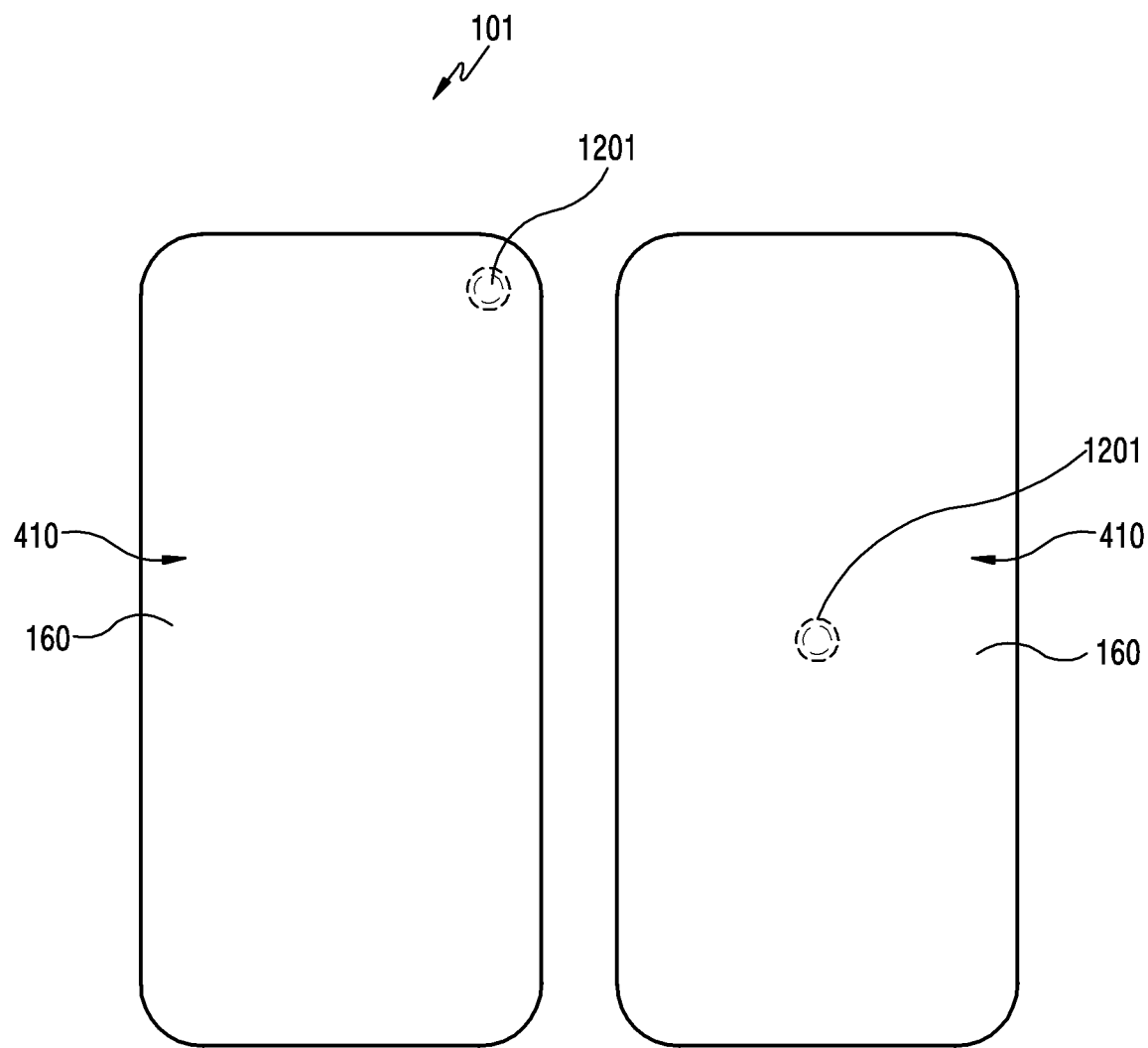
FIGS. 12A and 12B illustrate front views of electronic devices according to various embodiments.

FIGS. 12A and 12B illustrate front views of electronic devices according to various embodiments.

As illustrated in FIGS. 12A and 12B, a hole for a mechanical component or a physical button may be omitted from the first face 410 of the electronic device 101. Thus, the display 160 may be disposed on the entire first face 410.

Meanwhile, various sensors 1201 may be disposed on the rear side of the display 160. The sensor 1201 may include at least one of a camera device, a proximity sensor, an illuminance sensor, a fingerprint recognition sensor, a biosensor, an iris recognition sensor, a heart rate (HRM) sensor, and a biometric sensor. Alternatively, the sensor 1201 may be a sensor activated by receiving external light. As illustrated in FIG. 12A, the sensor 1201 may be disposed on the upper portion of the rear side of the display 160. Alternatively, as illustrated in FIG. 12 (b), the sensor 1201 may be disposed at the center of the rear side of the display 160. According to various embodiments, the sensor 1201 may not be exposed to the first face 410 of the electronic device 101.

Figure 13:
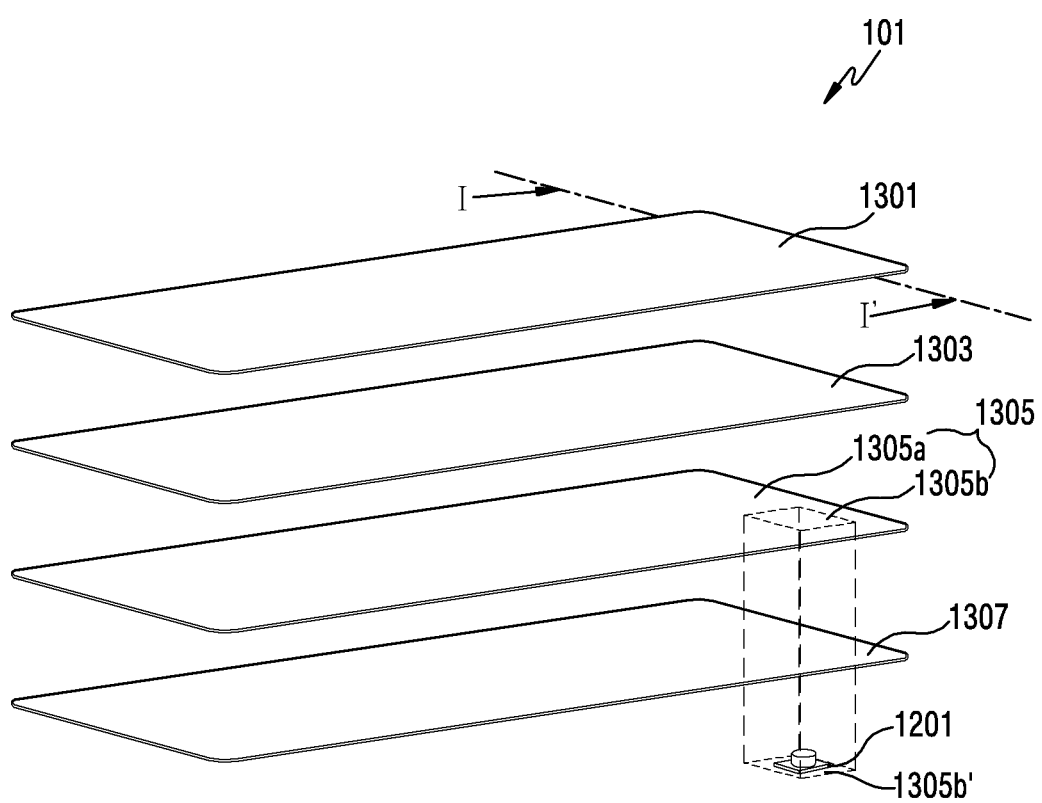
FIG. 13 illustrates an exploded perspective view of an electronic device according to various embodiments.
Figure 14:
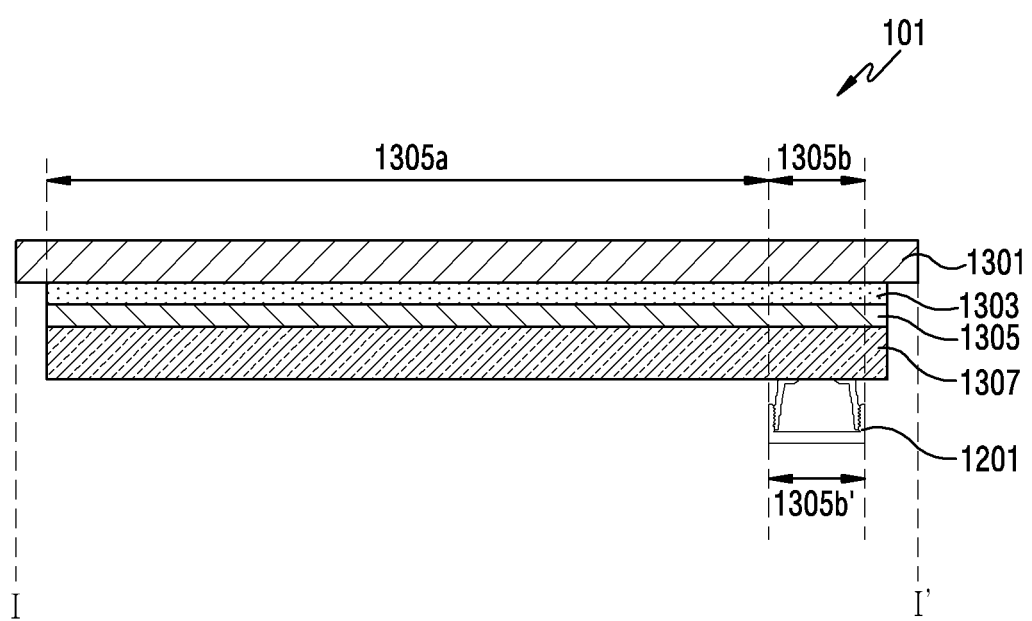
FIG. 14 illustrates a cross-sectional view taken along line I-I' in FIG. 13.

FIG. 13 illustrates an exploded perspective view of an electronic device according to various embodiments. FIG. 14 illustrates a cross-sectional view taken along line I-I' in FIG. 13.

As illustrated in FIGS. 13 and 14, an electronic device 101 according to various embodiments may include a window 1301, an adhesive layer 1303, a polarizing layer (or polarizing plate) 1305, a display 1307, and a sensor 1201.

The window 1301 may be disposed on top of the electronic device 101. The window 1301 may protect various components disposed underneath. The window 1301 can transmit the internal light generated inside the electronic device 101 to the outside. Further, the window 1301 can transmit external light reaching from the outside of the electronic device 101 to the inside of the electronic device 101. The window 1301 may be made of a material excellent in light transmittance, heat resistance, chemical resistance, mechanical strength, and the like. Here, the window 1301 may be a transparent film made of, for example, polyethylene terephthalate or the like, or a glass substrate, or may be a plastic substrate made of acrylonitrile butadiene styrene (ABS), acrylic, polycarbonate (PC), polymethylmethacrylate, polyamide, polyimide, polypropylene, polyurethane or the like. Alternatively, the window 1301 may be made of a variety of high hardness films. When the window 1301 is a high hardness film, the coating of the surface treatment portion may be a hard coating and may have a thickness of 10 to several tens of μm or more.

According to various embodiments, the window 1301 may further include a touch screen capable of sensing a touch generated on the surface. The touch screen may correspond to the touch panel 252 described above with reference to FIG. 2. The touch screen is capable of sensing a touch using, for example, at least one of an electrostatic scheme, a pressure sensitive scheme, an infrared scheme, and an ultrasonic scheme.

Meanwhile, the window 1301 is disposed on the top of the electronic device 101 to protect internal components, thereby constituting a portion of the housing.

The adhesive layer 1303 may be disposed between the window 1301 and the display 1307. The adhesive layer 1303 may be disposed between the window 1301 and the polarizing layer 1305. The adhesive layer 1303 is capable of attaching the window 1301 and the polarizing layer 1305 to each other. The adhesive layer 1303 may have a property of an adhesive. That is, the adhesive layer 1303 may have the property of an adhesive that does not easily fall off once attached. For example, the adhesive layer 1303 may be an Optical Clear Adhesive (OCA) film or an Optical Clear Resin (OCR). Alternatively, the adhesive layer 1303 may have the property of a pressure-sensitive adhesive. That is, the adhesive layer 1303 may have a property of a pressure-sensitive adhesive that can be easily peeled off within a predetermined time even if it is attached once. The adhesive layer 1303 is capable of fixing the window 1301 and the polarizing layer 1305 to each other. Alternatively, the adhesive layer 1303 may maintain the spacing between the window 1301 and the polarizing layer 1305. The adhesive layer 1303 may be in contact with the window 1301 and the polarizing layer 1305. The adhesive layer 1303 is capable of sealing the space between the window 1301 and the display 1307 so as to prevent dust or moisture from entering the space.

However, the embodiment is not limited thereto, and an adhesive layer 1303 may be omitted such that an air gap is formed between the window 1301 and the display 1307.

The polarizing layer 1305 may be disposed under the window 1301. The polarizing layer 1305 may be disposed on the display 1307. The polarizing layer 1305 is capable of turning light, which is incident thereon while vibrating in various directions, into light, which vibrates in only one direction (i.e., polarized light). The polarizing layer 1305 may be an iodine-type polarizing layer or a dye-type polarizing layer. The polarizing layer 1305 may include a first region 1305a and a second region 1305b. The first region 1305a may have a first characteristic for light. The second region 1305b may have a second characteristic for light. The first region 1305a and the second region 1305b may have different properties for light. For example, the first region 1305a may have a first transparency and the second region 1305b may have a second transparency that is higher than the first transparency. Alternatively, the first region 1305a may have a first transmittance for light and the second region 1305b may have a second transmittance that is higher than the first transmittance. The second region 1305b may be formed to have an area corresponding to the size of the sensor 1201 disposed below the polarizing layer 1305. When the electronic device 101 includes a plurality of sensors 1201, the polarization layer 1305 may include second regions 1305b by the number of the sensors 1201.

The display 1307 may correspond to the display 260 described above with reference to FIG. 2. The display 1307 may be disposed under the polarizing layer 1305. The display 1307 is an internal component of the electronic device 101, and is capable of performing a substantial operation in the electronic device 101. The display 1307 is capable of performing a function of displaying an image. The display 1307 may be a variety of displays such as a Liquid Crystal Display (LCD) or an Active Matrix Organic Light-Emitting Diode (AMOLED).

Meanwhile, the display 1307 may include a first substrate and a second substrate.

The first substrate may be disposed on the second substrate. The first substrate may be, for example, a color filter substrate (or color filter glass). The first substrate may include a black matrix, a color filter, or the like. The first substrate may provide internal light transmitted through the display liquid crystal (not illustrated) in a predetermined color. The first substrate may include a plurality of RGB (Red, Green, Blue), RGBG, or RGBW (Red, Green, Blue, and White) pixels so as to cause internal light to emit a predetermined color.

The second substrate may be, for example, a thin film transistor substrate (or TFT glass). The second substrate may include a thin film transistor, a pixel electrode and a common electrode, which are connected to the thin film transistor, and the like. Display liquid crystals (not illustrated) may be interposed between the first substrate and the second substrate. The type of the display 1307 may be determined according to the type of the display liquid crystals. The second substrate is capable of changing the arrangement of display liquid crystals in order to change the light transmittance of internal light transmitted through the light guide plate. The second substrate is capable of transmitting the internal light to the desired shape through the display liquid crystals.

A driving chip (a display driver IC (DDI)) (not illustrated) capable of driving the display 1307 may be disposed on the second substrate. The driving chip may be bonded to the second substrate through an anisotropic conductive film or the like. Such a driving chip may be electrically connected to a flexible printed circuit board.

Various sensors 1201 may be disposed on the rear side of the display 1307. The sensors 1201 may include at least one of a camera device, a proximity sensor, an illuminance sensor, a fingerprint recognition sensor, and a biometric sensor. The sensors 1201 may be disposed in a region 1305b' corresponding to the second region 1305b of the polarizing layer 1305 on the rear side of the display 1307. The sensors 1201 may be aligned with the second region 1305b of the polarizing layer 1305.

Figure 15:
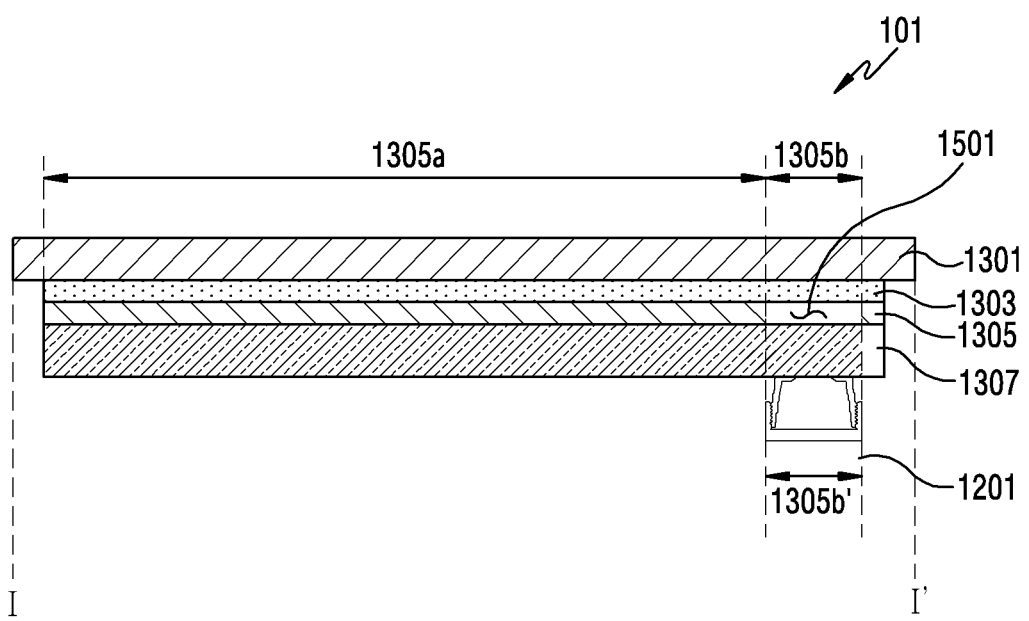
FIGS. 15 to 20 illustrate cross-sectional views of electronic devices according to various embodiments.

FIG. 15 is a cross-sectional view of an electronic device according to various embodiments.

As illustrated in FIG. 15, the second region 1305b may include an opening 1501 formed in a portion of the polarizing layer 1305. That is, the second region 1305b may be the opening 1501. A sensor 1201 may be disposed in a region 1305b' corresponding to the opening 1501. The opening 1501 may be formed to have an area corresponding to the size of the sensor 1201. When the electronic device 101 includes a plurality of sensors 1201, the polarizing layer 1305 may include openings 1501 as many as the number of sensors 1201.

Figure 16:
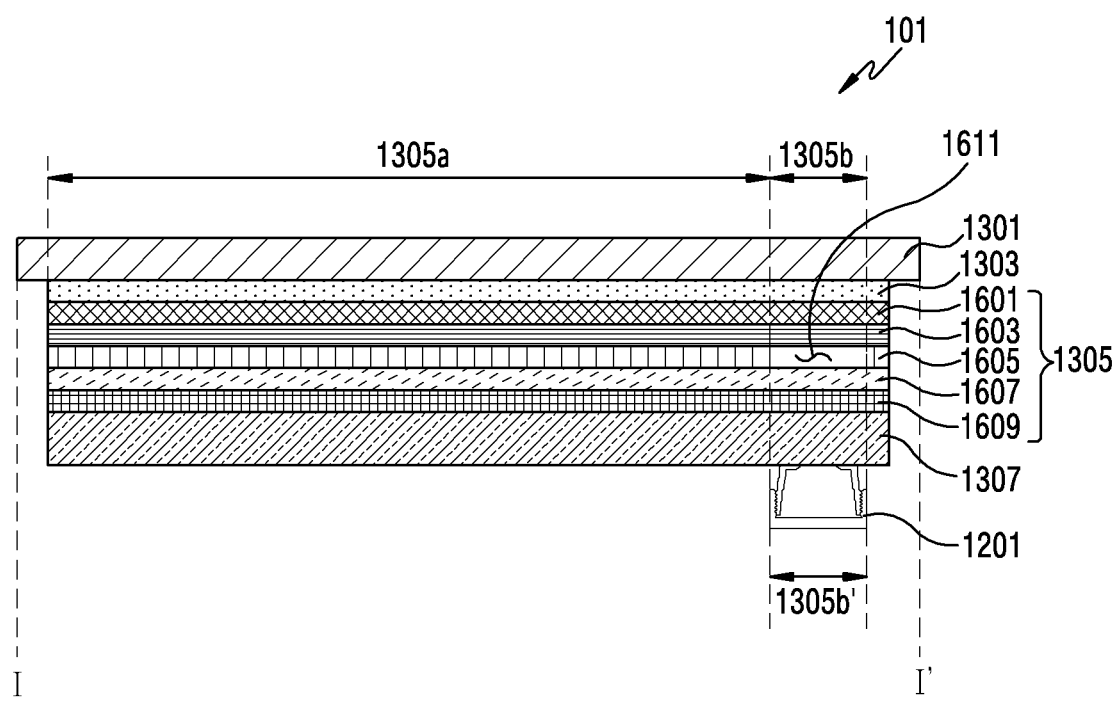

FIG. 16 illustrates a cross-sectional view of an electronic device according to various embodiments.

As illustrated in FIG. 16, the polarizing layer 1305 may include at least one of a first layer 1601, a second layer 1603, a third layer 1605, a fourth layer 1607, and a fifth layer 1609.

The first layer 1601 may be a surface treatment layer. The first layer 1601 may be a surface coating layer. The second layer 1603 may be a protective film. For example, the second layer 1603 may be any one of a tri-acetyl-cellulose (TAC) film and a compensation film. The second layer 1603 may protect various films disposed underneath. Alternatively, the second layer 1603 may adhere the various layers disposed underneath. The third layer 1605 may be a polarizing function layer. The third layer 1605 may be a poly-vinyl-alcohol (PVA) film. The third layer 1605 may function to polarize incident light. The fourth layer 1607 may be a protective film. The fourth layer 1607 may protect the fifth layer 1609. For example, the fourth layer 1607 may be any one of a tri-acetyl-cellulose (TAC) film and a compensation film. Alternatively, the fourth layer 1607 may be a cyclo olefin polymer (COP) film, an acrylic film, or a polypropylene (PP) film. The fifth layer 1609 may be an adhesive film. The fifth layer 1609 may be, for example, a pressure sensitive adhesive (PSA) film.

The first layer 1601, the second layer 1603, the third layer 1605, the fourth layer 1607 and the fifth layer 1609 may be stacked in this order. However, the embodiment is not limited thereto, and the first layer 1601, the second layer 1603, the third layer 1605, the fourth layer 1607 and the fifth layer 1609 may be stacked in various orders.

At least one of the first layer 1601, the second layer 1603, the third layer 1605, the fourth layer 1607, and the fifth layer 1609 has a region including other characteristics for light. That is, at least one of the first layer 1601, the second layer 1603, the third layer 1605, the fourth layer 1607, and the fifth layer 1609 may include a first region 1305*a* and a second region 1305*b*. For example, the third layer 1605 may include a first region 1305*a* and a second region 1305*b*. The first region 1305*a* may have a first transparency, and the second region 1305*b* may have a second transparency that is higher than the first transparency. Alternatively, the first region 1305*a* may have a first transmittance for light and the second region 1305*b* may have a second transmittance that is higher than the first transmittance. Alternatively, the second region 1305*b* may include an opening 1611. Alternatively, the third region 1305*b* may include an opening 1611. The opening 1501 may be formed to have an area corresponding to the size of the sensor 1201.

Figure 17:
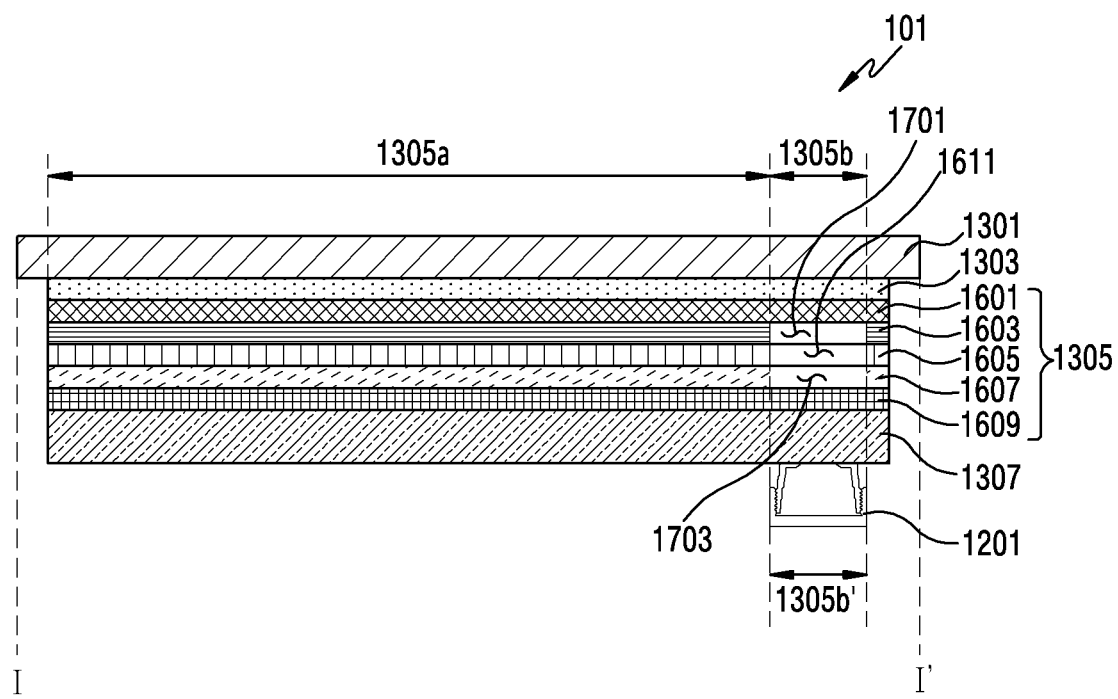

FIG. 17 illustrates a cross-sectional view of an electronic device according to various embodiments.

As illustrated in FIG. 17, the polarizing layer 1305 may include at least one of a first layer 1601, a second layer 1603, a third layer 1605, a fourth layer 1607, and a fifth layer 1609. At least one of the first layer 1601, the second layer 1603, the third layer 1605, the fourth layer 1607, and the fifth layer 1609 has a region including other characteristics for light. That is, at least one of the first layer 1601, the second layer 1603, the third layer 1605, the fourth layer 1607, and the fifth layer 1609 may include a first region 1305*a* and a second region 1305*b*. For example, the second layer 1603, the third layer 1605, the fourth layer 1607 may include a first region 1305*a* and a second region 1305*b*. Alternatively, each of the second layer 1603, the third layer 1605, and the fourth layer 1607 may include an opening. For example, the second region 1603 may include an opening 1701. The third layer 1605 may include a second opening 1611. The fourth layer 1607 may include a third opening 1703. The first opening 1701, the second opening 1611, and the third opening 1703 may be formed to have an area corresponding to the area of the sensor 1201.

Figure 18:
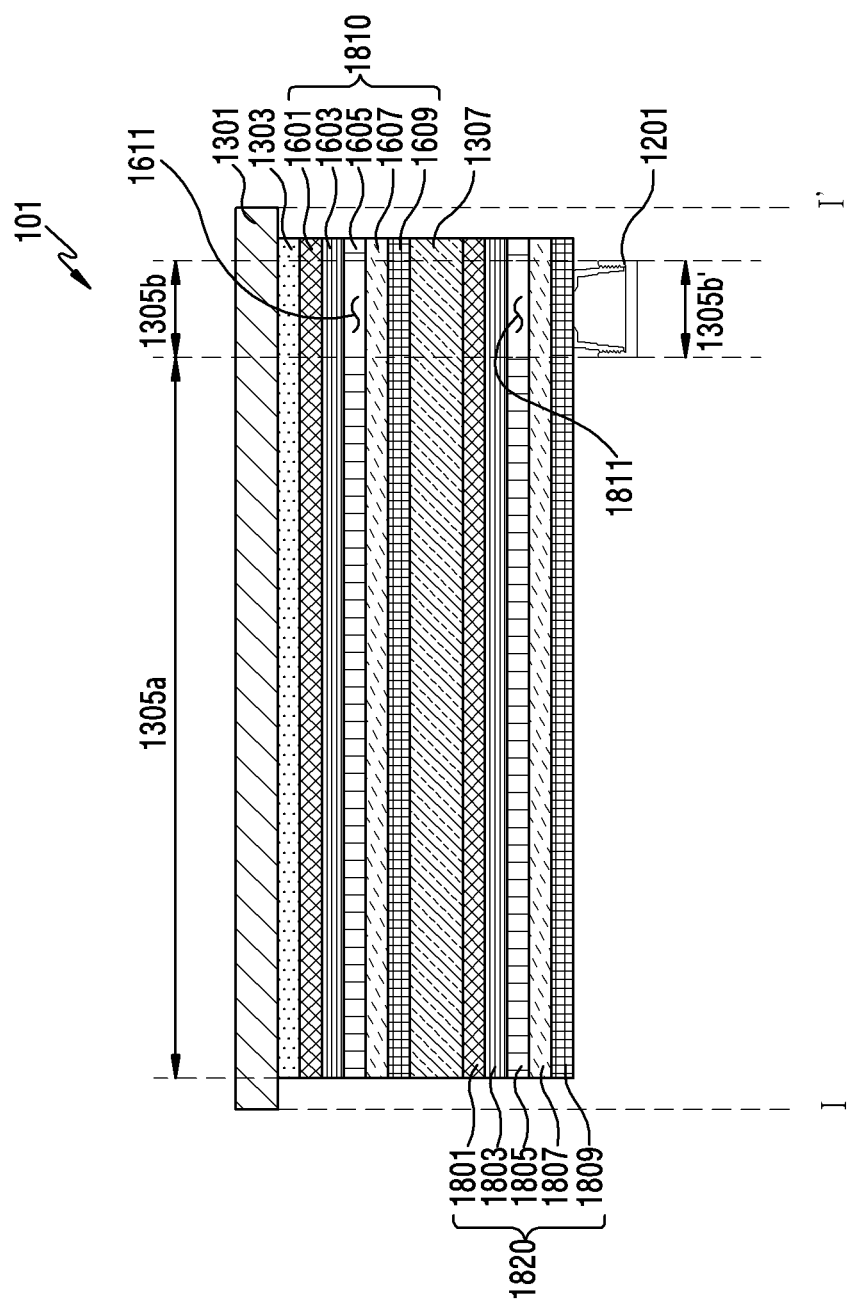

FIG. 18 illustrates a cross-sectional view of an electronic device according to various embodiments.

As illustrated in FIG. 18, the electronic device 101 according to various embodiments may include a first polarizing layer 1810 and a second polarizing layer 1820. In the electronic device 101 according to various embodiments, a polarizing layer may be disposed on each of the upper portion and the lower portion of the display 1307, depending on the type of the display 1307. The first polarizing layer 1810 may include at least one of a first layer 1601, a second layer 1603, a third layer 1605, a fourth layer 1607, and a fifth layer 1609. At least one of the first layer 1601, the second layer 1603, the third layer 1605, the fourth layer 1607, and the fifth layer 1609 may include a first region 1305*a* and a second region 1305*b*. Alternatively, for example, the third layer 1605 may include a first region 1305*a* and a second region 1305*b*. Alternatively, the third layer 1605 may include an opening 1611. Similarly to this, the second polarizing layer 1820 may include at least one of a sixth layer 1801, a seventh layer 1803, an eighth layer 1805, a ninth layer 1807, and a tenth layer 1809. At least one of the sixth layer 1801, the seventh layer 1803, the eighth layer 1805, the ninth layer 1807, and the tenth layer 1809 may include a first region 1305*a* and a second region 1305*b*. For example, the eighth layer 1805 may include a first region 1305*a* and a second region 1305*b*. Alternatively, the eighth layer 1805 may include an opening 1811.

Figure 19:
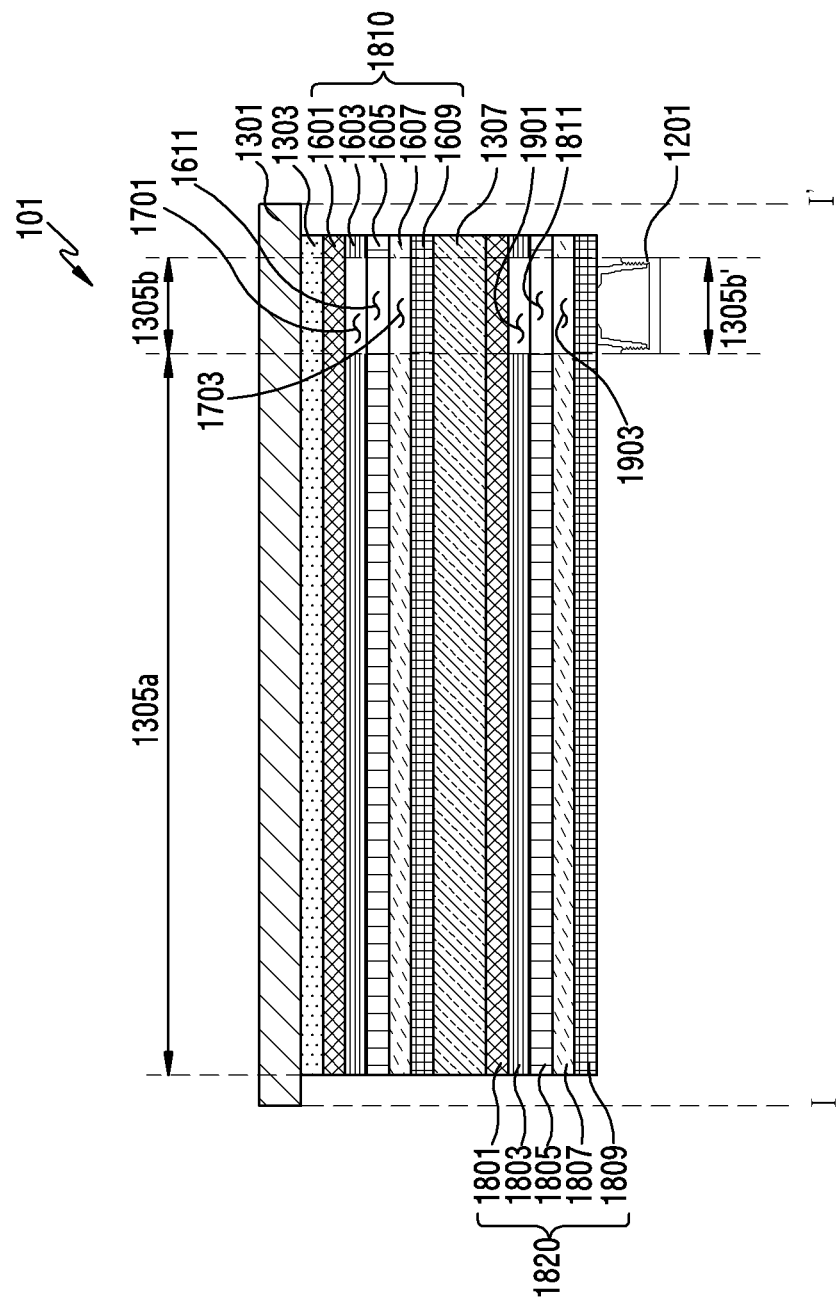

FIG. 19 illustrates a cross-sectional view of an electronic device according to various embodiments.

As illustrated in FIG. 19, the electronic device 101 according to various embodiments may include a first polarizing layer 1810 and a second polarizing layer 1820. The first polarizing layer 1810 and the second polarizing layer 1820 may include a first region 1305*a* and a second region 1305*b*. The first polarizing layer 1810 may include at least one of a first layer 1601, a second layer 1603, a third layer 1605, a fourth layer 1607, and a fifth layer 1609. At least one of the first layer 1601, the second layer 1603, the third layer 1605, the fourth layer 1607, and the fifth layer 1609 may include a first region 1305*a* and a second region 1305*b*. Alternatively, at least one of the first layer 1601, the second layer 1603, the third layer 1604, the fourth layer 1607, and the fifth layer 1609 may include an opening. For example, the second layer 1603, the third layer 1605, the fourth layer 1607 may include a first region 1305*a* and a second region 1305*b*. Alternatively, each of the second layer 1603, the third layer 1605, and the fourth layer 1607 may include an opening. For example, the second region 1603 may include a first opening 1701. The third layer 1605 may include a second opening 1611. The fourth layer 1607 may include a third opening 1703. The first opening 1701, the second opening 1611, and the third opening 1703 may be formed to have an area corresponding to the area of the sensor 1201.

Similarly to this, the second polarizing layer 1820 may include at least one of a sixth layer 1801, a seventh layer 1803, an eighth layer 1805, a ninth layer 1807, and a tenth layer 1809. At least one of the sixth layer 1801, the seventh layer 1803, the eighth layer 1805, the ninth layer 1807, and the tenth layer 1809 may include a first region 1305*a* and a second region 1305*b*. Alternatively, at least one of the sixth layer 1801, the seventh layer 1803, the eighth layer 1807, the ninth layer 1807, and the tenth layer 1809 may include an opening. For example, the seventh layer 1803, the eighth layer 1805, the ninth layer 1807 may include a first region 1305*a* and a second region 1305*b*. Alternatively, each of the seventh layer 1803, the eighth layer 1805, and the ninth layer 1807 may include an opening. For example, the seventh region 1803 may include a fourth opening 1901. The eighth layer 1805 may include a fifth opening 1811. The ninth layer 1807 may include a sixth opening 1903. The fourth opening 1901, the fifth opening 1811, and the sixth opening 1903 may be formed to have an area corresponding to the area of the sensor 1201.

Figure 20:
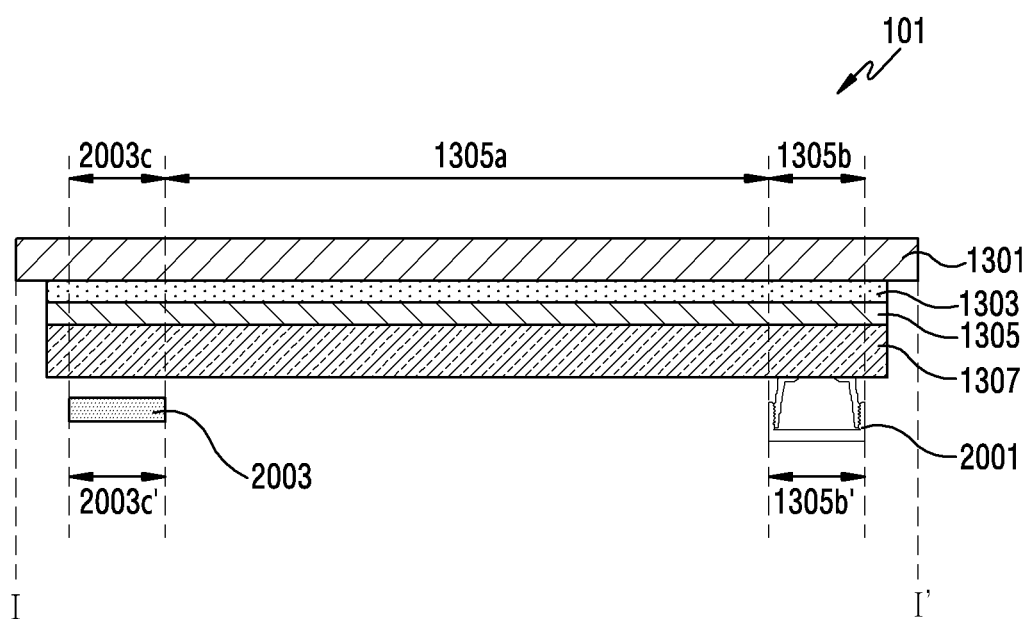

FIG. 20 illustrates a cross-sectional view of an electronic device according to various embodiments.

As illustrated in FIG. 20, the electronic device 101 according to various embodiments may include a first sensor 2001 and a second sensor 2003. For example, the first sensor 2001 may be a camera device. The second sensor 2003 may be at least one of an illuminance sensor, a heart rate sensor (HRM sensor), and an iris sensor. The polarizing layer 1305 may include a first region 1305*a* and second regions 1305*b* and 2003*c*. At this time, the polarizing layer 1305 may include two second regions 1305*b* and 2003*c*. That is, the polarizing layer 1305 may include the second regions 1305*b* and 2003*c* depending on the number of the sensors 2001 and 2003 positioned on the rear side of the display 1307.

Figure 21:
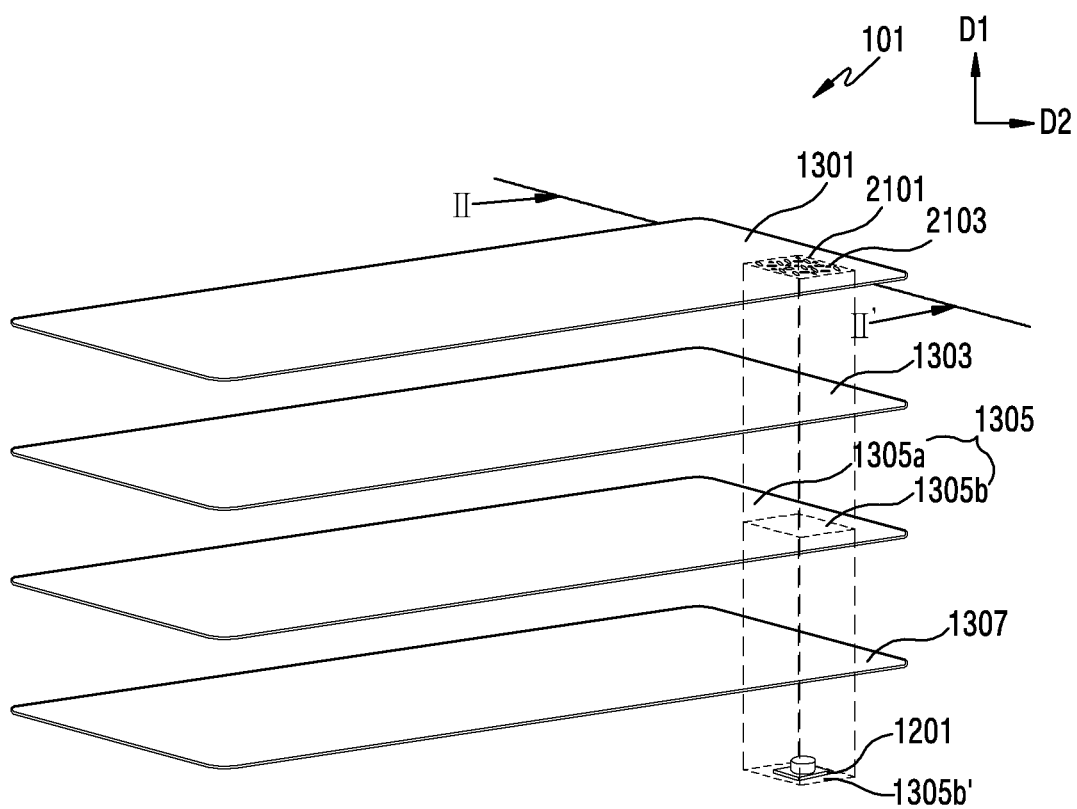
FIG. 21 illustrates an exploded perspective view of an electronic device according to various embodiments.
Figure 22:
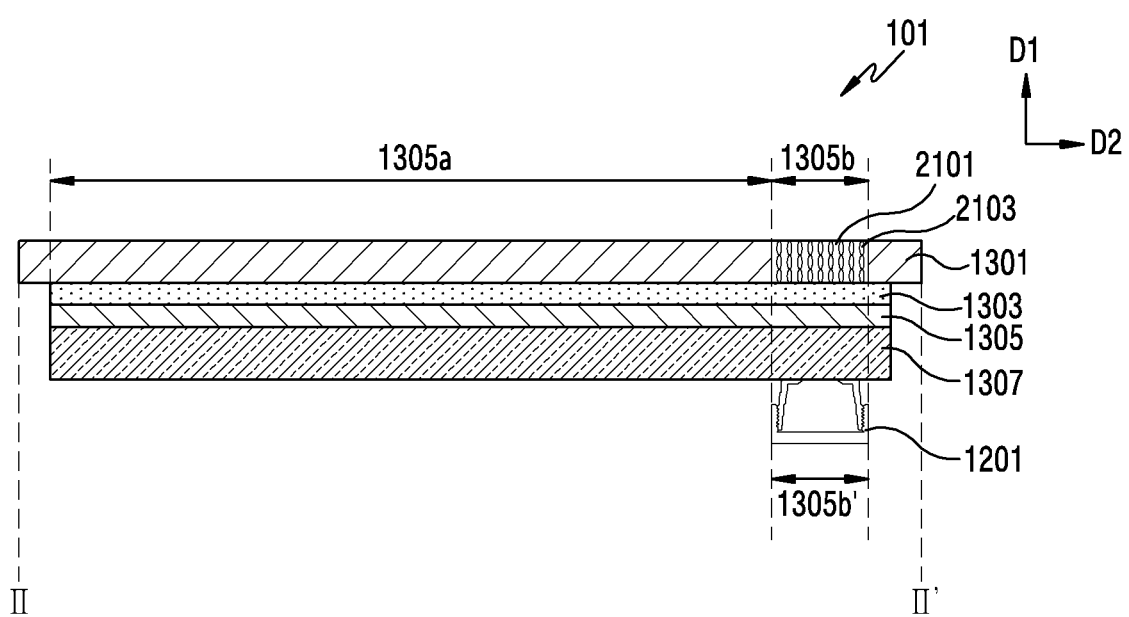
FIGS. 22 to 24 illustrate cross-sectional views taken along line II-II' in FIG. 21.
Figure 23:
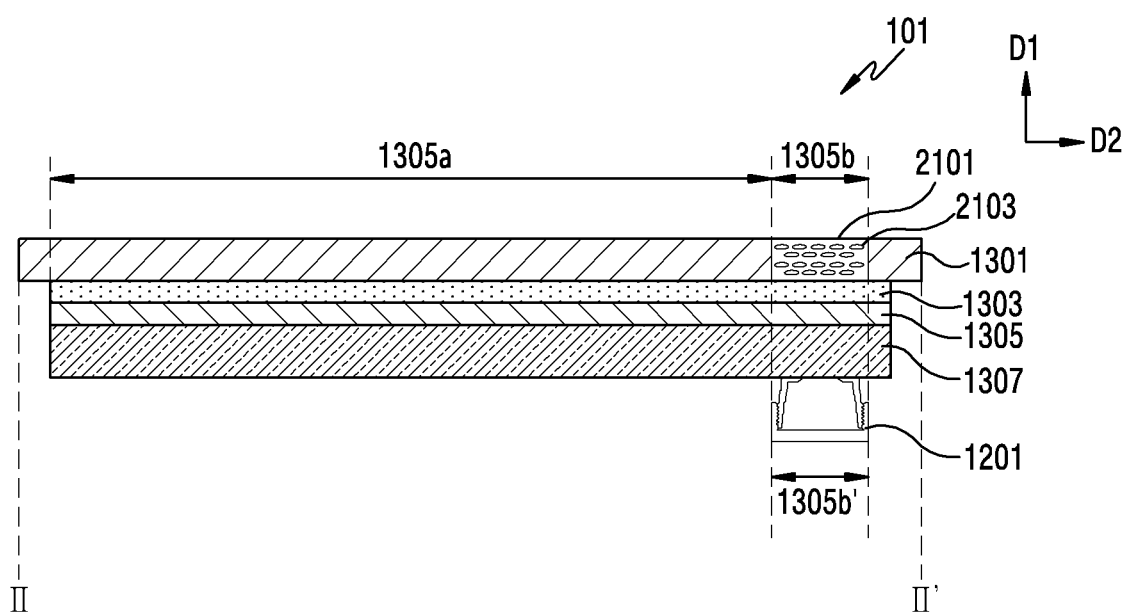
Figure 24:
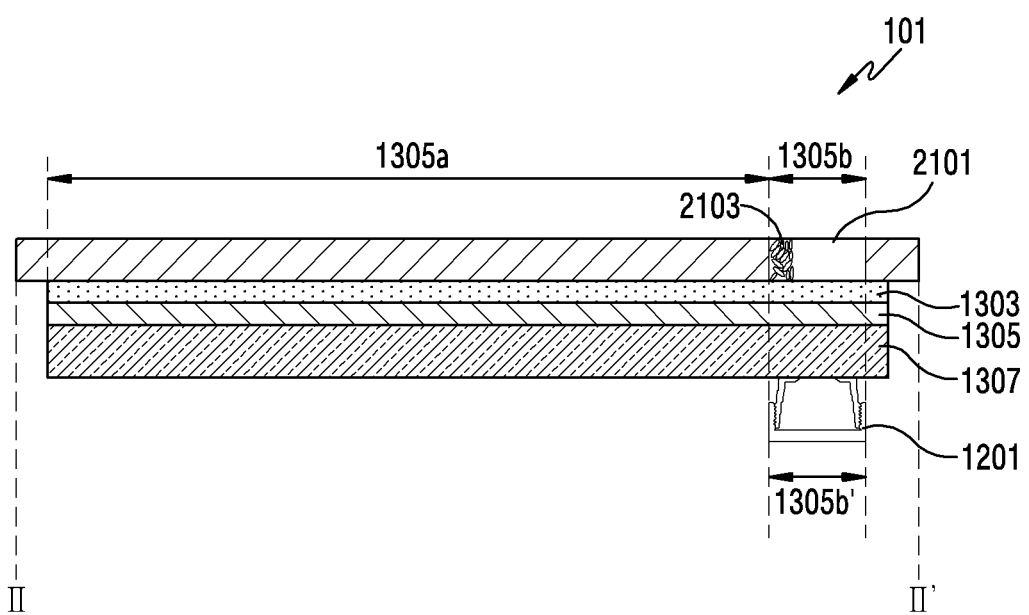

FIG. 21 illustrates an exploded perspective view of an electronic device according to various embodiments. FIGS. 22 to 24 illustrate cross-sectional views taken along line II-II' in FIG. 21.

As illustrated in FIGS. 21 to 23, an electronic device 101 according to various embodiments may include a window 1301, an adhesive layer 1303, a polarizing layer 1305, a display 1307, and a sensor 1201.

The window 1301 may include a third region 2101 corresponding to the second region 1305*b* of the polarizing layer 1305. The third region 2101 may be disposed at a position corresponding to the second region 1305*b*. The third region 2101 may correspond to the region 1305*b*' in which the sensor 1201 is disposed. That is, the third region 2101, the second region 1305*b*, and the region 1305*b*' in which the sensor 1201 is disposed may correspond to each other.

The third region 2101 may include window liquid crystals 2103. The arrangement of window liquid crystals 2103 may vary depending on whether the sensor 1201 is activated or not. The arrangement of window liquid crystals 2103 may vary depending on an electrical signal. For example, as illustrated in 22, when the sensor 1201 disposed on the rear side of the display 1307 is in the activated state, at least some of the window liquid crystals 2103 may be aligned in a first direction D1. At least some of the window liquid crystals 2103 may be aligned in the first direction D1 according to an electrical signal. That is, the window liquid crystals 2103 may be aligned vertically within the window 1301 when the sensor 1201 is in the activated state. Thus, the sensor 1201 may easily receive external light. Meanwhile, as illustrated in FIG. 23, when the sensor 1201 is in an inactivated state, at least some of the window liquid crystals 2103 may be aligned in a second direction D2 that intersects the first direction D1. At least some of the window liquid crystals 2103 may be aligned in the second direction D2 according to an electrical signal. That is, the window liquid crystals 2103 may be aligned in the horizontal direction within the window when the sensor 1201 is in the inactivated state. Alternatively, the window liquid crystals 2103 may be disorderly distributed within the window when the sensor 1201 is in the inactivated state.

Meanwhile, as illustrated in FIG. 24, when the sensor 1201 disposed on the rear side of the display 1307 is in the activated state, the liquid crystals 2103 is movable in either direction. That is, when the sensor 1201 is in the activated state, the liquid crystals 2103 may be arranged only on one side within the window 1301. Thus, a light reception region may be secured within the window 1301.

Figure 25:
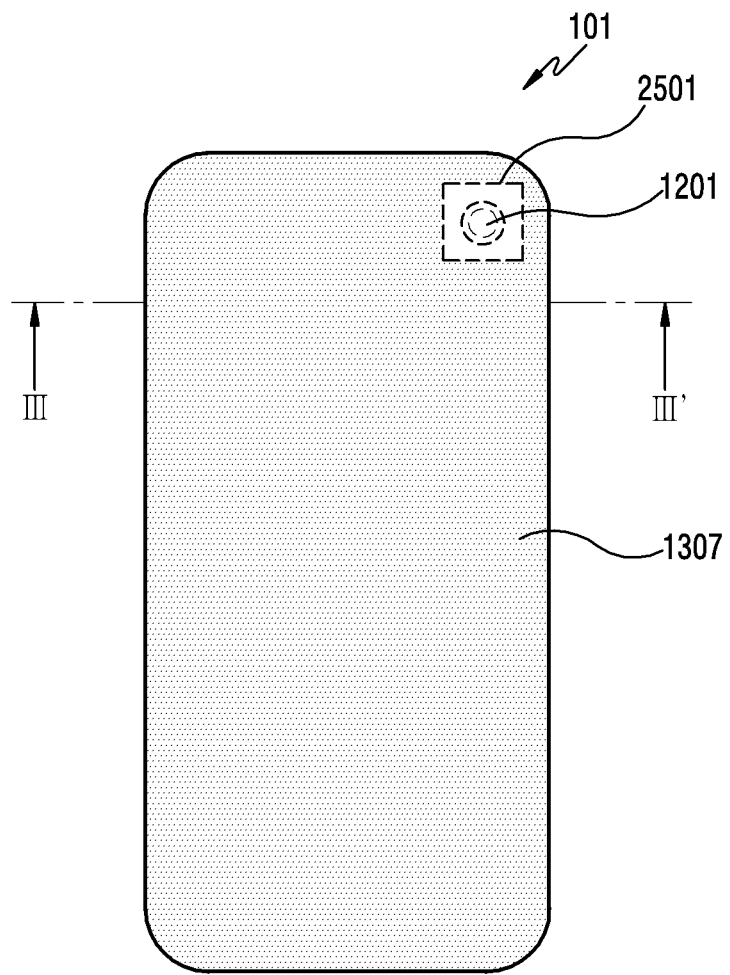
FIG. 25 illustrates a front view of an electronic device according to various embodiments.
Figure 26:
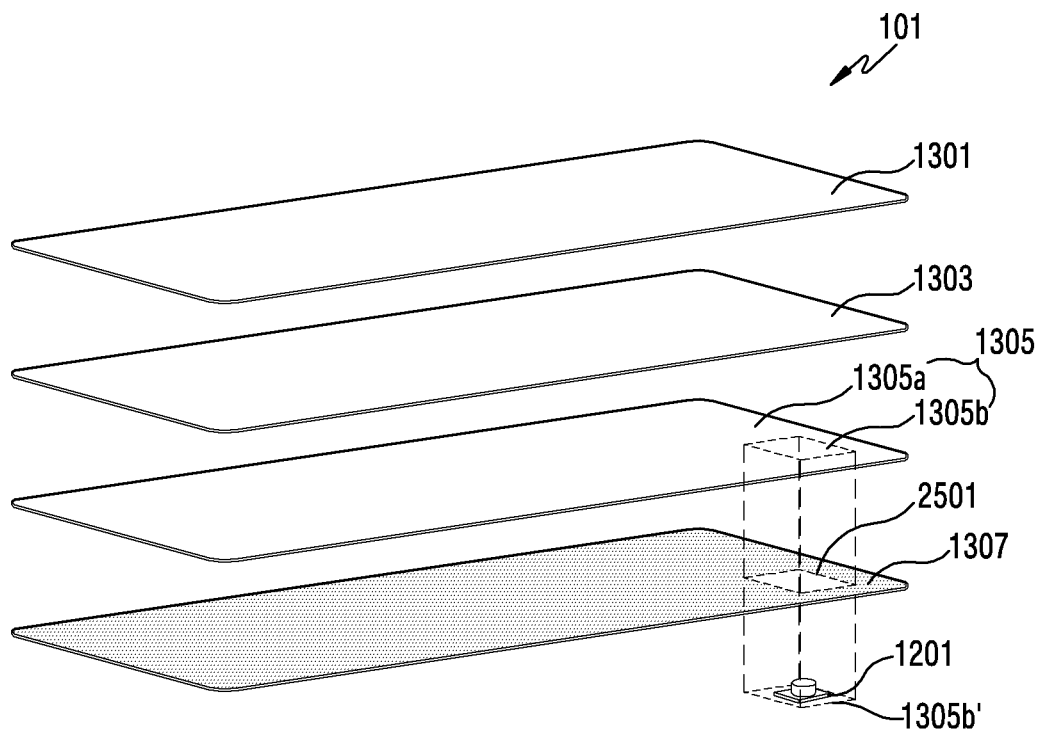
FIG. 26 illustrates an exploded perspective view of an electronic device according to various embodiments.

FIG. 25 illustrates a front view of an electronic device according to various embodiments. FIG. 26 illustrates an exploded perspective view of an electronic device according to various embodiments.

As illustrated in FIGS. 25 and 26, in an electronic device according to various embodiments, at least a partial region of the display 1307 may become transparent when the sensor 1201 is in the activated state. For example, the display 1307 may include a fourth region 2501 corresponding to the second region 1305*b* of the polarizing layer 1305. The fourth region 2501 may be disposed at a position corresponding to the second region 1305*b*. The fourth region 2501 may correspond to a region 1305*b*' in which the sensor 1201 is disposed. That is, the second region 1305*b*, the fourth region 2501, and the region 1305*b*' in which the sensor 1201 is disposed may correspond to each other. When the sensor 1201 is in the activated state, the fourth region 2501 may be displayed to be transparent. When the sensor 1201 is in the activated state, the fourth region 2501 in the display 1307 may be set to be transparent.

Meanwhile, according to various embodiments, a screen, which is corrected according to the amount of light introduced into the sensor 1201 in the display 1307, may be displayed on the display 1409. That is, the display 1409 is capable of driving pixels RGB such that the amount of light introduced into the sensor 1201 is corrected and displayed. At this time, the screen displayed in the fourth region 2501 of the display 1409 may be corrected.

Meanwhile, according to various embodiments, when the sensor 1201 is in the activated state, at least some of the window liquid crystals 2103 may be aligned in the first direction D1, and at the same time, at least a partial region of the display 1307 may be made to be transparent. Therefore, the light reception efficiency of the sensor 1201 can be further improved.

Figure 27A:
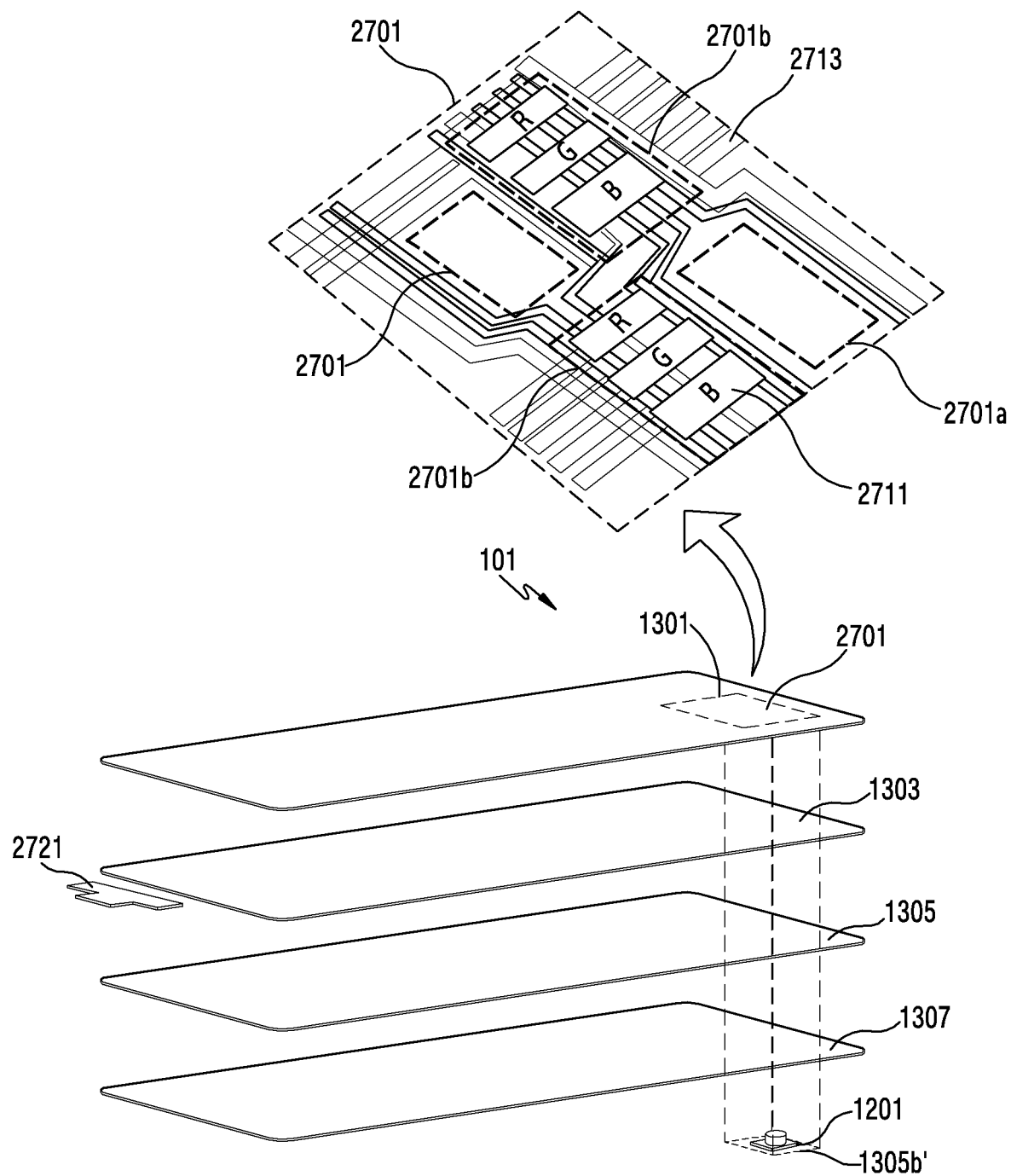
FIG. 27A illustrates an exploded perspective view of an electronic device according to various embodiments.
Figure 27B:
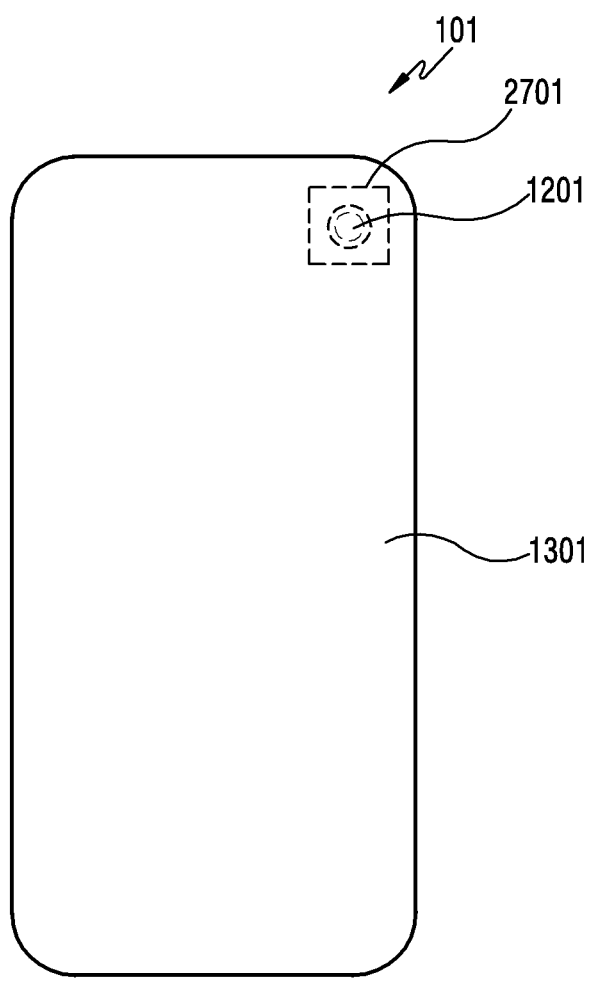
FIGS. 27B and 27C illustrate front views of electronic devices according to various embodiments.
Figure 27C:
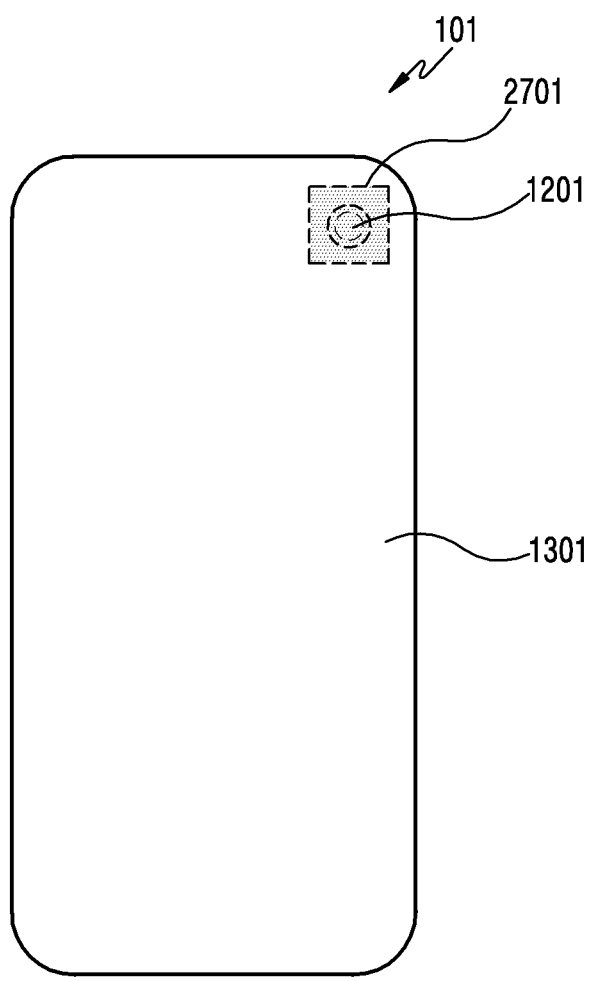

FIG. 27A illustrates an exploded perspective view of an electronic device according to various embodiments. FIGS. 27B and 27C illustrate front views of electronic devices according to various embodiments.

As illustrated in FIGS. 27A to 27C, the window 1301 may include a fifth region 2701. The fifth region 2701 may be a partial region of the window 1301. The fifth region 2701 may be a region corresponding to a region in which the sensor 1201 is disposed. Alternatively, the fifth region 2701 may be a region including the region in which the sensor 1201 is disposed. The light reception efficiency of the sensor 1201 disposed along the fifth region 2701 may be secured in various embodiments.

The fifth region 2701 may include color filters 2711. For example, the fifth region 2701 may include a first transmissive region 2701*a* and a first color filter region 2701*b*.

The first transmissive region 2701*a* may be a region in which the color filters 2711 and driving wiring 2713 for driving the color filters 2711 are not disposed. The first transmissive region 2701*a* may be an open region in the window 1301. For example, the first transmissive region 2701*a* may be an opening or a hole formed in the window 1301.

The first color filter region 2701*b* may be a region in which the color filters 2711 and the driving wiring 2713 for driving the color filters are disposed. The first color filter region 2701*b* may be disposed adjacent to the first transmissive region 2701*a*. The color filters 2711 may be driven depending on a color of a screen displayed on the display 1305. The color filters 2711 may implement a color similar to the color of the screen displayed on the display 1305.

Alternatively, the color filters 2711 may implement a color similar to the color of a bezel or a black matrix in the window 1301. Therefore, the first transmissive region 2701*a* may be prevented from being visually recognized from the outside through the first color filter region 2701*b*.

The color filters 2711 of the first color filter region 2701*b* of the window 1301 may be driven depending on whether the sensor 1201 is activated or not. For example, as illustrated in FIG. 27B, when the sensor 2302 disposed on the rear side of the window 1301 is in the activated state, the color filters 2711 may not be driven. Therefore, a portion of the fifth region 2701 may be visually recognized. Through this, the sensor 1201 is capable of easily receiving an external light without the influence of light by the color filter 2711. When the sensor 1201 is in the inactivated state, the color filters 2711 are driven as illustrated in FIG. 27C, thereby implementing a color in which the fifth region 2701 is not visually recognized.

However, the embodiment is not limited thereto, and the color filters 2711 may be driven regardless of whether the sensor 1201 is activated or not. For example, the color filters 2711 may be continuously driven. When the color filters 2711 are continuously driven, it is possible to prevent the first transmissive region 2701*a* from being visually recognized regardless of whether the sensor 1201 is activated or not. At this time, the thickness of the color filters 2711 may be smaller than the thickness of the color filters of the display 1305. When the thickness of the color filters 2711 is reduced, the influence of light introduced from the color filters 2711 into the sensor 1201 can be reduced even if the color filters 2711 are driven in the state in which the sensor 1201 is activated.

The electronic device 101 may further include a circuit board 2721 for driving the color filters 2711 and the driving wiring 2713. The circuit board 2721 may include a printed circuit, a connector, and the like in order to transmit driving signals to the color filters 2711 and the driving wiring 2713.

Figure 28A:
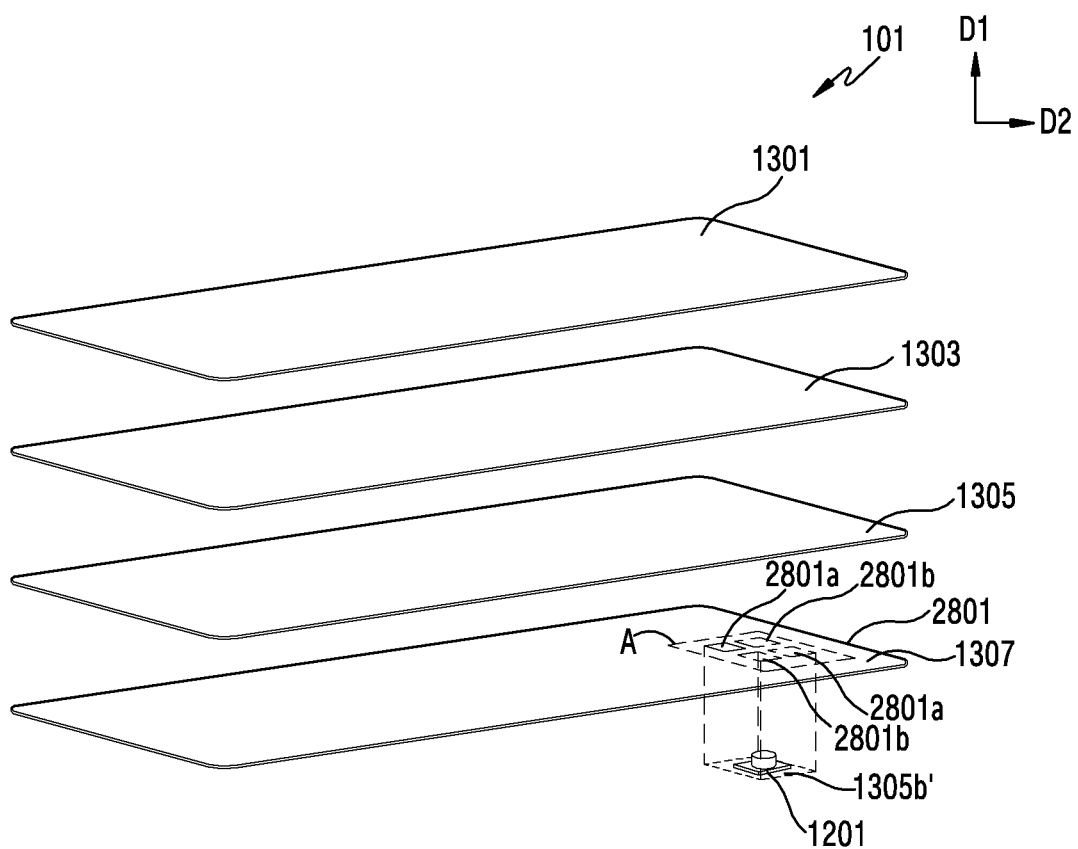
FIG. 28A illustrates an exploded perspective view of an electronic device according to various embodiments.
Figure 28B:
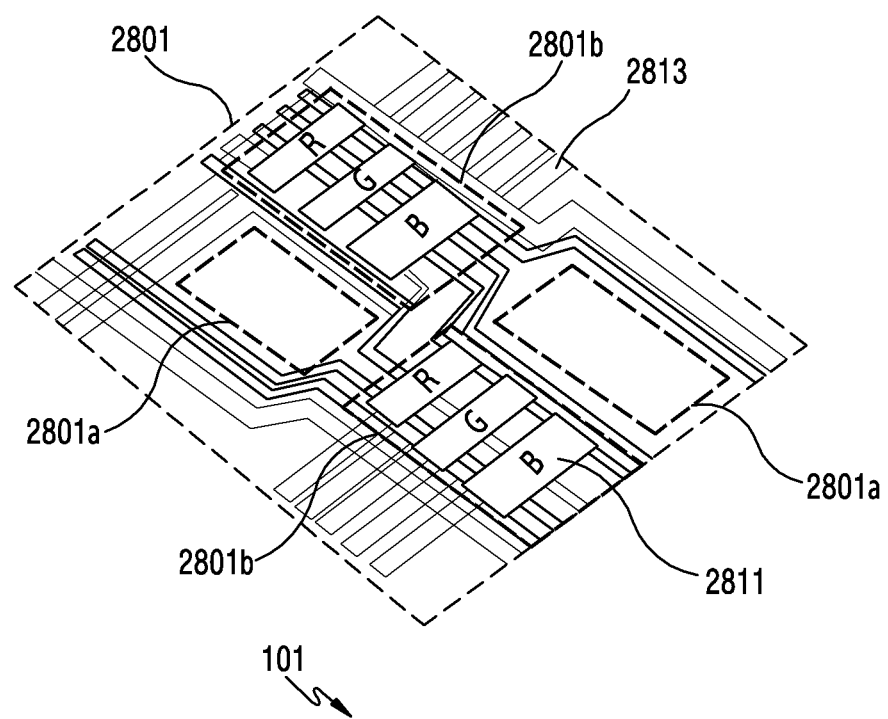
FIG. 28B illustrates an enlarged view illustrating a portion "A" in FIG. 28A in an enlarged scale.
Figure 28C:
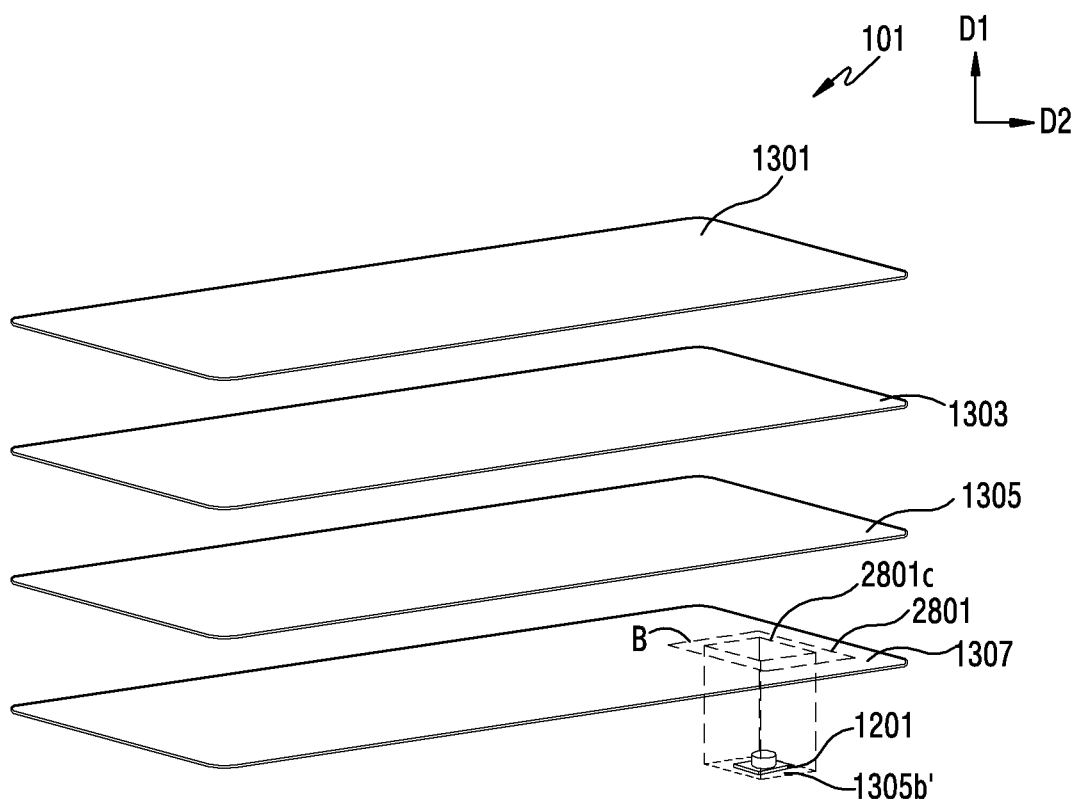
FIG. 28C illustrates an exploded perspective view of an electronic device according to various embodiments.
Figure 28D:
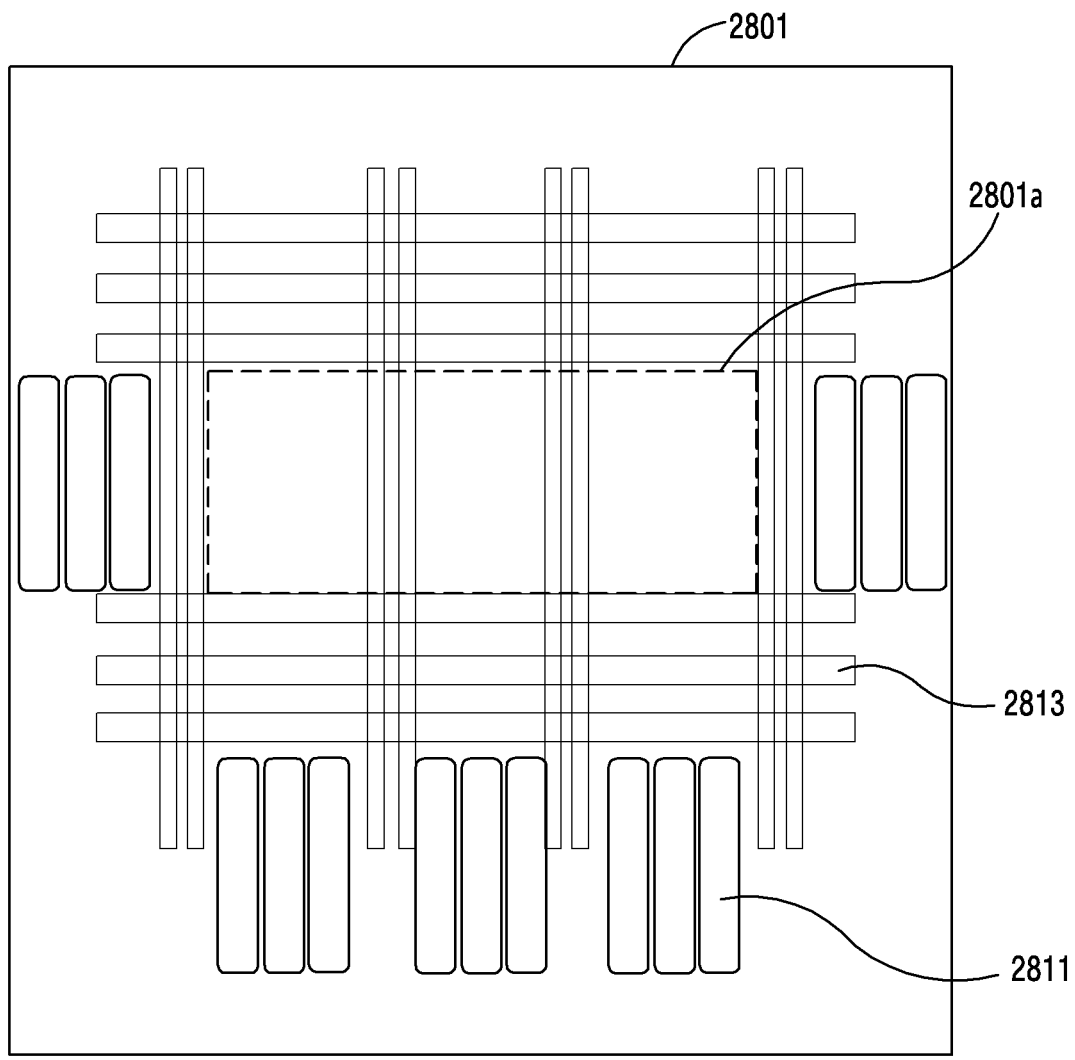
FIG. 28D illustrates an enlarged view illustrating a portion "B" in FIG. 28C in an enlarged scale.

FIG. 28A illustrates an exploded perspective view of an electronic device according to various embodiments. FIG. 28B illustrates an enlarged view illustrating a portion "A" in FIG. 28A in an enlarged scale. FIG. 28C illustrates an exploded perspective view of an electronic device according to various embodiments. FIG. 28D illustrates an enlarged view illustrating a portion "B" in FIG. 28C in an enlarged scale.

As illustrated in FIGS. 28A and 28B, the display 1307 may include a sixth region 2801. The sixth region 2801 may be a partial region of the window 1307. The sixth region 2801 may be a region corresponding to the region in which the sensor 1201 is disposed. Alternatively, the sixth region 2801 may be a region including the region in which the sensor 1201 is disposed. The light reception efficiency of the sensor 1201 disposed along the sixth region 2801 may be secured in various embodiments.

The sixth region 2801 may include a first transmissive region 2801a and a first color filter region 2801b.

The first transmissive region 2801a may be a region in which color filters 2811 and driving wiring 2813 for driving the color filters 2811 are not disposed. The first transmissive region 2701a may be an open region in the window 1307. For example, the first transmissive region 2701a may be a hole formed in the window 1307.

The second color filter region 2801b may be a region in which the color filters 2711 and the driving wiring 2713 for driving the color filters are disposed.

When the electronic device 101 is viewed from above, the sensor 1201 may be arranged to overlap the second transmissive region 2801a. When viewed from above, the sensor 1201 may be arranged to overlap a portion of the second color filter region 2801b. In various embodiments, the light reception efficiency of the sensor 1201 may be secured through the second transmissive region 2801a. Meanwhile, the thickness of the color filters 2811 of the second color region 2801b may be smaller than the thickness of the color filters disposed in the other regions of the display 1305. When the thickness of the color filters 2811 of the second color filter area 2801b is reduced, it is possible to reduce the influence of light introduced from the color filter 2811 into the sensor 1201.

As illustrated in FIGS. 28C and 28D, the display 1307 may include a sixth region 2801, and the sixth region 2801 may include a third transmissive region 2801c. The third transmissive region 2801c may be a region in the color filters 2811 are not disposed.

When the electronic device 101 is viewed from above, the sensor 1201 may be disposed in the third transmissive region 2801c. The sensor 1201 may be disposed in the third transmissive region 2801c. That is, the region corresponding to the region in which the sensor 1201 is disposed on the display 1307 may not include the color filters 2811.

Figure 29A:
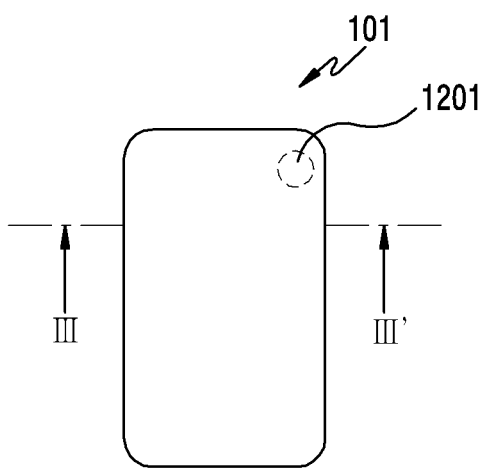
FIG. 29A illustrates a front view of an electronic device according to various embodiments.

FIG. 29A illustrates a front view of an electronic device according to various embodiments. FIGS. 29B to 29I illustrate cross-sectional views taken along line III-III' in FIG. 29A.

Figure 29B:
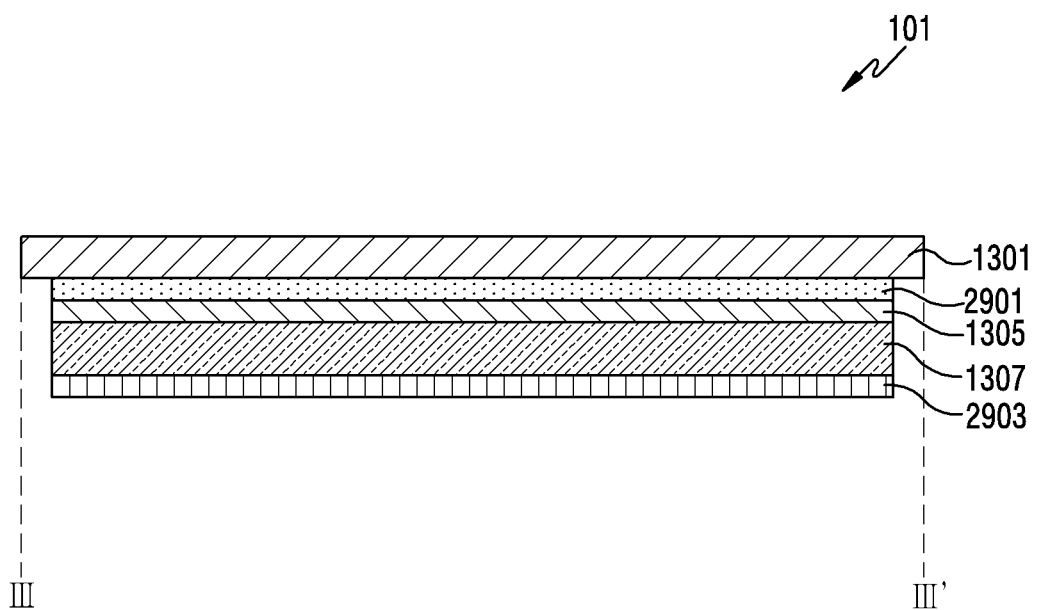
FIGS. 29B to 29I illustrate cross-sectional views taken along line III-III' in FIG. 29A.

As illustrated in FIG. 29B, the electronic device 101 according to various embodiments may include a window 1301, a touch screen 2901, a polarizing layer 1305, a display 1307, and a pressure sensor 2903. In various embodiments, a physical key may be replaced by the pressure sensor 2903. That is, since the display 1307 is disposed on the front side of the electronic device 101, the existing physical key may be omitted, and the physical key may be replaced by the pressure sensor 2903. The pressure sensor 2903 may be provided variously in terms of shape, size, number, or the like. The pressure sensor 2903 may be transparently provided so as not to be visually recognized from the outside. Alternatively, the pressure sensor 2903 may be opaque. At this time, the pressure sensor 2903 may be disposed on the rear side of the display 1307.

Figure 29C:
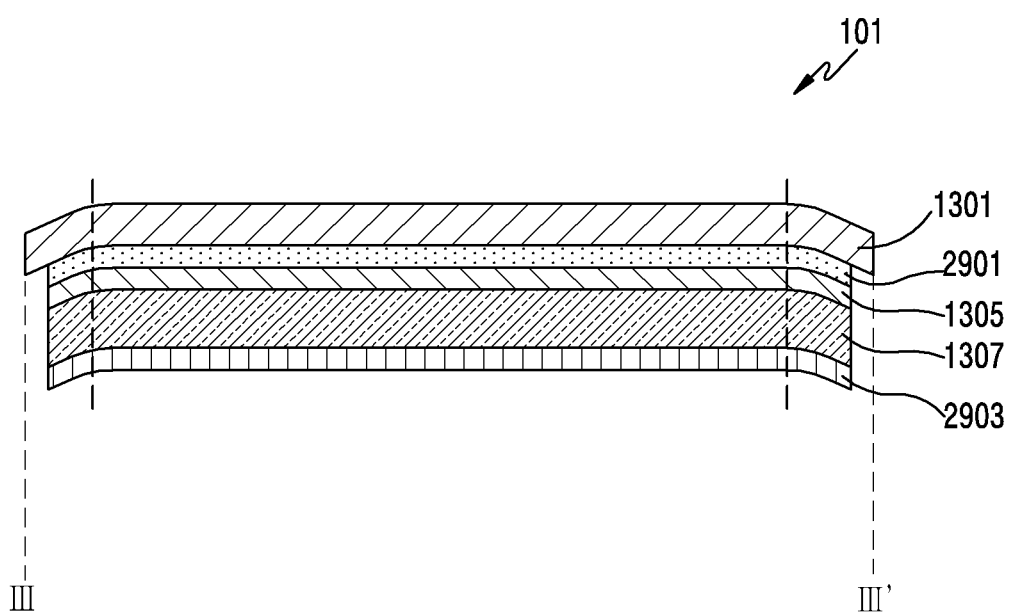

According to various embodiments, at least one side of each of the window 1301, the touch screen 2901, the polarizing layer 1305, the display 1307, and the pressure sensor 2903 may have a bendable shape, as illustrated in FIG. 29C. The one side of each of the window 1301, the touch screen 2901, the polarizing layer 1305, the display 1307, and the pressure sensor 2903 may be bent from the front side. The window 1301, the touch screen 2901, the polarizing layer 1305, the display 1307, and the pressure sensor 2903 may include a curved face. At least one side of each of the window 1301, the touch screen 2901, the polarizing layer 1305, the display 1307, and the pressure sensor 2903 may include a curved face.

Figure 29D:
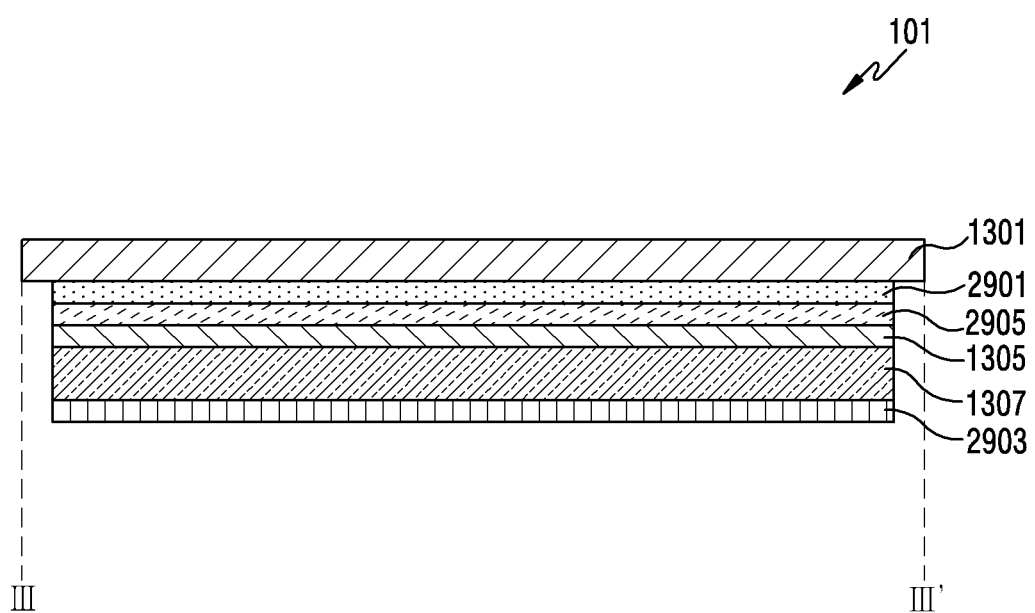

As illustrated in FIG. 29D, the touch screen 2901 may be integrally formed on the window 1301. That is, the components of the touch screen 2901 may be formed on the window 1301. The polarizing layer 1305 and the display 1307 may be disposed under the window 1301 having the touch screen 2901 formed integrally therewith. The window 1301 and the display 1307 may be attached to each other by an adhesive unit 2905. The window 1301 and the polarizing layer 1305 may be attached to each other by the adhesive unit 2905. The pressure sensor 2903 may be disposed under the display 1307.

Figure 29E:
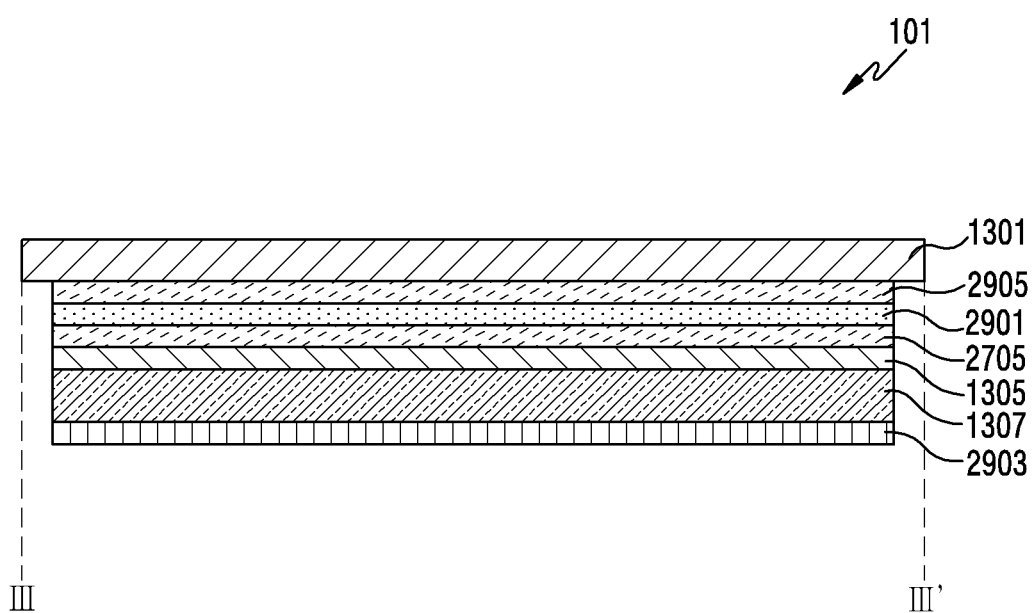

Alternatively, as illustrated in FIG. 29E, a touch screen 2901 may be separately disposed under the window 1301, and the window 1301 and the touch screen 2901 may be attached to each other by the adhesive unit 2905. The polarizing layer 1305 and the display 1307 may be disposed under the touch screen 2901. The touch screen 2901 and the display 1307 may be disposed by an adhesive portion 2905. The touch screen 2901 and the polarizing layer 1305 may be attached to each other by the adhesive unit 2905. The pressure sensor 2903 may be disposed under the display 1307.

Figure 29F:
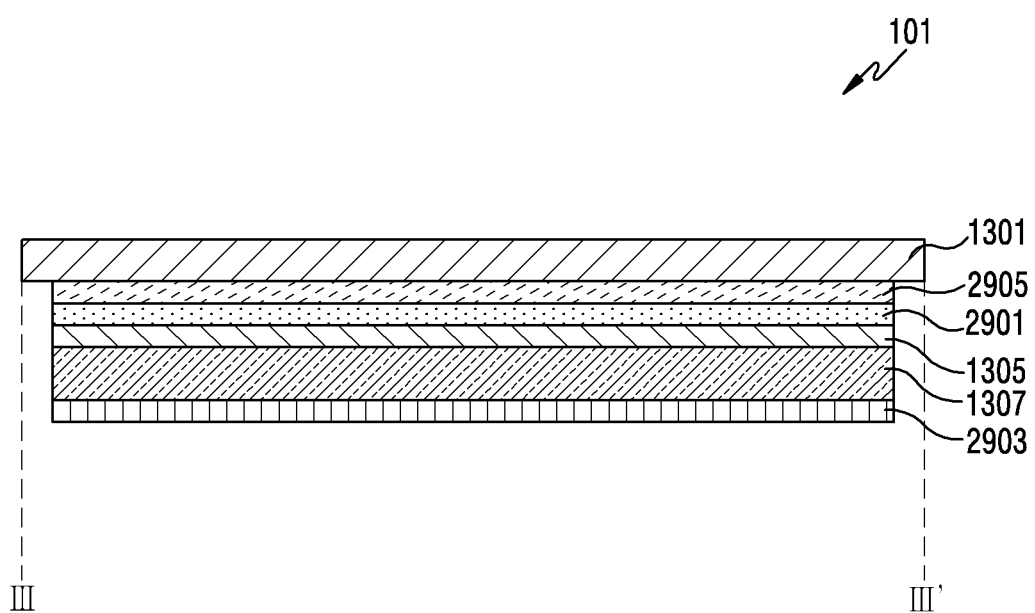

Alternatively, as illustrated in FIG. 29F, the touch screen 2901 may be integrally formed on the window 1307. That is, the components of the touch screen 2901 may be formed on the display 1307. The window 1301 and the display 1307 integrated with the touch screen 2901 may be attached to each other by the adhesive unit 2905. The pressure sensor 2903 may be disposed under the display 1307.

Figure 29G:
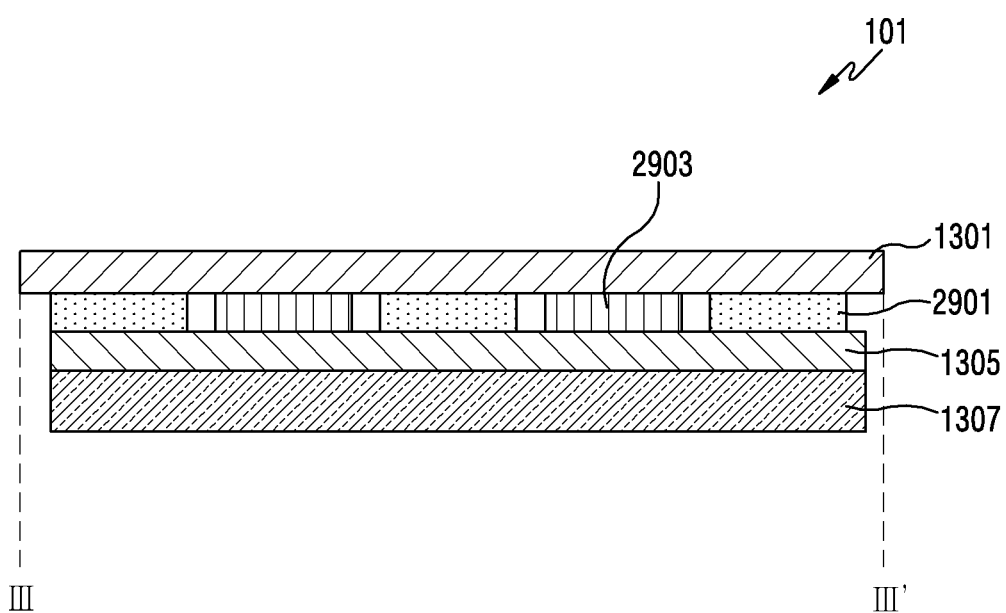

Alternatively, as illustrated in FIG. 29G, the pressure sensor 2903 and the touch screen 2901 may be disposed on the same layer. For example, the components of the pressure sensor 2903 and the touch screen 2901 may be formed on the display 1307. That is, the pressure sensor 2903 and the touch screen 2901 may be integrally formed on the display 1307. The components of the pressure sensor 2903 and the touch screen 2901 may be arranged alternately.

Figure 29H:
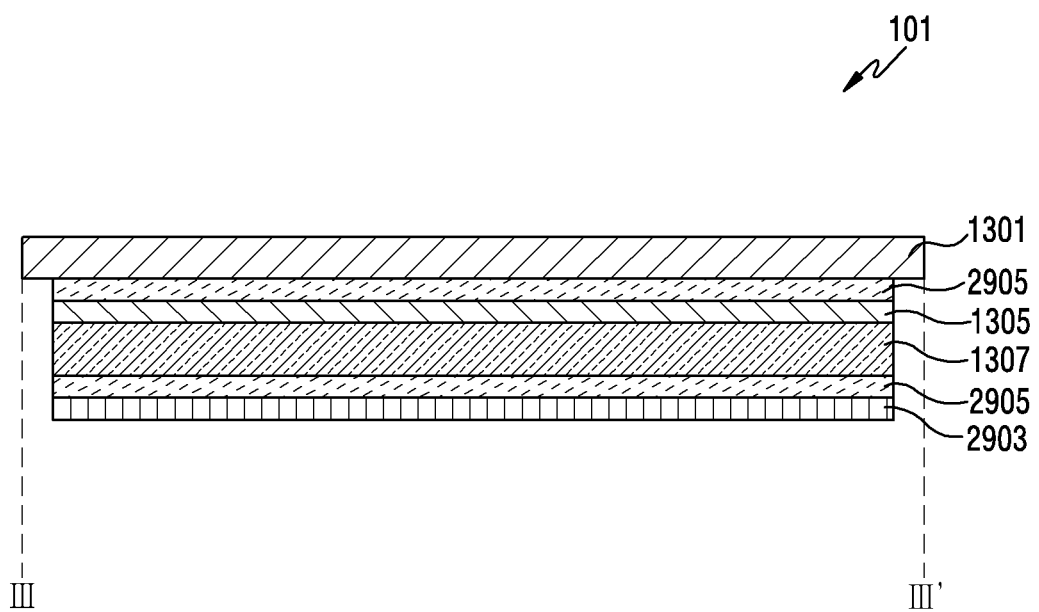

Alternatively, as illustrated in FIG. 29H, a touch screen may be disposed in the display 1307. That is, the components of the touch screen may be embedded in the display 1307. The window 1301 and the display 1307 integrated with the touch screen may be attached to each other by the adhesive unit 2905. The pressure sensor 2903 may be disposed under the display 1307. The window 1307 and the pressure sensor 2903 may be attached to each other by the adhesive unit 2905.

Figure 29I:
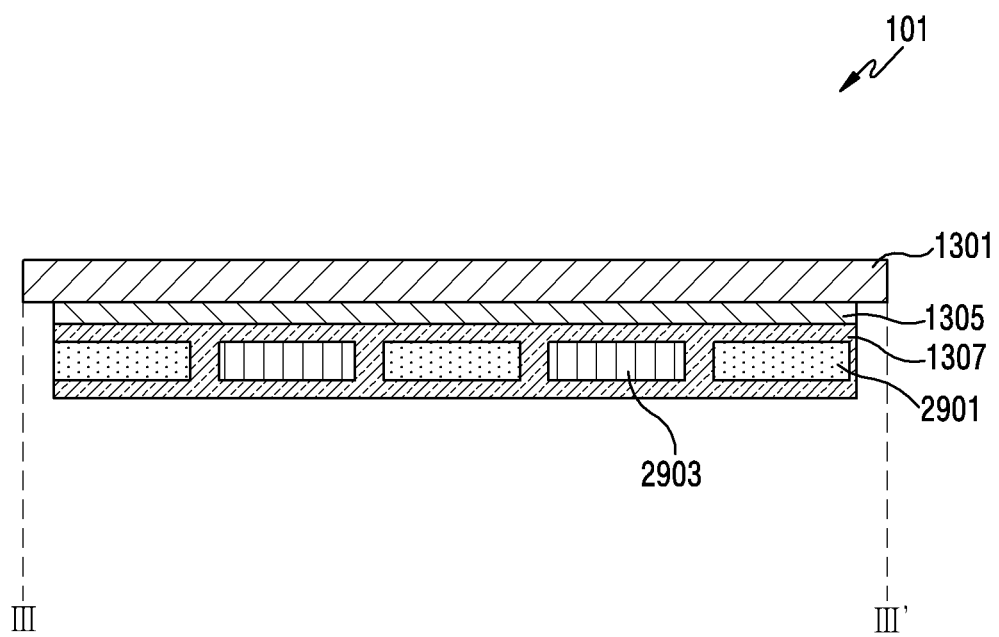

Alternatively, as illustrated in FIG. 29I, the pressure sensor 2903 and the touch screen 2901 may be disposed in the display 1307. That is, the components of the pressure sensor 2903 and the touch screen 2901 may be embedded in the display 1307. Through this, it is possible to reduce the thickness of the electronic device 101.

Figure 30A:
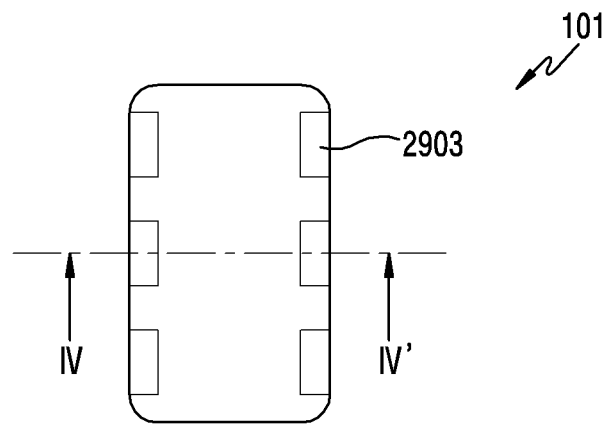
FIG. 30A illustrates a front view of an electronic device according to various embodiments.

FIG. 30A illustrates a front view of an electronic device according to various embodiments. FIGS. 30B to 30E illustrate cross-sectional views taken along line IV-IV' in FIG. 30A.

Figure 30B:
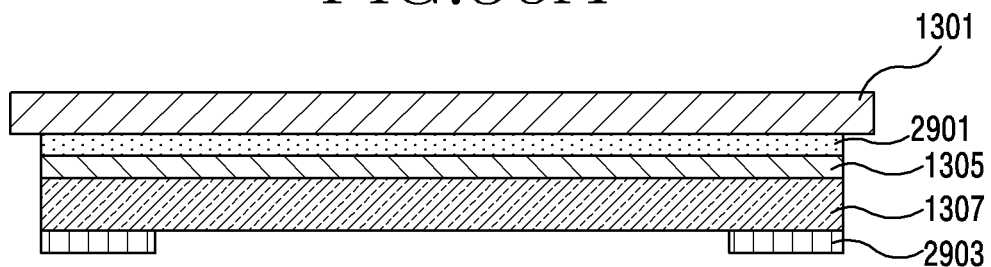
FIGS. 30B to 30E illustrate cross-sectional views taken along line IV-IV' in FIG. 30A.

As illustrated in FIG. 30A, the pressure sensor 2903 may be disposed in a partial region of the electronic device 101. For example, the pressure sensor 2903 may be disposed on a lateral side of the electronic device 101. As illustrated in FIG. 30B, the electronic device 101 according to various embodiments may include a window 1301, a touch screen 2901, a polarizing layer 1305, a display 1307, and a pressure sensor 2903. In various embodiments, a physical key may be replaced by the pressure sensor 2903 in the lateral side of the electronic device 101.

Figure 30C:
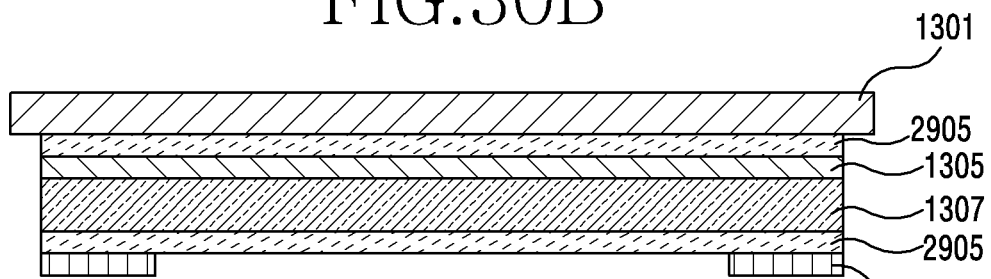

As illustrated in FIG. 30C, a touch screen may be disposed in the display 1307. That is, the components of the touch screen may be embedded in the display 1307. The window 1301 and the display 1307 integrated with the touch screen may be attached to each other by the adhesive unit 2905. The pressure sensor 2903 may be disposed under the display 1307. The window 1307 and the pressure sensor 2903 may be attached to each other by the adhesive unit 2905.

Figure 30D:
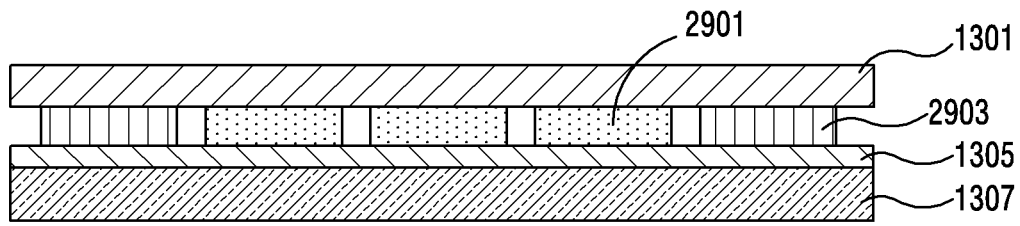

As illustrated in FIG. 30D, the pressure sensor 2903 and the touch screen 2901 may be disposed on the same layer. For example, the components of the pressure sensor 2903 and the touch screen 2901 may be formed on the display 1307. That is, the pressure sensor 2903 and the touch screen 2901 may be integrally formed on the display 1307.

Figure 30E:
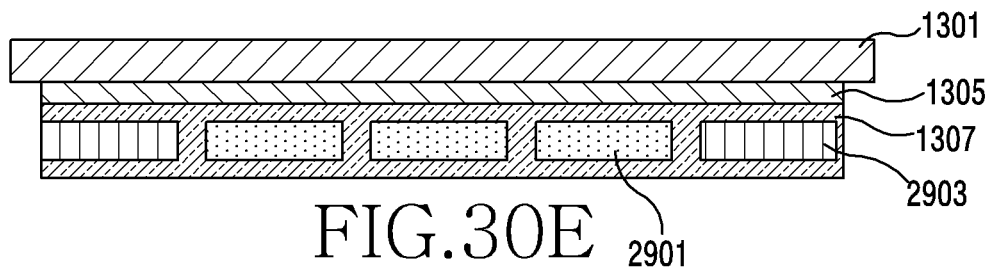

As illustrated in FIG. 30E, the pressure sensor 2903 and the touch screen 2901 may be disposed in the display 1307. That is, the components of the pressure sensor 2903 and the touch screen 2901 may be embedded in the display 1307.

Figure 31:
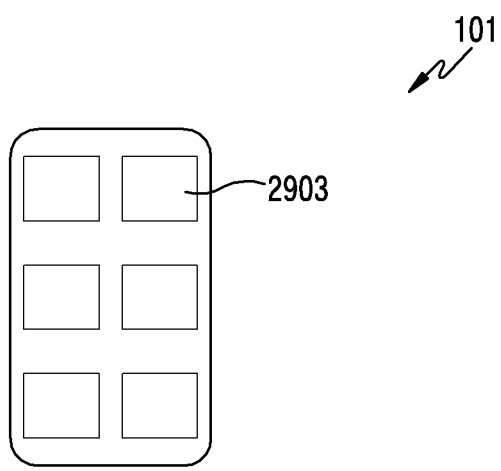
FIG. 31 illustrates a front view of an electronic device according to various embodiments.

FIG. 31 illustrates a front view of an electronic device according to various embodiments. As shown in FIG. 31, the pressure sensor 2903 may vary in terms of shape, size, and arrangement. For example, various numbers and sizes of pressure sensors 2903 may be arranged on the front side of the electronic device 101. At this time, the pressure sensors 2903 may be provided to be transparent.

Figure 32A:
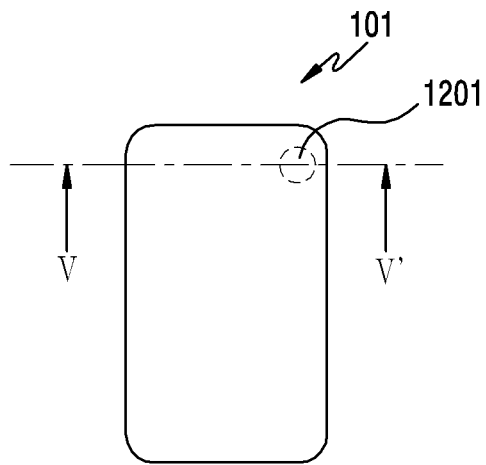
FIG. 32A illustrates a front view of an electronic device according to various embodiments.
Figure 32B:
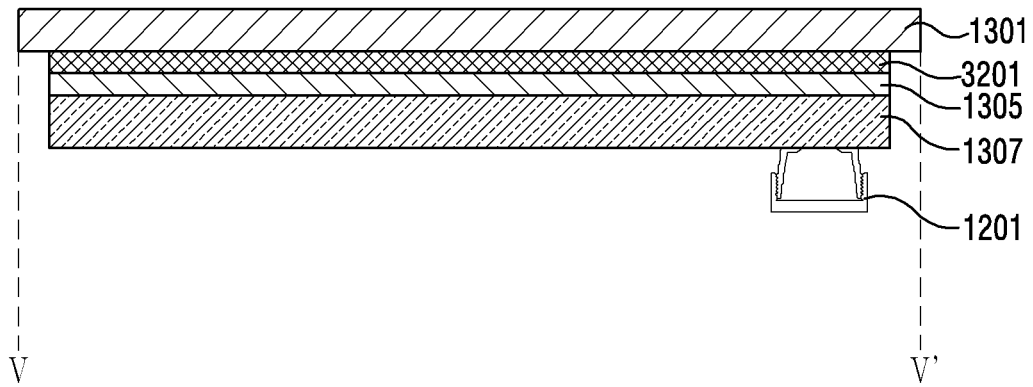
FIG. 32B illustrates a cross-sectional view taken along line V-V' in FIG. 32A.

FIG. 32A illustrates a front view of an electronic device according to various embodiments. FIG. 32B illustrates a cross-sectional view taken along line V-V' in FIG. 32A.

As illustrated in FIGS. 32A and 32B, the electronic device 101 according to various embodiments may include a window 1301, an antenna 3201, a polarizing layer 1305, a display 1307, and a sensor 1201. The antenna 3201 may be disposed between the window 1301 and the display 1307. Although not illustrated in the drawings, the electronic device 101 may further include a touch screen and a pressure sensor.

Figure 33A:
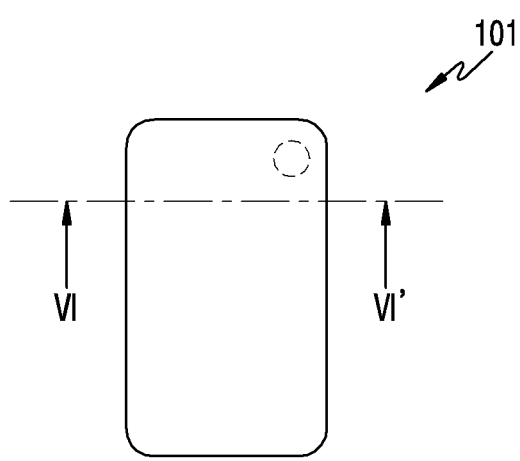
FIG. 33A illustrates a front view of an electronic device according to various embodiments.

FIG. 33A illustrates a front view of an electronic device according to various embodiments. FIGS. 33B to 33G illustrate cross-sectional views taken along line VI-VI' in FIG. 33A.

Figure 33B:
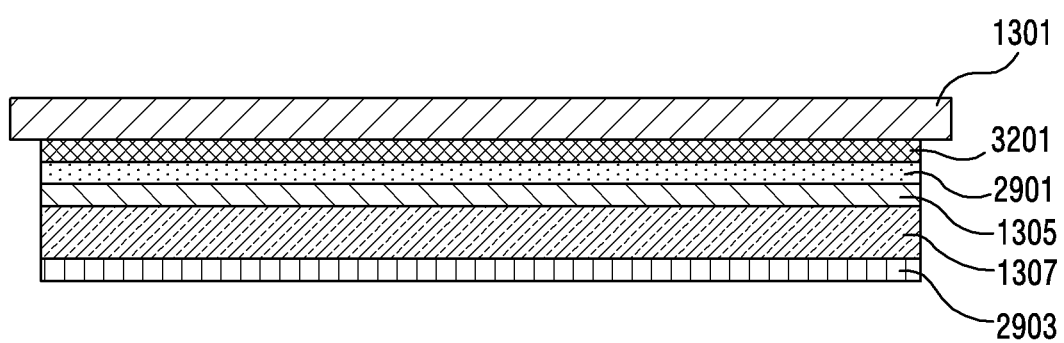
FIGS. 33B to 33G illustrate cross-sectional views taken along line VI-VI' in FIG. 30A.

As illustrated in FIG. 33B, the electronic device 101 may include a window 1301, an antenna 3201, a touch screen 2901, a polarizing layer 1305, a display 1307, and a pressure sensor 2903. The antenna 3201 may be disposed between the window 1301 and the touch screen 2901.

Figure 33C:
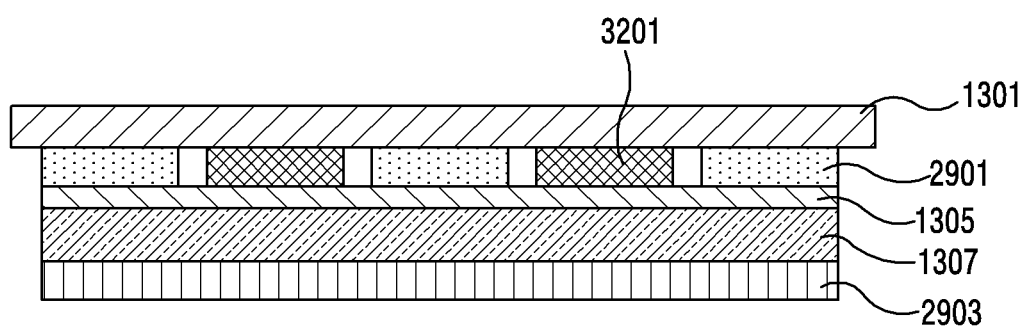

Alternatively, as illustrated in FIG. 33C, the antenna 3201 may be disposed on the same layer as the touch screen 2901. For example, the components of the antenna 3201 and the touch screen 2901 may be disposed on the display 1307. That is, the antenna 3201 and the touch screen 2901 may be integrally formed on the display 1307. The components of the antenna 3201 and the touch screen 2901 may be arranged alternately.

Figure 33D:
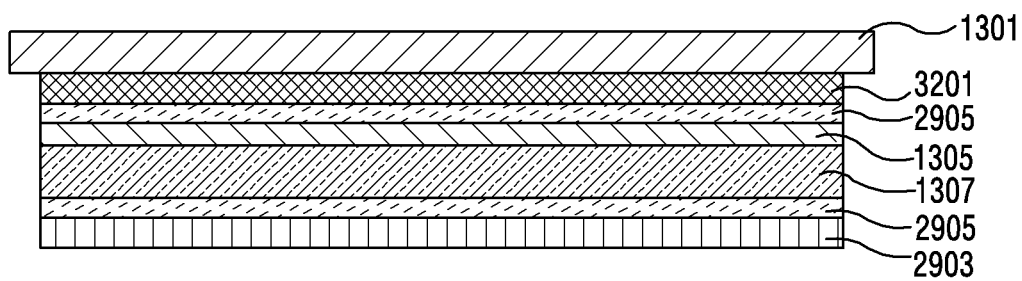

Alternatively, as illustrated in FIG. 33D, a touch screen may be disposed in the display 1307. That is, the components of the touch screen may be embedded in the display 1307. The antenna 3201 may be disposed under the window 1301. The window 1301 and the display 1307 integrated with the touch screen may be attached to each other by the adhesive unit 2905. The pressure sensor 2903 may be disposed under the display 1307. The window 1307 and the pressure sensor 2903 may be attached to each other by the adhesive unit 2905.

Figure 33E:
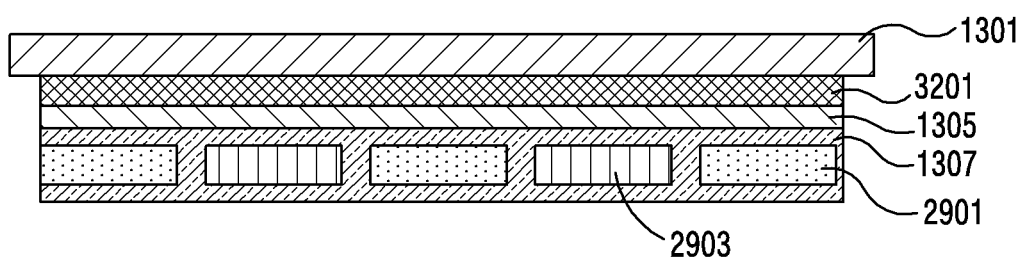

Alternatively, as illustrated in FIG. 33E, the pressure sensor 2903 and the touch screen 2901 may be disposed in the display 1307. That is, the components of the pressure sensor 2903 and the touch screen 2901 may be embedded in the display 1307. Through this, it is possible to reduce the thickness of the electronic device 101.

Figure 33F:
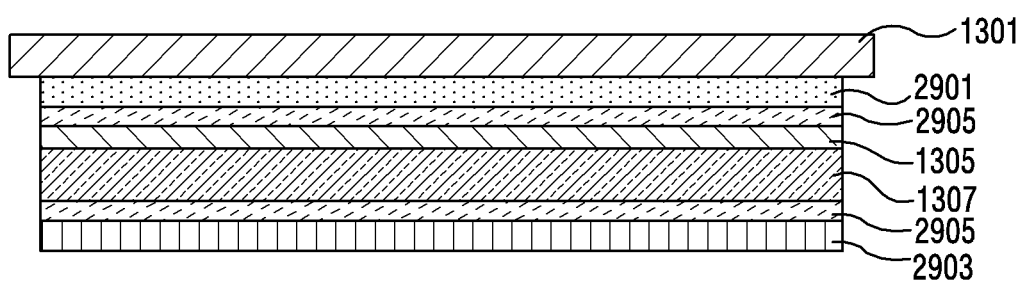

Alternatively, as illustrated in FIG. 33F, the touch screen 2901 may be integrally formed on the window 1301. That is, the components of the touch screen 2901 may be formed on the window 1301. The display 1307 may be disposed under the window 1301 having the touch screen 2901 formed integrally therewith. The antenna may be disposed in the display 1307. That is, the components of the antenna may be embedded in the display 1307. The window 1301 and the display 1307 integrated with the antenna may be attached to each other by the adhesive unit 2905. The pressure sensor 2903 may be disposed under the display 1307. The window 1307 and the pressure sensor 2903 may be attached to each other by the adhesive unit 2905.

Figure 33G:
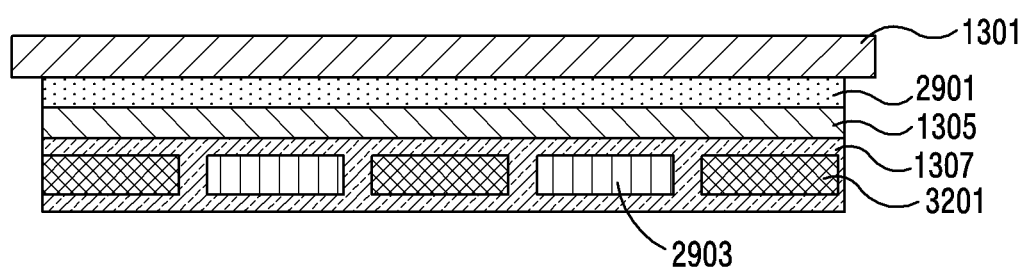

Alternatively, as illustrated in FIG. 33G, the touch screen 2901 may be integrally formed on the window 1301. That is, the components of the touch screen 2901 may be formed on the window 1301. The display 1307 may be disposed under the window 1301 having the touch screen 2901 formed integrally therewith. The pressure sensor 2903 and the antenna 3201 may be disposed in the display 1307. That is, the components of the pressure sensor 2903 and the antenna 3201 may be embedded in the display 1307.

Figure 34A:
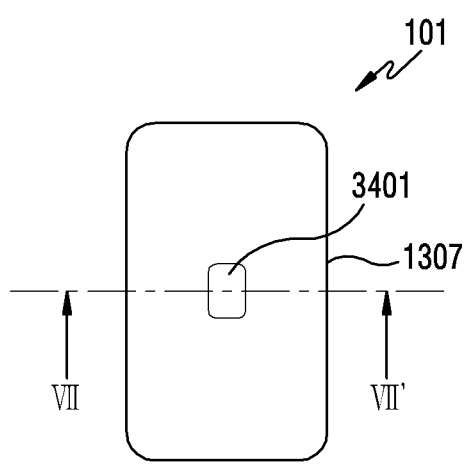
FIG. 34A illustrates a front view of an electronic device according to various embodiments.

FIG. 34A illustrates a front view of an electronic device according to various embodiments. FIGS. 34B to 34I illustrate cross-sectional views taken along line VII-VII' in FIG. 32A.

Figure 34B:
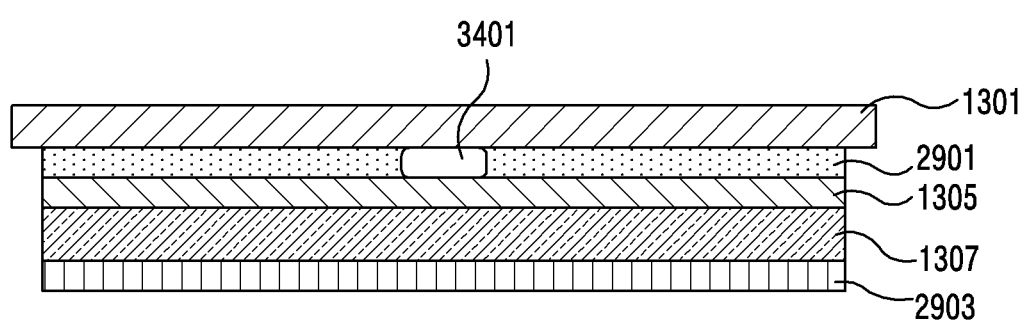
FIGS. 34B to 34I illustrate cross-sectional views taken along line VII-VII' in FIG. 32A.

As illustrated in FIGS. 34A and 34B, the electronic device 101 may include a fingerprint sensor 3401. The fingerprint sensor 3401 may be disposed in the central region of the display 1307. The fingerprint sensor 3401 may be transparently provided so as not to be visually recognized from the outside. The fingerprint sensor 3401 may be disposed under the window 1301. The fingerprint sensor 3401 may be disposed in the touch screen 2901.

Figure 34C:
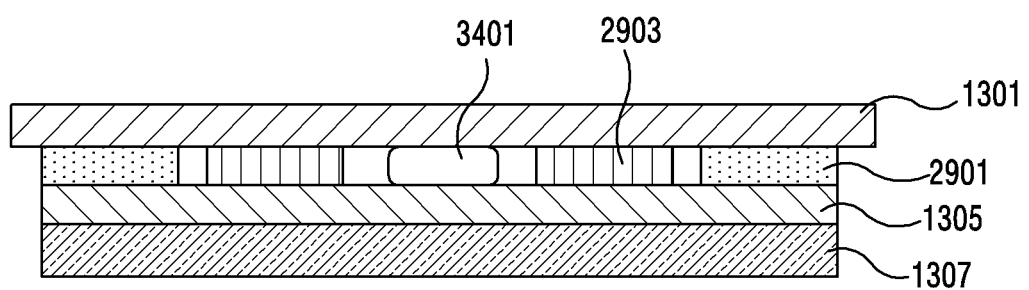
Figure 34D:
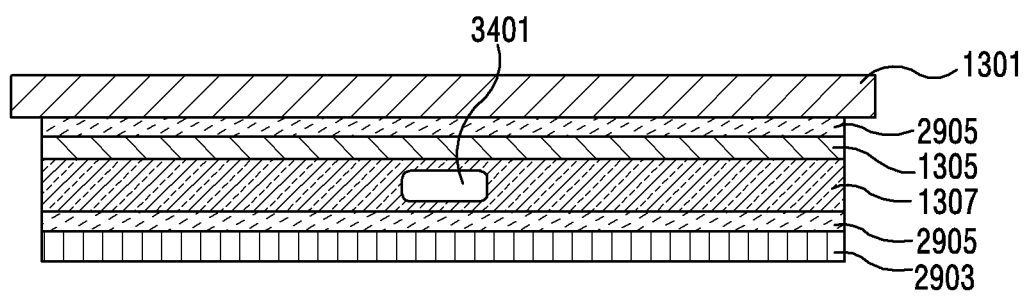

As illustrated in FIG. 34D, the fingerprint sensor 3401, the pressure sensor 2903, and the touch screen 2901 may be disposed on the same layer. For example, the components of the fingerprint sensor 3401, the pressure sensor 2903, and the touch screen 2901 may be disposed on the display 1307. That is, the fingerprint sensor 3401, the pressure sensor 2903, and the touch screen 2901 may be integrally formed on the display 1307. The components of the pressure sensor 2903 and the touch screen 2901 may be arranged alternately.

As illustrated in FIG. 34C, a touch screen may be disposed in the display 1307. That is, the components of the touch screen may be embedded in the display 1307. The fingerprint sensor 3401 may be disposed in the display 1307 integrated with a touch screen. That is, the fingerprint sensor 3401 may be embedded in the display 1307 integrated with a touch screen. The window 1301 and the display 1307 integrated with the touch screen may be attached to each other by the adhesive unit 2905. The pressure sensor 2903 may be disposed under the display 1307. The window 1307 and the pressure sensor 2903 may be attached to each other by the adhesive unit 2905.

Figure 34E:
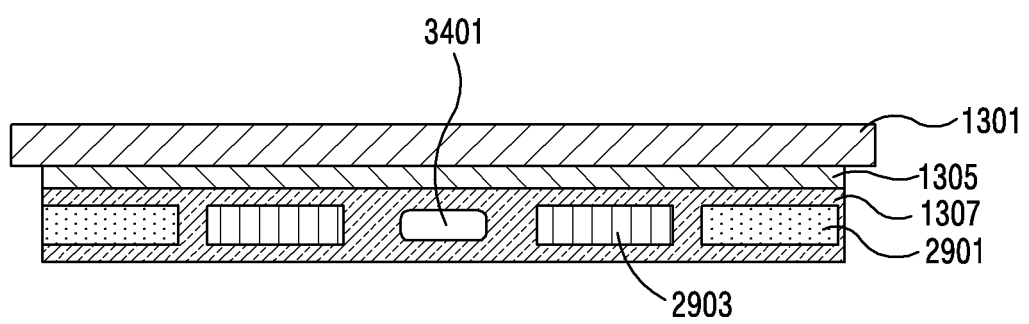

As illustrated in FIG. 34E, the fingerprint sensor 3401, the pressure sensor 2903, and the touch screen 2901 may be disposed in the display 1307. That is, the components of the fingerprint sensor 3201, the pressure sensor 2903, and the touch screen 2901 may be embedded in the display 1307. Through this, it is possible to reduce the thickness of the electronic device 101.

Figure 34F:
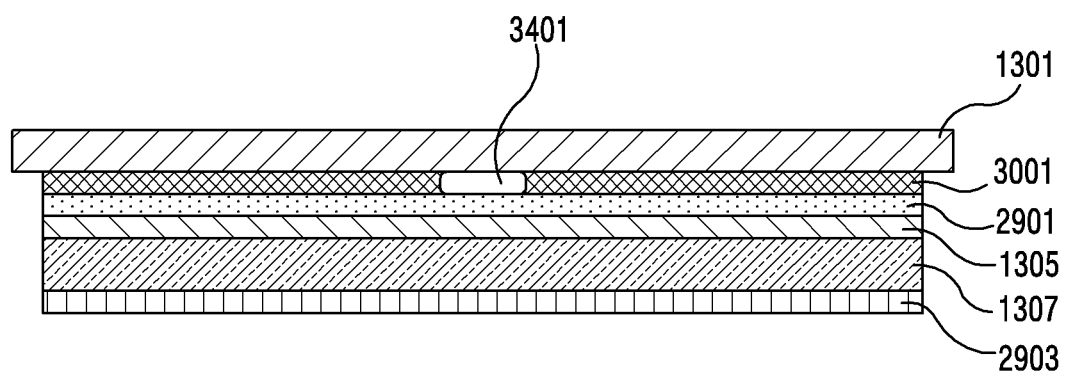

As illustrated in FIG. 34F, the fingerprint sensor 3401 may be disposed in the antenna 3201. That is, the components of the fingerprint sensor 3401 may be embedded in the antenna 3201. The touch screen 2901, the display 1307, and the pressure sensor 2903 may be disposed under the antenna 3201.

Figure 34G:
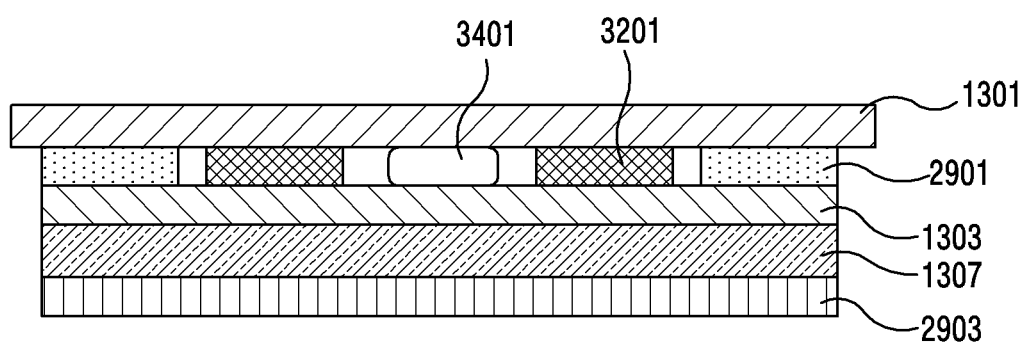

As illustrated in FIG. 34G, the fingerprint sensor 3401 and the antenna 3201 may be disposed on the same layer as the touch screen 2901. For example, the components of the fingerprint sensor 3401, the antenna 3201, and the touch screen 2901 may be disposed on the display 1307. That is, the fingerprint sensor 3401, the antenna 3201, and the touch screen 2901 may be integrally formed on the display 1307. The components of the antenna 3201 and the touch screen 2901 may be arranged alternately.

Figure 34H:
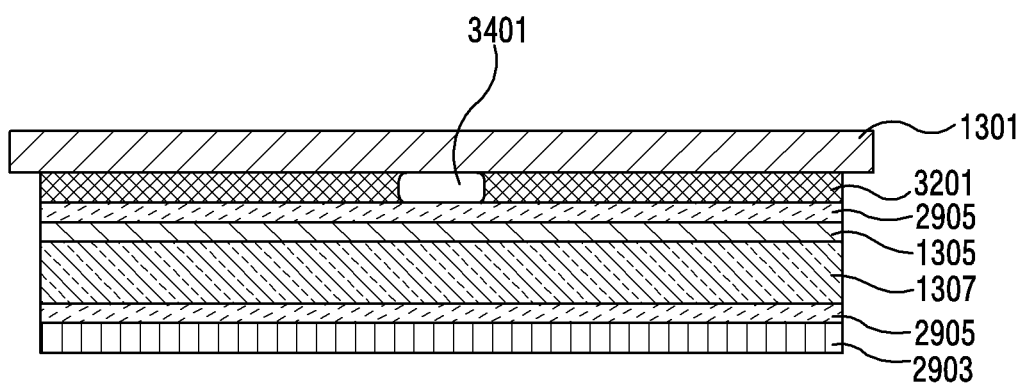

As illustrated in FIG. 34H, the fingerprint sensor 3401 may be disposed in the antenna 3201. That is, the components of the fingerprint sensor 3401 may be embedded in the antenna 3201. The touch screen may be disposed in the display 1307. That is, the components of the touch screen may be embedded in the display 1307. The window 1301 and the display 1307 integrated with the touch screen may be attached to each other by the adhesive unit 2905. The pressure sensor 2903 may be disposed under the display 1307. The window 1307 and the pressure sensor 2903 may be attached to each other by the adhesive unit 2905.

Figure 34I:
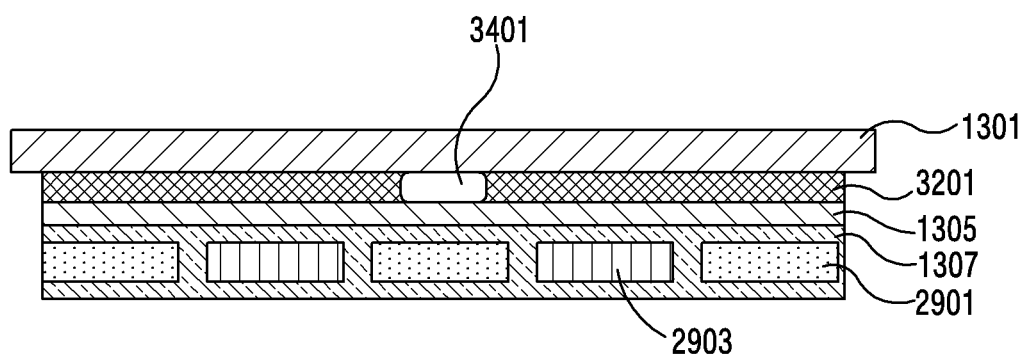

As illustrated in FIG. 34I, the fingerprint sensor 3401 may be disposed in the antenna 3201. That is, the components of the fingerprint sensor 3401 may be embedded in the antenna 3201. The pressure sensor 2903 and the touch screen 2901 may be disposed in the display 1307. That is, the components of the pressure sensor 2903 and the touch screen 2901 may be embedded in the display 1307.

Although not illustrated in the drawings, the fingerprint sensor 3401 may be disposed under the display 1307. When the fingerprint sensor 3401 is disposed under the display 1307, it may be provided to be opaque.

Figure 35A:
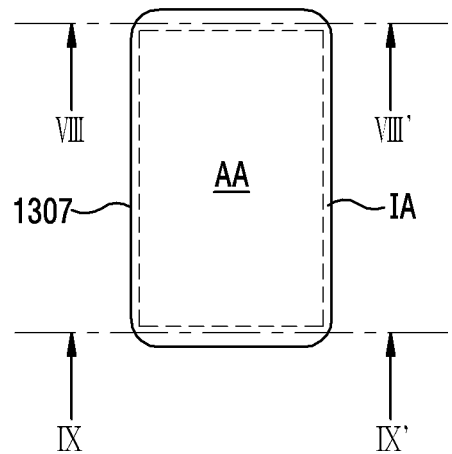
FIG. 35A illustrates a front view of an electronic device according to various embodiments.
Figure 35B:
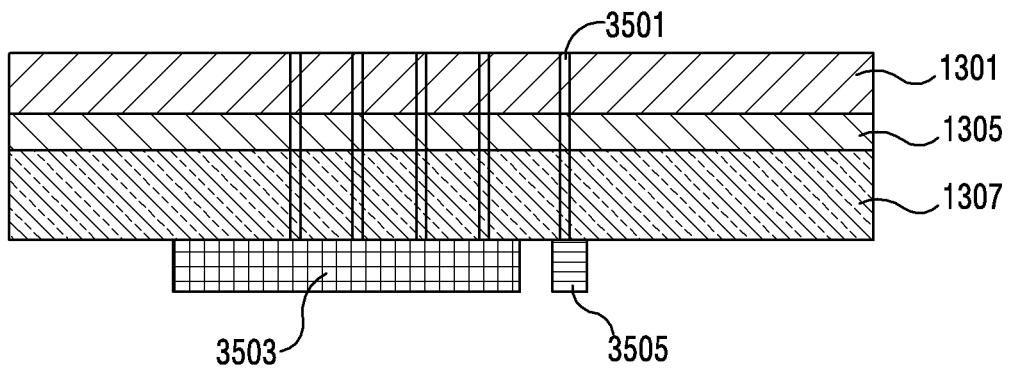
FIG. 35B illustrates a cross-sectional view taken along line VIII-VIII' in FIG. 35A.
Figure 35C:
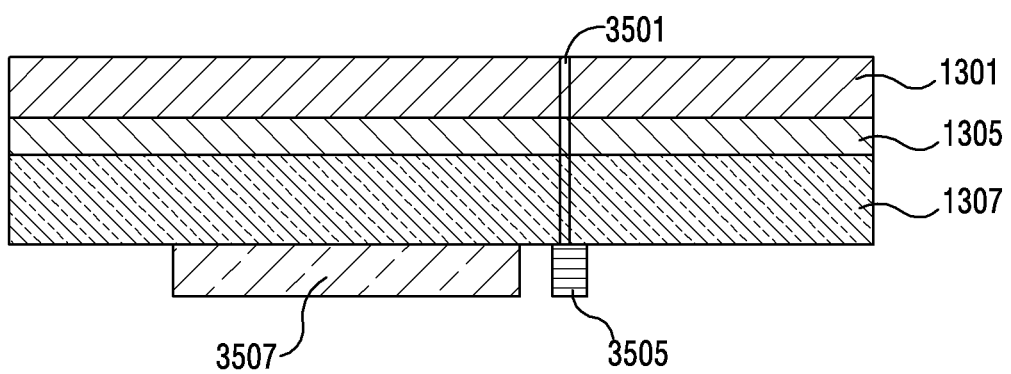
FIG. 35C illustrates a cross-sectional view taken along line IX-IX' in FIG. 35A.

FIG. 35A illustrates a front view of an electronic device according to various embodiments. FIG. 35B illustrates a cross-sectional view taken along line VIII-VIII' in FIG. 35A. FIG. 35C illustrates a cross-sectional view taken along line IX-IX' in FIG. 35A.

As illustrated in FIGS. 35A and 35B, a receiver 3503 and a microphone 3505 may be disposed in an inactive area IA of the display 1307. Meanwhile, although not illustrated in the drawings, a speaker may be disposed instead at the position where the receiver 3503 is disposed. Alternatively, a speaker may be additionally disposed at the position where the receiver 3503 is disposed. The receiver 3503 and the microphone 3505 may be disposed under the window 1301 and the display 1307. The window 1301, the polarizing layer 1305, and the display 1307 may include at least one hole 3501. The hole 3501 may be formed in the window 1301, the polarizing layer 1305, and the display 1307 at a position corresponding to the receiver 3503 and the microphone 3505. The hole 3501 may penetrate the window 1301, the polarizing layer 1305, and the display 1307. The hole 3501 may be a fine hole having a diameter of 1/10 mm or less.

As illustrated in FIGS. 35A and 35C, the receiver 3507 may include a piezoelectric material. At this time, the hole 3501 may be formed in the window 1301, the polarizing layer 1305, and the display 1307 at a position corresponding to the microphone 3505. That is, the hole 3501 may not be provided in the window 1301, the polarizing layer 1305, and the display 1307 at a position corresponding to the receiver 3507. Because the receiver 3507 includes the piezoelectric material so that the display 1307 can be vibrated, a separate hole may not be provided. That is, the receiver 3507 may vibrate a part of the electronic device 101 using a piezoelectric element and may use the portion in the form of a transducer so as to transmit transmitted/received voice signals. A piezoelectric element converts an electrical signal into a vibration signal, vibrates the air using an object in contact with the piezoelectric element as a transducer, and converts the voice signal into a voice signal using the vibration action. The position of the receiver 3507 in various embodiments may be located on the rear side or a lateral side of the display 1307. The piezoelectric element may also transmit vibration indirectly, in addition to the case in which it is directly attached to the transducer.

Figure 36A:
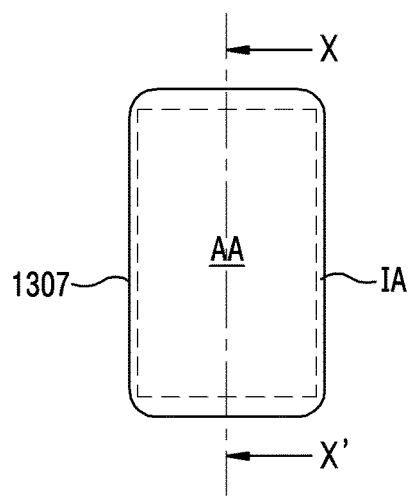
FIG. 36A illustrates a front view of an electronic device according to various embodiments.
Figure 36B:
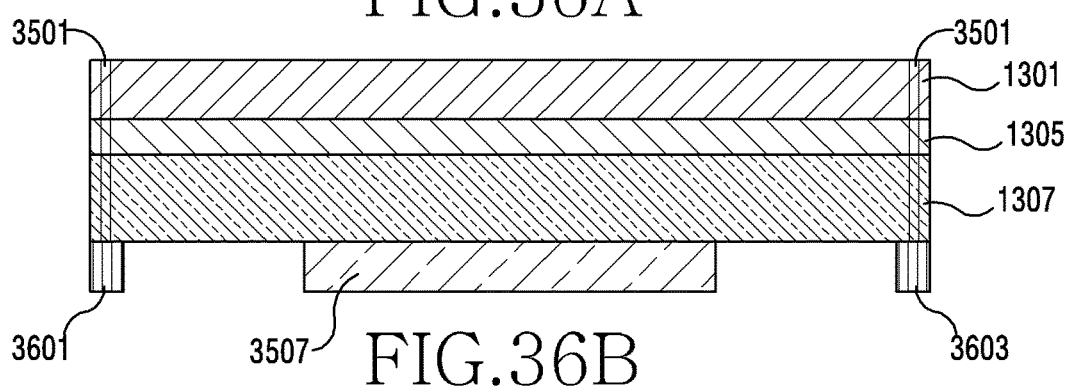
FIGS. 36B to 36D illustrate cross-sectional views taken along line X-X' in FIG. 36A.
Figure 36C:
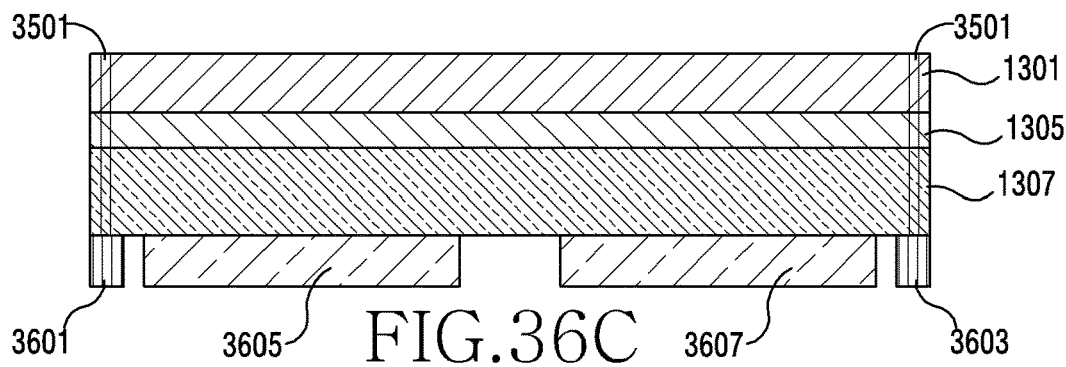
Figure 36D:
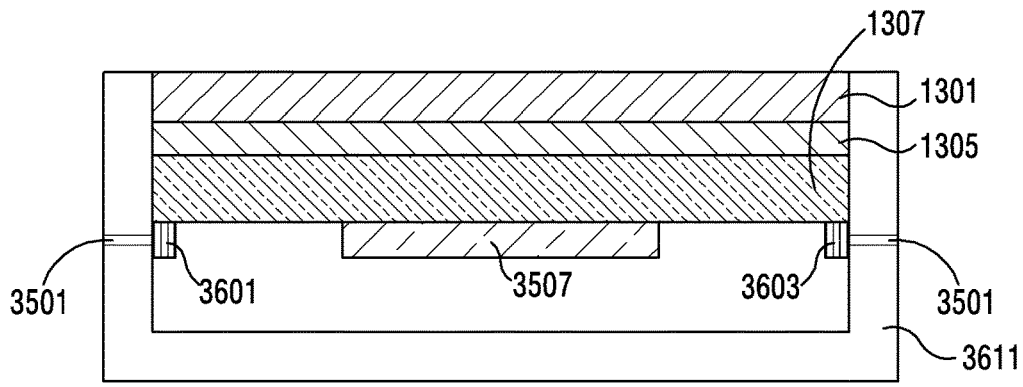

FIG. 36A illustrates a front view of an electronic device according to various embodiments. FIGS. 36B to 36D illustrate cross-sectional views taken along line X-X' in FIG. 36A.

As illustrated in FIGS. 36A and 36B, a first microphone 3601 and a second microphone 3603 may be disposed in the inactive area IA of the display 1307. A receiver 3507 may be disposed in an active area AA of the display 1307. The receiver 3507 may include a piezoelectric material. The hole 3501 may be provided in the window 1301, the polarizing layer 1305, and the display 1307 at a position corresponding to the first microphone 3601 and the second microphone 3603. The hole 3501 may not be provided in the window 1301, the polarizing layer 1305, and the display 1307 at a position corresponding to the receiver 3507. Because the receiver 3507 includes the piezoelectric material so that the display 1307 can be vibrated, a separate hole may not be provided.

As illustrated in FIG. 36C, the first microphone 3601 and the second microphone 3603 may be disposed in the inactive area IA of the display 1307. A first receiver 3605 and a second 3607 may be disposed in the active area AA of the display 1307. The first receiver 3605 and the second receiver 3607 may include a piezoelectric material. The hole 3501 may be provided in the window 1301, the polarizing layer 1305, and the display 1307 at a position corresponding to the first microphone 3601 and the second microphone 3603. That is, the hole 3501 may not be provided in the window

1301, the polarizing layer 1305, and the display 1307 at a position corresponding to the first receiver 3605 and the second receiver 3607.

As illustrated in FIG. 36D, the first microphone 3601 and the second microphone 3603 may be disposed in the inactive area IA of the display 1307. A receiver 3507 may be disposed in an active area AA of the display 1307. The receiver 3507 may include a piezoelectric material. The hole 3501 may be provided in the housing 3611. The hole 3501 may be provided in the housing 3611 at a position corresponding to the first microphone 3601 and the second microphone 3603.

According to various embodiments, an electronic device 101 may include: a window 1301; a polarizing late 1305 disposed under the window 1301 and including a first region 1305*a* having a first characteristic with respect to light and a second region 1305*b* having a second characteristic with respect to light; a display 1307 disposed under the polarizing layer 1305; and at least one sensor 1201 disposed under the display 1307 at a position corresponding to the second region 1035*b*.

According to various embodiments, the second region 1305*b* may include an opening 1501 disposed in at least a partial region of the polarizing layer 1305.

According to various embodiments, the first region 1305*a* may have a first transparency, and the second region 1305*b* may have a second transparency that is higher than the first transparency.

According to various embodiments, the first region 1305*a* may have a first transmittance, and the second region 1305*b* may have a second transmittance that is higher than the first transmittance.

According to various embodiments, the window 1301 may include liquid crystals 2103 at a position corresponding to the second region 1305*b* of the polarizing layer 1305.

According to various embodiments, the electronic device may further include a processor 120 that may be configured to: determine an activated state of the at least one sensor 1201; cause the liquid crystals 2103 to be aligned in a first direction D1 when the at least one sensor 1201 is activated; and cause the liquid crystals 2103 to be aligned in a second direction D2 when the at least one sensor 1201 is inactivated.

According to various embodiments, the electronic device may further include a processor 120 that may be configured to: determine an activated state of the at least one sensor 1201; and make at least a partial region of the display 1307, which corresponds to the second region 1305*b*, transparent when the at least one sensor 1201 is activated.

According to various embodiments, the electronic device may further include a processor 120 that may be configured to: determine an activated state of the at least one sensor 1201; calculate an amount of light introduced into the sensor from the display when the at least one sensor 1201 is activated; and cause the display 1307 to be corrected and displayed with the calculated amount of light.

According to various embodiments, the polarizing layer 1305 may include a first layer 1601 and a second layer 1602, an opening may be formed in a region corresponding to the second region 1305*b* of the first layer 1601, and the first region 1305*a* of the second layer 1602 may have a first transmittance, and the second region 1305*b* of the second layer 1602 may have a second transmittance that is higher than the first transmittance.

According to various embodiments, an electronic device 101 may include: a window 1301 including a transmissive region 2701*a* and a color filter region 2701*b* in which a color filter 2711 is disposed; a display 1307 disposed under the window 1301; and at least one sensor 1201 disposed under the display 1307 and at a position corresponding to the transmissive region 2701*a* and the color filter region 2701*b*.

According to various embodiments, the electronic device may further include a processor 120 that may be configured to: determine an activated state of the at least one sensor 1201; and determine driving of the color filter 2711 when the at least one sensor 1201 is activated.

According to various embodiments, the electronic device may further include a processor 120 that may be configured to: determine an activated state of the at least one sensor 1201; and determine driving of the color filter 2711 according to a screen displayed on the display 1307 when the at least one sensor 1201 is activated.

According to various embodiments, the transmissive region 2701*a* may include an opening.

According to various embodiments, an electronic device may include a window 1301 including liquid crystals 2103, at least one sensor 1201 disposed under the window 1301, and a processor 120 functionally connected to the window 1301 and the sensor 1201. The processor 120 may be configured to: cause at least some of the liquid crystals 2103 to be aligned in a first direction D1 when the at least one sensor 1201 is activated; and cause the liquid crystals 2103 to be aligned in a second direction D2 when the at least one sensor 1201 is inactivated.

According to various embodiments, the processor 120 may be configured to control a direction of the liquid crystals 2103.

According to various embodiments, the processor 120 may be configured to recover the direction of the liquid crystals 2103 when the at least one sensor 1201 is inactivated.

Figure 37:
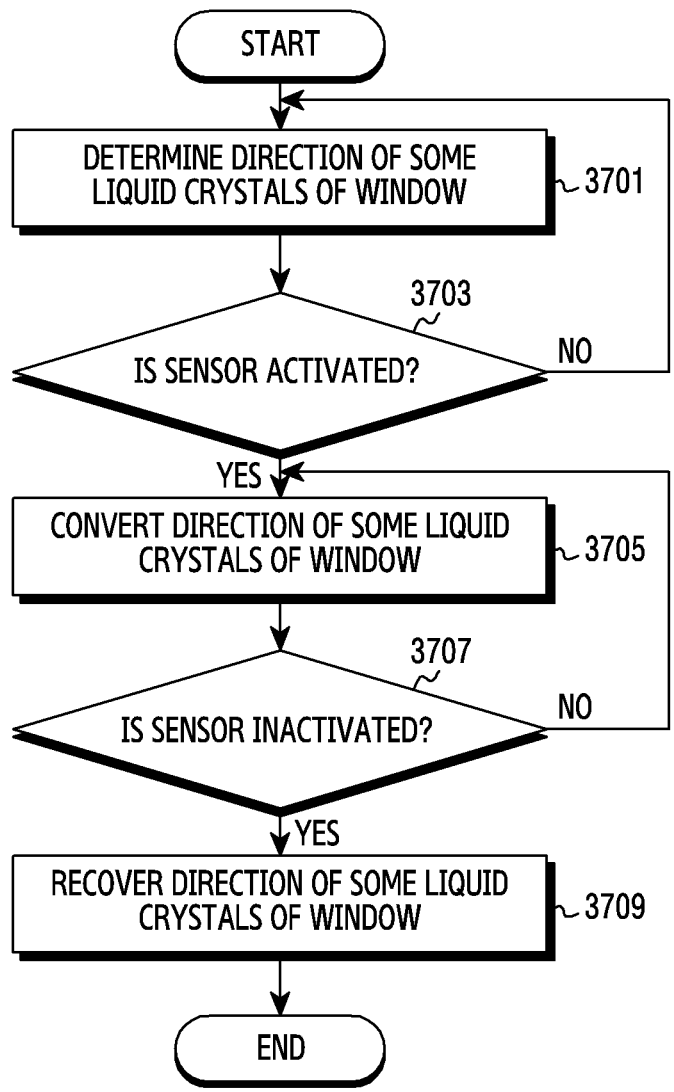
FIG. 37 is a flowchart illustrating a method of operating an electronic device according to various embodiments.

FIG. 37 is a flowchart illustrating a method of operating an electronic device according to various embodiments.

As illustrated in FIG. 37, in operation 3701, the processor 120 may determine the direction of window liquid crystals 2103 disposed in a portion of the window (1301 in FIG. 21). The processor 120 may set or align the direction of the window liquid crystals 2103 in one direction. For example, the processor 120 may align the window liquid crystal 2103 disposed in the third region 2101 of the window 1301 in the second direction D2. The second direction D2 may be a direction corresponding to the horizontal direction in the window 1301. The third region 2101 may correspond to a region in which the sensor 1201 under the window 1301 is disposed.

Next, in operation 3703, the processor 120 may determine whether the sensor 1201 is activated. The processor 120 may periodically determine whether the sensor 1201 is activated. Alternatively, the processor 120 may determine whether the sensor 1201 is activated by the user's input.

Next, when it is determined that the sensor 1201 is in the activated state, in operation 3705, the processor 120 may convert the direction of the window liquid crystals 2103 disposed in a portion of the window 1301. The processor 120 may cause the window liquid crystals 2103 to be aligned in a direction different from the one direction. For example, the processor 120 may cause the window liquid crystals 2103 disposed in the third region 2101 of the window 1301 to be aligned in the second direction D2, which intersects the first direction D1. The first direction D1 may be a direction corresponding to the vertical direction in the window 1301. Meanwhile, the time for aligning the window liquid crystals 2103 in the first direction D1 may be a minimum time for which the sensor 1201 is not visible due to the arrangement of the liquid crystals 2103.

Meanwhile, when it is determined that the sensor 1201 is in the inactivated state, the processor 120 may return to operation 3701 and may continuously cause the window liquid crystals 2103 to be aligned in the second direction D2.

Next, in operation 3707, the processor 120 may determine whether the sensor 1201 is inactivated. The processor 120 may periodically determine whether the sensor 1201 is inactivated. Alternatively, the processor 120 may determine whether the sensor 1201 is inactivated by the user's input.

Next, when it is determined that the sensor 1201 is in the inactivated state, in operation 3709, the processor 120 may recover the direction of the window liquid crystals 2103 disposed in a portion of the window 1301. That is, the processor 120 may cause the window liquid crystals 2103 to be aligned in the second direction D2 again.

On the other hand, when it is determined that the sensor 1201 is not in the inactivated state, the processor 120 may return to operation 3705 and may continuously cause the window liquid crystals 2103 to be aligned in the first direction D1.

Figure 38:
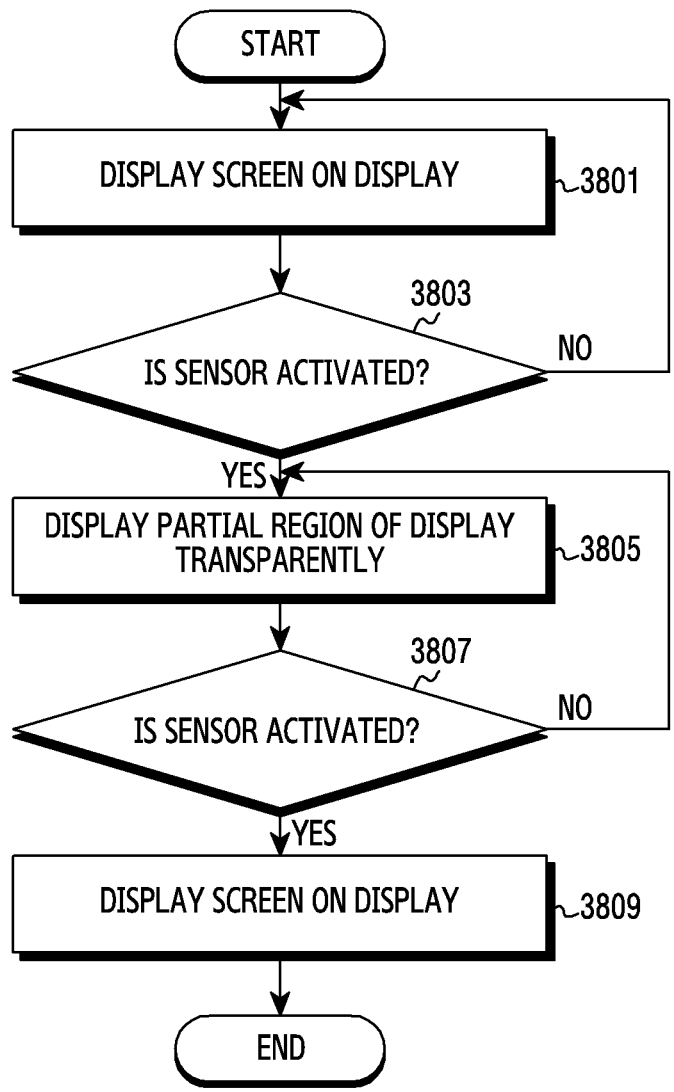
FIG. 38 is a flowchart illustrating a method of operating an electronic device according to various embodiments.

FIG. 38 is a flowchart illustrating a method of operating an electronic device according to various embodiments.

As illustrated in FIG. 38, in operation 3801, the processor 120 may cause a screen to be displayed on the display (1307 in FIG. 25).

Next, in operation 3803, the processor 120 may determine whether the sensor 1201 is activated. The processor 120 may periodically determine whether the sensor 1201 is activated. Alternatively, the processor 120 may determine whether the sensor 1201 is activated by the user's input.

Next, when it is determined that the sensor 1201 is in the activated state, in operation 3805, the processor 120 may cause a partial region of the display 1307 to be displayed transparently. For example, in operation 3805, the processor 120 may cause the fourth region 2501 of the display 1307 to be displayed transparently. The fourth region 2501 may be a region corresponding to the sensor 1201 disposed under the display 1307. Meanwhile, the time for causing a partial region of the display 1307 to be displayed transparently may be a minimum time for which the sensor 1201 disposed under the partial region of the display 1307 is not visually recognizable.

Meanwhile, according to various embodiments, when it is determined that the sensor 1201 is in the activated state, the processor 120 may calculate the amount of light introduced into the sensor 1201 from the display 1307, and may cause a screen to be corrected and displayed on the display 1409 with the calculated amount of light. That is, the processor 120 may control the pixels RGB of the display 1409 in such a manner that the calculated light amount is excluded.

Next, in operation 3807, the processor 120 may determine whether the sensor 1201 is inactivated. The processor 120 may periodically determine whether the sensor 1201 is inactivated. Alternatively, the processor 120 may determine whether the sensor 1201 is inactivated by the user's input.

Next, when it is determined that the sensor 1201 is in the inactivated state, in operation 3809, the processor 120 may cause a screen to be displayed on the display 1307.

Next, when it is determined that the sensor 1201 is not in the inactivated state, the processor 120 may return to operation 3805, and may cause a partial region of the display 1307 to be displayed transparently.

Meanwhile, according to various embodiments, when it is determined that the sensor 1201 is in the activated state, the processor 120 may cause the window liquid crystals 2103 to be aligned in the first direction D1, and at the same time, at least a partial region of the display 1307 may be displayed transparently. Through this, it is possible to further improve the light reception efficiency of the sensor 1201.

According to various embodiments, a method of operating an electronic device 101 including at least one sensor 1201 and a processor 120 may include: determining an activated state of the at least one sensor 120; causing at least some of the liquid crystals 2103 formed in the window 1301 to be aligned in a first direction D1 when the at least one sensor 1201 is activated, using the processor 120; and causing at least some of the liquid crystals 2103 to be aligned in a second direction D2 when the at least one sensor 1201 is inactivated, using the processor 120.

According to various embodiments, the method may further include determining the direction of the liquid crystals 2103.

According to various embodiments, the method may further include: restoring the direction of the liquid crystals 2103 when the at least one sensor 1201 is inactivated.

According to various embodiments, the method may further include: when the at least one sensor 1201 is activated, calculating an amount of light introduced into the sensor 1201 from the display 1307; and causing the display 1307 to be corrected and displayed with the calculated amount of light.

Meanwhile, the embodiments of the present disclosure disclosed in the present specification and the drawings have been presented to easily explain technical contents of the present disclosure and help comprehension of the present disclosure, and do not limit the scope of the present disclosure. That is, it is obvious to those skilled in the art to which the present disclosure belongs that different modifications can be achieved based on the technical spirit of the present disclosure.

The invention claimed is:

1. An electronic device comprising:
   a polarizing plate including a first region having a first characteristic with respect to light and a second region having a second characteristic with respect to light;
   a window disposed above the polarizing plate and including a third region including liquid crystals disposed at a position corresponding to the second region;
   a display disposed under the polarizing plate and including a fourth region at the position corresponding to the second region;
   at least one sensor disposed under the display at the position corresponding to the second region; and
   at least one processor that is configured to:
   determine an activated state of the at least one sensor;
   when the at least one sensor is activated, calculate an amount of light introduced to the at least one sensor; and
   correct a screen displayed in the fourth region of the display according to the amount of light introduced to the at least one sensor,
   wherein when a first amount of light is introduced to the at least one sensor, the screen displayed in the fourth region is brighter than when a second amount of light greater than the first amount of light is introduced to the at least one sensor.

2. The electronic device of claim 1, wherein the second region of the polarizing plate includes an opening region in at least a partial region thereof.

3. The electronic device of claim 1, wherein the first region has a first transparency, and the second region has a second transparency that is higher than the first transparency.

4. The electronic device of claim 1, wherein the first region has a first transmittance, and the second region has a second transmittance that is higher than the first transmittance.

5. The electronic device of claim 1, further comprising:
the at least one processor that is configured to: determine the activated state of the at least one sensor; cause the liquid crystals to be aligned in a first direction when the at least one sensor is activated; and cause the liquid crystals to be aligned in a second direction when the at least one sensor is inactivated.

6. The electronic device of claim 1, wherein the polarizing plate includes a first layer and a second layer,
wherein a region corresponding to the second region in the first layer includes an opening, and
wherein the first region of the second layer has a first transmittance, and the second region of the second layer has a second transmittance that is higher than the first transmittance.

7. An electronic device comprising:
a window including a first region, the first region including at least two transmissive regions and at least two color filter regions in which first color filters is disposed, wherein each of the at least two color filter regions are adjacent to each of the at least two transmission regions;
a display disposed under the window and including second color filters; and
one sensor disposed under the display at a position corresponding to the first region including the at least two transmission regions and the at least two color filter regions,
wherein a thickness of the first color filters is smaller than a thickness of the second color filters.

8. The electronic device of claim 7, further comprising:
at least one processor that is configured to: determine an activated state of the one sensor; and determine driving of the first color filters when the one sensor is activated.

9. The electronic device of claim 7, further comprising:
at least one processor that is configured to: determine an activated state of the one sensor; and determine driving of the first color filters when the one sensor is activated according to a screen displayed on the display.

10. The electronic device of claim 7, wherein the transmissive region includes an opening.

* * * * *